(12) United States Patent
Shinjo et al.

(10) Patent No.: US 8,139,852 B2
(45) Date of Patent: Mar. 20, 2012

(54) COLOR CLASSIFICATION METHOD, COLOR RECOGNITION METHOD, COLOR CLASSIFICATION APPARATUS, COLOR RECOGNITION APPARATUS, COLOR RECOGNITION SYSTEM, COMPUTER PROGRAM, AND RECORDING MEDIUM

(75) Inventors: Takako Shinjo, Oita (JP); Kenji Kodama, Oita (JP); Teruo Shimomura, Oita (JP); Atsuyoshi Andou, Oita (JP); Kunikazu Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 725 days.

(21) Appl. No.: 12/340,179

(22) Filed: Dec. 19, 2008

(65) Prior Publication Data
US 2009/0097746 A1  Apr. 16, 2009

Related U.S. Application Data

(63) Continuation of application No. PCT/JP2007/063102, filed on Jun. 29, 2007.

(30) Foreign Application Priority Data

Jun. 29, 2006 (JP) ................................. 2006-179799

(51) Int. Cl.
*G06K 9/00* (2006.01)
(52) U.S. Cl. ...................................................... 382/165
(58) Field of Classification Search .................. None
See application file for complete search history.

(56) References Cited

U.S. PATENT DOCUMENTS

| | | | | |
|---|---|---|---|---|
| 5,710,833 A * | 1/1998 | Moghaddam et al. | ........ | 382/228 |
| 6,088,137 A * | 7/2000 | Tomizawa | ..................... | 358/538 |
| 6,148,102 A * | 11/2000 | Stolin | ........................... | 382/164 |
| 6,272,250 B1 * | 8/2001 | Sun et al. | ....................... | 382/225 |
| 6,307,965 B1 * | 10/2001 | Aggarwal et al. | ............. | 382/225 |
| 6,483,940 B1 * | 11/2002 | Wang | ............................. | 382/164 |
| 6,782,126 B2 * | 8/2004 | Rao et al. | ....................... | 382/164 |
| 7,068,838 B2 * | 6/2006 | Manbeck et al. | ............. | 382/162 |

(Continued)

FOREIGN PATENT DOCUMENTS

JP    A 6-187443    7/1994

(Continued)

OTHER PUBLICATIONS

Duda R. O. et al., "Pattern Classification—the Design Cycle," Pattern Classification, New York, John Wiley & Sons, US, pp. 14-17, Jan. 1, 2001.

(Continued)

*Primary Examiner* — Yuzhen Ge
(74) *Attorney, Agent, or Firm* — Greer, Burns & Crain, Ltd.

(57) ABSTRACT

A color classification method including: determining a plurality of predetermined process target regions from a plurality of pickup images taken by an imaging device; calculating a plurality of color distributions of pixels contained in the respective determined process target regions; and forming a plurality of clusters by executing a clustering process based on the calculated color distributions for the pickup images, the method being for classifying a plurality of colors with respect to the respective formed clusters, the forming step including: extracting predetermined number of the classified colors, whose calculated rates are highest in the calculated plurality of the rates, from among the predetermined classified colors; defining a plurality of color spaces, dimensions of each of which are selected from the predetermined number of the extracted classified colors.

18 Claims, 39 Drawing Sheets

U.S. PATENT DOCUMENTS

| | | | |
|---|---|---|---|
| 7,453,468 B2 * | 11/2008 | Ziobro | 345/596 |
| 7,657,089 B2 * | 2/2010 | Li et al. | 382/170 |
| 2007/0297649 A1 * | 12/2007 | Nakanishi | 382/118 |

FOREIGN PATENT DOCUMENTS

| | | |
|---|---|---|
| JP | B2 3025986 | 1/2000 |
| JP | A 2002-190018 | 7/2002 |
| JP | B2 3708042 | 8/2005 |

OTHER PUBLICATIONS

Persons, L. et al., "Subspace Clustering for High Dimensional Data: A Review," SIGKDD Explorations, XX, XX, vol. 6, No. 1, pp. 90-105, Jan. 1, 2004.

* cited by examiner

F I G. 2
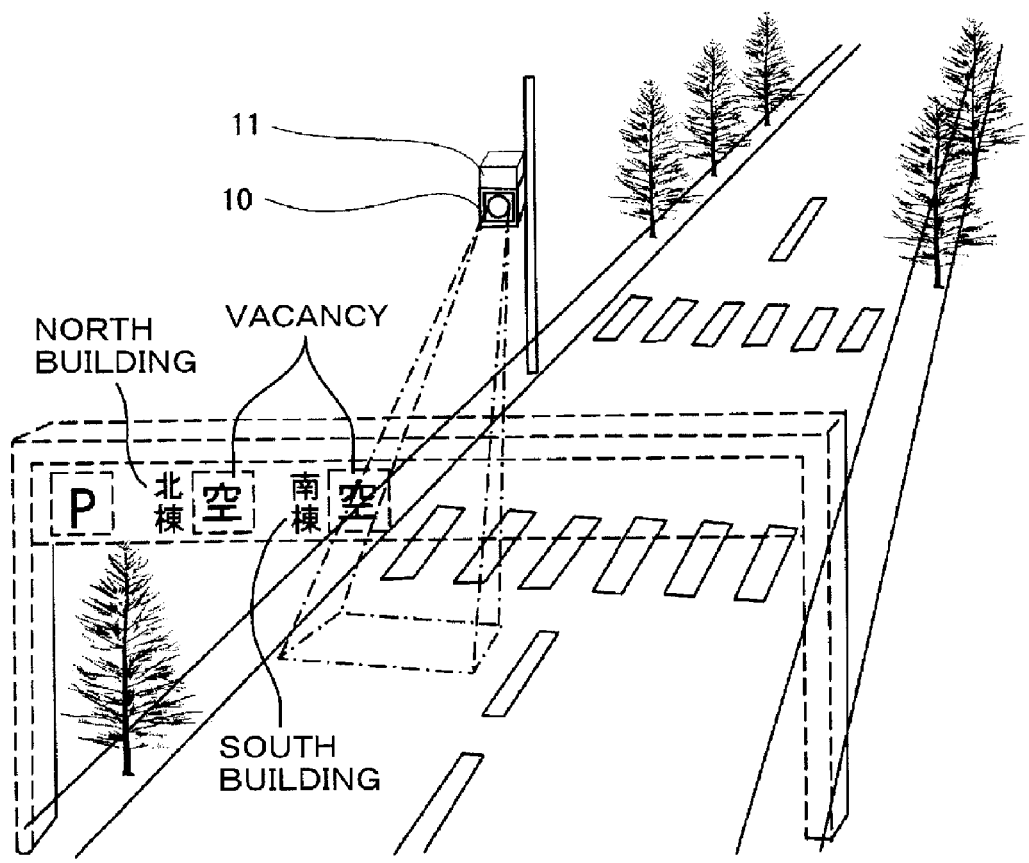

F I G. 11
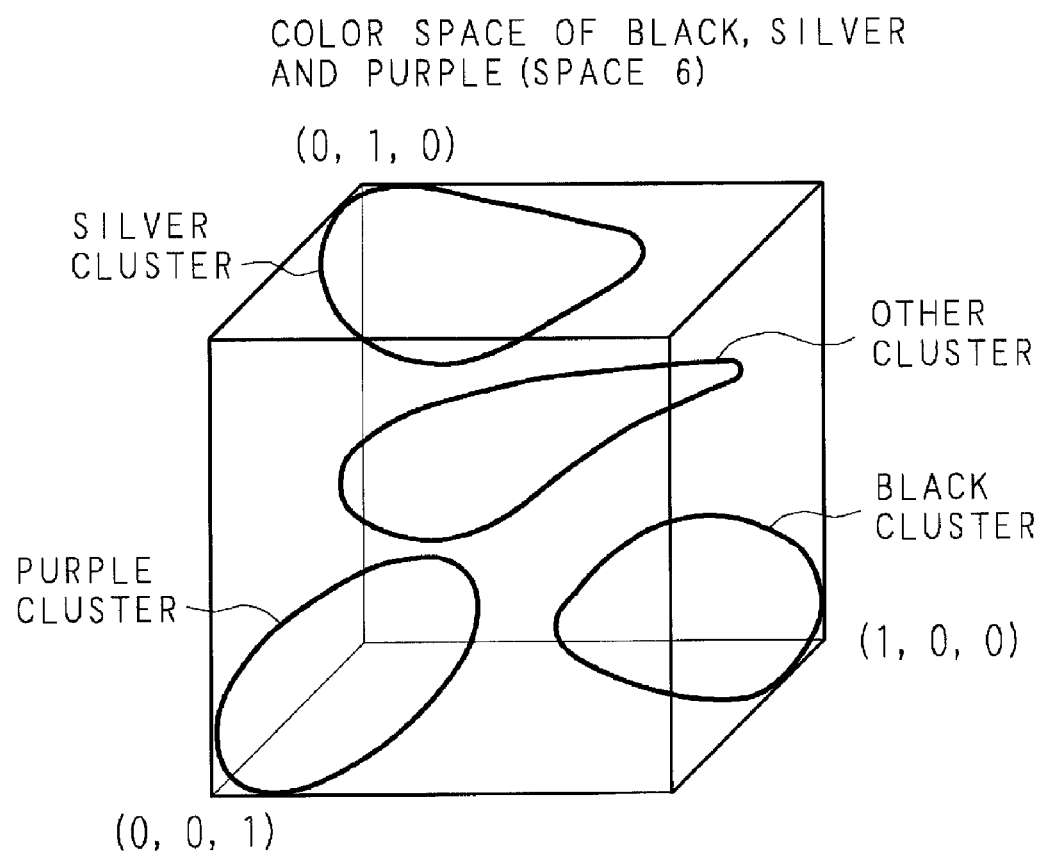

F I G. 1 2

| DETERMINATION STANDARD | | PRIORITY |
|---|---|---|
| FIRST | WHEN COLORS CORRESPONDING TO SHORTEST DISTANCE CLUSTERS IN COLOR SPACES ARE ALL "OTHER" COLORS, RECOGNIZED COLOR IS "UNKNOWN" | 1 |
| SECOND | WHEN COLORS CORRESPONDING TO SHORTEST DISTANCE CLUSTERS IN COLOR SPACES EXCEPT FOR ONE COLOR SPACE IS "OTHER" COLORS, "OTHER" CLUSTERS ARE IGNORED AND RECOGNIZED COLOR IS COLOR CORRESPONDING TO CLUSTER OTHER THAN "OTHER" CLUSTER. | 2 |
| THIRD | (DISTANCE TO BARYCENTER OF CLUSTER IS PREFERRED) RECOGNIZED COLOR IS COLOR CORRESPONDING TO SHORTEST DISTANCE CLUSTER IN SHORTEST DISTANCE CLUSTERS, WHEN THIS FAR SHORTEST DISTANCE IS NOT MORE THAN PREDETERMINED VALUE. | 3 |
| FOURTH | (CHROMATIC COLOR IS PREFERRED) IN CASES WHERE COLORS CORRESPONDING TO OTHER SHORTEST DISITANCE CLUSTERS IS ACHROMATIC COLOR AND WHERE SHORTEST DISTANCE OF CHROMATIC CLUSTER IS NOT MORE THAN PREDETERMINED VALUE, RECOGNIZED COLOR IS CHROMATIC COLOR OF CHROMATIC CLUSTER. | 4 |
| FIFTH | (MOST FREQUENTLY APPEARING COLOR IS PREFERRED) RECOGNIZED COLOR IS MOST FREQUENTLY APPEARING COLOR FROM AMONG COLORS CORRESPONDING TO SHORTEST DISTANCE CLUSTERS IN COLOR SPACE. | 5 |

FIG. 17

| DIMENSION NUMBER | 1 | 2 | 3 | 4 | 5 | 6 | 7 | 8 |
|---|---|---|---|---|---|---|---|---|
| CLASSIFIED COLOR | WHITE | BLACK | SILVER | RED | YELLOW | GREEN | BLUE | PURPLE |

F I G. 1 8

| CAR BODY COLOR \ COLOR COMPONENT | DIMENSIONS(COLOR COMPONENTS CONTAINED IN BONNET REGION) | | | | | | | |
|---|---|---|---|---|---|---|---|---|
| | WHITE | BLACK | SILVER | RED | YELLOW | GREEN | BLUE | PURPLE |
| WHITE | 0.46091 | 0.23335 | 0.28412 | 0.01274 | 0.00290 | 0.00097 | 0.00116 | 0.00386 |
| BLACK | 0.04681 | 0.64957 | 0.14747 | 0.03993 | 0.00404 | 0.01600 | 0.08944 | 0.00673 |
| SILVER | 0.27485 | 0.16659 | 0.48374 | 0.03008 | 0.00199 | 0.02321 | 0.00031 | 0.01924 |
| RED | 0.04253 | 0.19916 | 0.08751 | 0.63735 | 0.00244 | 0.02636 | 0.00022 | 0.00443 |
| YELLOW | 0.02364 | 0.19694 | 0.06690 | 0.02606 | 0.64938 | 0.01934 | 0.01424 | 0.00349 |
| GREEN | 0.09394 | 0.23262 | 0.15079 | 0.03821 | 0.00056 | 0.45983 | 0.00913 | 0.01491 |
| BLUE | 0.19603 | 0.15734 | 0.11994 | 0.01032 | 0.00387 | 0.00619 | 0.50426 | 0.00206 |
| PURPLE | 0.09802 | 0.16774 | 0.10881 | 0.12077 | 0.00020 | 0.03763 | 0.00642 | 0.46033 |

FIG. 19

| | COLOR COMPONENTS ||||||||
|---|---|---|---|---|---|---|---|---|
| | ①WHITE | ②BLACK | ③SILVER | ④RED | ⑤YELLOW | ⑥GREEN | ⑦BLUE | ⑧PURPLE |
| WHITE | 0.528 | 0.154 | 0.259 | 0.013 | 0.008 | 0.018 | 0.003 | 0.017 |
| WHITE | 0.418 | 0.146 | 0.332 | 0.002 | 0.049 | 0.051 | 0.001 | 0.002 |
| WHITE | 0.495 | 0.141 | 0.308 | 0.002 | 0.000 | 0.042 | 0.002 | 0.010 |
| WHITE | 0.468 | 0.152 | 0.322 | 0.002 | 0.005 | 0.022 | 0.016 | 0.013 |
| WHITE | 0.528 | 0.160 | 0.247 | 0.008 | 0.013 | 0.023 | 0.002 | 0.019 |
| BLACK | 0.089 | 0.678 | 0.143 | 0.000 | 0.002 | 0.038 | 0.013 | 0.036 |
| BLACK | 0.022 | 0.617 | 0.287 | 0.012 | 0.000 | 0.045 | 0.001 | 0.016 |
| BLACK | 0.036 | 0.694 | 0.117 | 0.000 | 0.001 | 0.028 | 0.095 | 0.028 |
| BLACK | 0.079 | 0.778 | 0.078 | 0.004 | 0.003 | 0.024 | 0.027 | 0.008 |
| BLACK | 0.078 | 0.520 | 0.274 | 0.017 | 0.007 | 0.042 | 0.032 | 0.030 |
| SILVER | 0.317 | 0.128 | 0.462 | 0.000 | 0.039 | 0.040 | 0.001 | 0.013 |
| SILVER | 0.286 | 0.100 | 0.525 | 0.001 | 0.036 | 0.042 | 0.000 | 0.010 |
| SILVER | 0.166 | 0.074 | 0.668 | 0.003 | 0.014 | 0.022 | 0.011 | 0.041 |
| SILVER | 0.123 | 0.261 | 0.544 | 0.004 | 0.006 | 0.025 | 0.008 | 0.030 |
| SILVER | 0.154 | 0.289 | 0.490 | 0.006 | 0.004 | 0.037 | 0.004 | 0.016 |

F I G. 2 0

| | COLOR COMPONENTS | | | | | | | |
|---|---|---|---|---|---|---|---|---|
| | ①WHITE | ②BLACK | ③SILVER | ④RED | ⑤YELLOW | ⑥GREEN | ⑦BLUE | ⑧PURPLE |
| RED | 0.064 | 0.252 | 0.046 | 0.610 | 0.003 | 0.013 | 0.000 | 0.012 |
| RED | 0.239 | 0.210 | 0.063 | 0.425 | 0.005 | 0.044 | 0.003 | 0.010 |
| RED | 0.328 | 0.119 | 0.013 | 0.526 | 0.000 | 0.008 | 0.000 | 0.006 |
| RED | 0.229 | 0.091 | 0.043 | 0.611 | 0.000 | 0.006 | 0.000 | 0.020 |
| RED | 0.033 | 0.134 | 0.020 | 0.488 | 0.001 | 0.042 | 0.002 | 0.281 |
| YELLOW | 0.041 | 0.099 | 0.053 | 0.011 | 0.763 | 0.017 | 0.008 | 0.007 |
| YELLOW | 0.139 | 0.159 | 0.060 | 0.052 | 0.477 | 0.017 | 0.087 | 0.009 |
| YELLOW | 0.129 | 0.050 | 0.042 | 0.000 | 0.699 | 0.031 | 0.045 | 0.004 |
| YELLOW | 0.017 | 0.219 | 0.058 | 0.004 | 0.606 | 0.055 | 0.038 | 0.003 |
| YELLOW | 0.072 | 0.229 | 0.030 | 0.004 | 0.651 | 0.010 | 0.003 | 0.001 |
| GREEN | 0.087 | 0.143 | 0.153 | 0.000 | 0.000 | 0.605 | 0.004 | 0.007 |
| GREEN | 0.085 | 0.149 | 0.208 | 0.009 | 0.001 | 0.478 | 0.001 | 0.068 |
| GREEN | 0.051 | 0.255 | 0.167 | 0.003 | 0.004 | 0.435 | 0.080 | 0.004 |
| GREEN | 0.037 | 0.286 | 0.226 | 0.006 | 0.001 | 0.426 | 0.007 | 0.012 |
| GREEN | 0.157 | 0.106 | 0.069 | 0.002 | 0.001 | 0.660 | 0.002 | 0.002 |

FIG. 21

| | COLOR COMPONENTS | | | | | | | |
|---|---|---|---|---|---|---|---|---|
| | ①WHITE | ②BLACK | ③SILVER | ④RED | ⑤YELLOW | ⑥GREEN | ⑦BLUE | ⑧PURPLE |
| BLUE | 0.111 | 0.166 | 0.135 | 0.000 | 0.007 | 0.044 | 0.534 | 0.003 |
| BLUE | 0.045 | 0.291 | 0.116 | 0.001 | 0.003 | 0.041 | 0.494 | 0.007 |
| BLUE | 0.096 | 0.222 | 0.121 | 0.007 | 0.040 | 0.102 | 0.407 | 0.005 |
| BLUE | 0.094 | 0.270 | 0.059 | 0.006 | 0.029 | 0.049 | 0.491 | 0.001 |
| BLUE | 0.072 | 0.343 | 0.102 | 0.000 | 0.002 | 0.009 | 0.457 | 0.015 |
| PURPLE | 0.031 | 0.162 | 0.121 | 0.234 | 0.000 | 0.004 | 0.000 | 0.447 |
| PURPLE | 0.064 | 0.291 | 0.103 | 0.014 | 0.002 | 0.021 | 0.004 | 0.502 |
| PURPLE | 0.021 | 0.165 | 0.200 | 0.023 | 0.000 | 0.037 | 0.016 | 0.538 |
| PURPLE | 0.060 | 0.231 | 0.115 | 0.034 | 0.030 | 0.027 | 0.012 | 0.490 |
| PURPLE | 0.066 | 0.236 | 0.118 | 0.052 | 0.006 | 0.083 | 0.028 | 0.412 |

FIG. 22

| CAR BODY COLOR | STANDARD COLORS (TOP THREE COLORS) | | |
|---|---|---|---|
| WHITE | WHITE | SILVER | BLACK |
| BLACK | BLACK | SILVER | WHITE |
| SILVER | SILVER | WHITE | BLACK |
| RED | RED | WHITE | BLACK |
| YELLOW | YELLOW | BLACK | WHITE |
| GREEN | GREEN | BLACK | SILVER |
| BLUE | BLUE | BLACK | SILVER |
| PURPLE | PURPLE | BLACK | SILVER |

FIG. 23

| CAR BODY COLOR | RATES CORRESPONDING TO RESPECTIVE DIMENSION COLORS IN SPACE 2 | | |
|---|---|---|---|
| | WHITE | BLACK | RED |
| WHITE | 0.528 | 0.154 | 0.013 |
| | 0.418 | 0.146 | 0.002 |
| | 0.495 | 0.141 | 0.002 |
| | 0.468 | 0.152 | 0.002 |
| | 0.528 | 0.160 | 0.008 |
| BLACK | ... | ... | ... |
| SILVER | ... | ... | ... |
| RED | ... | ... | ... |
| YELLOW | ... | ... | ... |
| ... | ... | ... | ... |

F I G. 24

| NAME OF COLOR SPACE | CLASSIFIED COLORS OF DIMENSIONS | NAME OF CLUSTER (CORRESPONDING DESIGNATED COLOR) | COORDINATES OF BARYCENTER OF CLUSTER |
|---|---|---|---|
| SPACE1 | WHITE, BLACK, SILVER | WHITE | (WHITE, BLACK, SILVER) = (0.5, 0.15, 0.3) |
| | | BLACK | (WHITE, BLACK, SILVER) = (0.08, 0.6, 0.3) |
| | | SILVER | (WHITE, BLACK, SILVER) = (0.2, 0.2, 0.55) |
| | | OTHER | ⋮ |
| SPACE2 | WHITE, BLACK, RED | WHITE | ⋮ |
| | | BLACK | ⋮ |
| | | RED | ⋮ |
| | | OTHER | ⋮ |
| SPACE3 | WHITE, BLACK, YELLOW | WHITE | ⋮ |
| | | BLACK | ⋮ |
| | | YELLOW | ⋮ |
| | | OTHER | ⋮ |
| ⋮ | ⋮ | ⋮ | ⋮ |

FIG. 25

| WHITE | BLACK | SILVER | RED | YELLOW | GREEN | BLUE | PURPLE |
|---|---|---|---|---|---|---|---|
| 0.528 | 0.154 | 0.259 | 0.013 | 0.008 | 0.018 | 0.003 | 0.017 |

FIG. 26

| NAME OF COLOR SPACE | NAME OF CLUSTER (CORRESPONDING DESIGNATED COLOR) | BARYCENTER COODINATES OF CLUSTER | RATES OF CLASSIFIED COLORS OF RECOGNITION TARGET IMAGE | SHORTEST DISTANCE CLUSTER |
|---|---|---|---|---|
| SPACE1 | WHITE | (WHITE, BLACK, SILVER) = (0.5, 0.15, 0.3) | (WHITE, BLACK, SILVER) = (0.528, 0.154, 0.259) | WHITE |
| | BLACK | (WHITE, BLACK, SILVER) = (0.08, 0.6, 0.3) | | |
| | SILVER | (WHITE, BLACK, SILVER) = (0.2, 0.2, 0.55) | | |
| | OTHER | ⋮ | | |
| SPACE2 | WHITE | ⋮ | (WHITE, BLACK, RED) = (0.528, 0.154, 0.013) | WHITE |
| | BLACK | ⋮ | | |
| | RED | ⋮ | | |
| | OTHER | ⋮ | | |
| ⋮ | | | ⋮ | ⋮ |

FIG. 27

| RECOGNITION TARGET IMAGE | COLOR SPACE 1 | COLOR SPACE 2 | COLOR SPACE 3 | COLOR SPACE 4 | COLOR SPACE 5 | COLOR SPACE 6 |
|---|---|---|---|---|---|---|
| SHORTEST DISTANCE CLUSTER | WHITE | WHITE | WHITE | SILVER | OTHER | OTHER |

F I G. 2 8

| DIMENSION NUMBER | RECOGNIZED /TOTAL | RECOGNITION RATE |
|---|---|---|
| 1 | 159/225 | 69.33% |
| 2 | 157/225 | 67.11% |
| 3 | 178/225 | 79.11% |
| 4 | 125/225 | 55.55% |

FIG. 29

| NAME OF IMAGE | RATE OF CLASSIFIED COLOR | | | | | | | | |
|---|---|---|---|---|---|---|---|---|---|
| | WHITE | BLACK | SILVER | RED | YELLOW | GREEN | BLUE | PURPLE |
| IMAGE1 | 0.528 | 0154 | 0.259 | 0.013 | 0.008 | 0.018 | 0.003 | 0.017 |
| IMAGE2 | 0.418 | 0.146 | 0.332 | 0.002 | 0.049 | 0.051 | 0.001 | 0.002 |
| IMAGE3 | 0.064 | 0.252 | 0.046 | 0.610 | 0.003 | 0.013 | 0.000 | 0.012 |

COLOR CLASSIFICATION METHOD, COLOR RECOGNITION METHOD, COLOR CLASSIFICATION APPARATUS, COLOR RECOGNITION APPARATUS, COLOR RECOGNITION SYSTEM, COMPUTER PROGRAM, AND RECORDING MEDIUM

This application is a continuation of PCT International application Number PCT/JP2007/063102 which has an international filing date of Jun. 29, 2007, which designated the Untied States of America.

FIELD

The embodiments discussed herein relate to a color recognition method for recognizing a color of a predetermined target region in an image by a clustering method.

BACKGROUND

As a first background technique of the present technique, an image region classification apparatus is disclosed in Patent Document 1. The image region classification apparatus according to the first background technique includes histogram creating means for creating a histogram of an image at a lattice point in color space with each color component as an axis on the basis of the image constituted by a plurality of color components, histogram displaying means for displaying the histogram created by the histogram creating means, by an object of a size corresponding to a histogram value, and cluster classifying means for classifying all the lattice points of the histogram created by the histogram creating means using a plurality of representative values.

According to the image region classification apparatus of the first background technique, since the histogram of an image is created in the lattice points in the color space with each color component as the axis on the basis of the image to be classified, and this histogram is displayed by the object of a size corresponding to the histogram value, the histogram value in the color space can be visually recognized by an operator, so that the operator can set cluster classification adjusted suitably with reference to the displayed object, and appropriate and prompt color classification can be performed.

As a second background technique of the present technique, an image processing method is disclosed in Patent Document 2. The image processing method of the second background technique is an image processing method for calculating a parameter to classify at least a portion of pixels in an input image to a cluster having a similar hue, and the method includes the steps of: clustering at least the portion of the pixels in the input image based on its color difference; calculating hue values of the pixels; clustering the hue values of the pixels by dividing a hue circle representing a hue into a variable division number of division clusters, and varying a range of the hue value corresponding the division cluster by rotating the divided hue circle at a variable rotation angle; calculating an evaluation value based on the result of the clustering; determining the parameter by varying the division number and the rotation angle to optimize the evaluation value; and reclassifying the clustering result corresponding to the color difference based on the parameter. According to the image processing method of the second background technique, tuning is not required, and color image segmentation close to a human sense can be performed.

As a third background technique of the present technique, a pattern recognition system is disclosed in Patent Document 3. The pattern recognition system in the third background technique includes pattern data obtaining means for obtaining a state of a pattern to be recognized, input data editing means for forming a cluster showing a state of a feature region of data distribution obtained by the pattern data obtaining means, based on this distribution, feature vector extracting means for extracting a feature vector showing the feature in the cluster formed by the input data editing means of the data obtained by the pattern data obtaining means, wherein the pattern is recognized by comparing a feature vector extracted by the feature vector extracting means at a learning stage, with the feature vector extracted by the feature vector extracting means from the portion in the cluster generated by the input data editing means at the learning stage in the data distribution obtained by the pattern data obtaining means at a recognition stage. The pattern recognition system includes cluster adjusting means for varying the state of the cluster formed by the input data editing means at the learning stage according to the variation of the data distribution obtained by the pattern data obtaining means at the recognition stage.

According to the pattern recognition system of the third background technique, even when the data state is varied due to the influence of the environmental change in spite of the fact that the learned pattern is attempted to be recognized at the time of pattern recognition to recognize the learned pattern, the collection state of the data can be varied based on the environmental change, so that the pattern can be recognized without performing a relearning process even when the environment is changed.

[Patent Document 1] Japanese Laid-Open Patent Publication No. 2002-190018
[Patent Document 2] Japanese Patent No. 3708042
[Patent Document 3] Japanese Patent No. 3025986

SUMMARY

There is provided a color classification method according to an aspect, comprising: determining a plurality of predetermined process target regions from a plurality of pickup images taken by an imaging device; calculating a plurality of color distributions of pixels contained in the respective determined process target regions; and forming a plurality of clusters by executing a clustering process based on the calculated color distributions for the pickup images, the method being for classifying a plurality of colors with respect to the respective formed clusters, the calculating step including: classifying the pixels contained in the process target region into predetermined classified colors; and calculating a plurality of rates of the respective classified colors, the forming step including: extracting predetermined number of the classified colors, whose calculated rates are highest in the calculated plurality of the rates, from among the predetermined classified colors, in the process target region of each pickup image; defining a plurality of color spaces, dimensions of each of which are selected from the predetermined number of the extracted classified colors, the dimensions having domains corresponding to the respective rates of the selected classified colors; specifying a plurality of sets of coordinates for each pickup image in respective color spaces based on the rates of the classified colors; and clustering the specified plurality sets of the coordinates in the respective color spaces into the predetermined number or more of the clusters. Moreover, there is provided a color classification apparatus according to an aspect, comprising: a determining unit determining a plurality of predetermined process target regions from a plurality of pickup images taken by an imaging device; a calculating unit calculating a plurality of color distributions of pixels contained in the respective determined process target regions;

and a forming unit forming a plurality of clusters by executing a clustering process based on the calculated color distributions for the pickup images, the apparatus being for classifying a plurality of colors with respect to the respective formed clusters, the calculating unit including: a unit classifying the pixels contained in the process target region into predetermined classified colors; and a unit calculating a plurality of rates of the respective classified colors, the forming unit including: a unit extracting predetermined number of the classified colors, whose calculated rates are highest in the calculated plurality of the rates, from among the predetermined classified colors, in the process target region of each pickup image; a unit defining a plurality of color spaces, dimensions of each of which are selected from the predetermined number of the extracted classified colors, the dimensions having domains corresponding to the respective rates of the selected classified colors; a unit specifying a plurality of sets of coordinates for each pickup image in respective color spaces based on the rates of the classified colors; and a unit clustering the specified plurality of sets of the coordinates in the respective color spaces into the predetermined number or more of the clusters.

There is provided a color recognition method according to an aspect, comprising: determining a plurality of predetermined process target regions from a plurality of pickup images taken by an imaging device, the pickup images having designated colors; calculating a plurality of color distributions of pixels contained in the respective determined process target regions; forming a plurality of clusters with respect to the respective designated colors in the pickup images by executing a clustering process based on the calculated color distributions for the pickup images; executing a learning process including the determining step, the calculating step and the forming step preliminarily; executing the determining step and the calculating step for a recognition target image as the pickup image; and determining, based on a color distribution calculated for the recognition target image, which cluster the process target region is attributed to among the formed plurality of clusters with respect to the respective designated colors, the method being for recognizing a color of the process target region in the recognition target image, the calculating step in the learning process including: classifying the pixels contained in the process target region into predetermined classified colors; and calculating a plurality of rates of the respective classified colors, the forming step in the learning process including: extracting predetermined number of the classified colors, whose calculated rates are highest in the calculated plurality of the rates, from among the predetermined classified colors, in the process target region of each pickup image; defining a plurality of color spaces, dimensions of each of which are selected from the predetermined number of the extracted classified colors, the dimensions having domains corresponding to the respective rates of the selected classified colors; and specifying a set of coordinates of each designated color in each color space based on the calculated rates of the classified colors for each pickup image having the designated colors; and forming a cluster concerning the set of the coordinates for each designated color specified in each color space as the cluster of each designated color in each color space. Moreover, there is provided a color recognition apparatus according to an aspect, comprising: a first determining unit determining a plurality of predetermined process target regions from a plurality of pickup images taken by an imaging device, the pickup images having designated colors; a calculating unit calculating a plurality of color distributions of pixels contained in the respective determined process target regions; a forming unit forming a plurality of clusters with respect to the respective designated colors in the pickup images by executing a clustering process based on the calculated color distributions for the pickup images; a unit determining, for a recognition target image as the pickup image, a process target region of the recognition target image as the pickup image by the first determining unit and calculating a color distributions of pixels contained in the determined process target region the recognition target image as the pickup image by the calculating unit; and a second determining unit determining, based on the color distribution calculated for the recognition target image as the pickup image, which cluster the process target region is attributed to among the formed plurality of clusters with respect to the respective designated colors, the apparatus being for recognizing a color of the process target region in the recognition target image, the calculating unit including: a unit classifying the pixels contained in the process target region into predetermined classified colors; and a unit calculating a plurality of rates of the respective classified colors, and the forming unit including: a unit extracting predetermined number of the classified colors, whose calculated rates are highest in the calculated plurality of the rates, from among the predetermined classified colors, in the process target region of each pickup image; a unit defining a plurality of color spaces, dimensions of each of which are selected from the predetermined number of the extracted classified colors, the dimensions having domains corresponding to the respective rates of the selected classified colors; a unit specifying a set of coordinates of each designated color in each color spaces based on the calculated rates of the classified colors for each pickup image having the designated colors; and a unit forming a cluster concerning the set of the coordinates for each designated color specified in each color space as the cluster of each designated color in each color space. In addition, there is provided a color recognition system according to an aspect, comprising: a color classification apparatus including: a determining unit determining a plurality of predetermined process target regions from a plurality of pickup images taken by an imaging device; a calculating unit calculating a plurality of color distributions of pixels contained in the respective determined process target regions; and a forming unit forming a plurality of clusters by executing a clustering process based on the calculated color distributions for the pickup images, the color classification apparatus being for classifying a plurality of colors with respect to the respective formed clusters, a color recognition apparatus including: a unit making the same distinction and calculation as the determining unit and the calculating unit with respect to a recognition target image; and a unit recognizing a color of the process target region in the recognition target image based on the calculated plurality of color distributions, the color recognition system being for selecting the color classified by the color classification apparatus and recognizing the color by the color recognition apparatus, the calculating unit of the color classification apparatus including: a unit classifying the pixels contained in the process target region into predetermined classified colors; and a unit calculating a plurality of rates of the respective classified colors, the forming unit of the color classification apparatus including: a unit extracting predetermined number of the classified colors, whose calculated rates are highest in the calculated plurality of the rates, from among the predetermined classified colors, in the process target region of each pickup image; a unit defining a plurality of color spaces, dimensions of each of which are selected from the predetermined number of the extracted classified colors, the dimensions having domains corresponding to the respective rates of the selected classified colors; a unit specifying a plurality of sets of coordinates for each pickup image in respective color spaces based on the rates of the classified colors; and a unit clustering the specified plurality of sets of the coordinates in the respective color spaces into the predetermined number or more of the clusters, the color recognition apparatus including: a unit obtaining information of the plurality of the color spaces defined by the color classification apparatus and the clusters formed in each color space; a unit specifying the coordinates in each color space based on the calculated rates of the classified colors for the recognition target image and the obtained information of each color space; a unit calculating a distance between the specified coordinates and the barycenter of the cluster formed in each color space; a unit specifying the cluster having the shortest distance for each color space; and a selecting unit selecting one color from the colors classified so as to be related to the specified cluster as a recognized color, the color recognition apparatus recognizing the recognized color selected by the selecting unit as a color of the process target region in the recognition target image.

BRIEF DESCRIPTION OF DRAWINGS

FIG. 2 is an explanatory diagram showing a shooting environment according to Embodiment 1.

FIG. 11 is an image view showing clusters formed in each color space according to Embodiment 1.

FIG. 12 is an explanatory diagram showing an example of contents of determination standards when a CPU of the color recognition apparatus in Embodiment 1 recognizes a color.

FIG. 17 is an explanatory diagrams showing an example of contents of classified colors when the color recognition method according to Embodiment 1 is performed.

FIG. 18 is an explanatory diagram showing an example of contents of rates of the classified colors of pixels contained in a process target region when the color recognition method according to Embodiment 1 is performed.

FIG. 19 is an explanatory diagram showing an example of contents of learning pickup images and rates of classified colors of pixels contained in process target regions when the color recognition method according to Embodiment 1 is performed.

FIG. 20 is an explanatory diagram showing the example of the contents of the learning pickup images and the rates of the classified colors of the pixels contained in the process target regions when the color recognition method according to Embodiment 1 is performed.

FIG. 21 is an explanatory diagram showing the example of the contents of the learning pickup images and the rates of the classified colors of the pixels contained in the process target regions when the color recognition method according to Embodiment 1 is performed.

FIG. 22 is an explanatory diagram showing an example of contents of reference colors corresponding to dimensions of a color space when the color recognition method according to Embodiment 1 is performed.

FIG. 23 is an explanatory diagram showing an example of contents of coordinates of the learning pickup image specified in one color space by the CPU of the color recognition apparatus, in a clustering process in the color recognition method in the embodiment.

FIG. 24 is an explanatory diagram showing an example of contents of clusters formed by the clustering process in the color recognition method in the embodiment in each color space and barycenter coordinates of the clusters.

FIG. 25 is an explanatory diagram showing an example of contents of rates of classified colors of pixels contained in a process target region of a recognition target image in a recognition process in the color recognition method according to the embodiment.

FIG. 26 is an explanatory diagram showing an example in which a shortest distant cluster is specified in each color space based on the rate of the classified color of the recognition target image in the recognition process in the color recognition method according to the embodiment.

FIG. 27 is an explanatory diagram showing an example in which a recognized color is selected from the shortest distant cluster corresponding to the recognition target image in the recognition process in the color recognition method according to the embodiment.

FIG. 28 is an explanatory diagram showing a recognition result in the color recognition method according to the embodiment.

FIG. 29 is an explanatory diagram showing an example of contents of relearning information recorded by the color recognition method according to the embodiment.

DESCRIPTION OF THE REFERENCE NUMERALS

Figure 1:
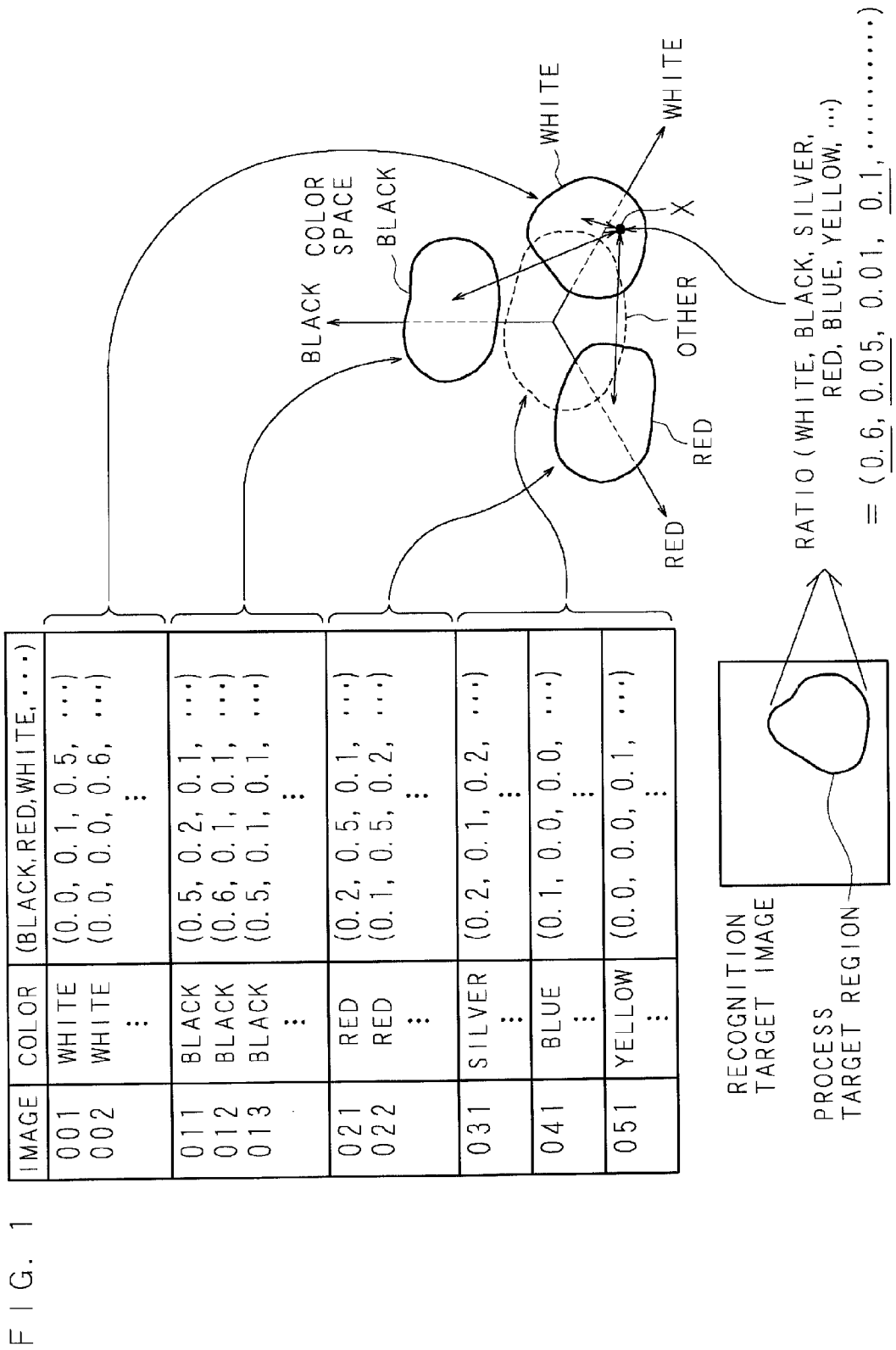
FIG. 1 is an explanatory diagram schematically showing the outline of a color recognition method according to an embodiment.

| | |
|---|---|
| 10 | IMAGING DEVICE |
| 200, 400 | COLOR RECOGNITION APPARATUS |
| 210, 410, 510 | CPU (PROCESSOR) |
| 211 | INPUT MEANS |
| 212 | TARGET REGION DETERMINING MEANS |
| 213 | COLOR CLASSIFYING MEANS |
| 214 | NORMALIZING MEANS |
| 215 | CLUSTERING MEANS |
| 216 | DISTANCE CALCULATING MEANS |
| 217 | RECOGNITION RESULT DETERMINING MEANS |
| 218 | OUTPUT MEANS |
| 219 | UNLEARNED DATA EXTRACTING MEANS |
| 220, 420, 520 | MEMORY |
| 230, 430, 530 | HARD DISK (HD) |
| 231 | CLUSTER INFORMATION |
| 232 | DISTANCE INFORMATION |
| 233 | RECOGNIZED COLOR INFORMATION |
| 234 | RELEARNING INFORMATION |
| 235 | DETERMINATION STANDARD |
| 240, 540 | DISPLAY |
| 280, 580 | CD-ROM DRIVE |
| 281, 581, 582 | RECORDING MEDIUM |
| 2P, 4P | COLOR RECOGNITION PROGRAM |
| 5P | LEARNING PROGRAM |
| 30 | MANAGEMENT COMPUTER |
| 500 | LEARNING DEVICE (CLASSIFICATION APPARATUS) |

DESCRIPTION OF EMBODIMENTS

Embodiments will be described with reference to the drawings illustrating the embodiments in detail hereinafter. In addition, the embodiments can be implemented in many different forms. Therefore, it is to be noted that the disclosure here does not limit embodiments to the following description of the embodiments. In addition, the same reference numerals are allotted to the same components throughout the embodiments.

However, according the image region classification apparatus of the first background technique, it is necessary for the operator to visually recognize the histogram value in the color space and set the clustering while referring to the displayed object, the problem is that it takes a lot of time and labor for the operator to set the clustering. When there are many images to be processed, the situation is even worse. In addition, since it is necessary for the operator to set the clustering while visually referring to the histogram value, the operator is required to be sufficiently skilled for it.

In addition, according to the image processing method of the second background technique, although the image created on the computer can be automatically clustered with high accuracy without requiring the operation of the operator, the pickup image (especially taken outdoors) has a pixel value that is different from that of the original object color due to the influence of the shooting environment, such as a pickup image affected by back light or a shadow cast on the target object, the problem is that such a pickup image cannot be appropriately clustered. The image region classification apparatus of the first background technique also has this problem.

Furthermore, according to the pattern recognition method of the third background technique, since there is provided cluster adjusting means for varying the cluster generated by a learning process based on the variation of the data distribution at the time of use, the pattern can be recognized without requiring a relearning process even when the environment is changed. However, the problem is that the environmental change that can be dealt with by the cluster adjusting means is limited.

The present embodiment was made in view of the above problems, and it is an object of the present embodiment to provide a color classification method and a color classification apparatus for clustering a color of a target region in a pickup image based on a distribution rate of a predetermined classified color and several colors having high classification ratio constituting the distribution rate, so that clusters can be efficiently separated, the color can be classified into colors corresponding to the various shooting conditions, and a new color can be classified by forming a new cluster.

In addition, it is another object of the present embodiments to provide a color recognition method, a color recognition apparatus, a color recognition system, a computer program, and a recording medium in which a color of a target region in a pickup image is clustered so as to be related to a designated color by the above color classification method in a learning process, and then a color of a target region in an image can be identified so as to be related to different shooting conditions based on an environmental change, with respect to many pickup images.

It is still another object of the present embodiments to provide a color recognition method capable of reducing a recognition error and increasing a recognition rate by employing a constitution in which when a predetermined number of classified colors are extracted in descending order of rate by the above color recognition method to define a color space in which the classified colors correspond to dimensions, the predetermined number is top three colors.

In addition, it is still another object of the present embodiments to provide a color recognition method capable of recognizing a color with high accuracy by employing a constitution in which when the cluster cannot be separated, the color can be recognized as another color.

In addition, it is still another object of the present embodiments to provide a color recognition method capable of recognizing a color with high accuracy by employing a constitution in which a cluster is determined by a color distribution of a process target region in a recognition target image and a distance from the barycenter of the cluster responding to various classified colors even in the same color is calculated, and a recognized color is selected based on various determination conditions such as the shortest distance, the frequency of a designated color corresponding to the shortest distant cluster, and the kind of the corresponding designated color.

Furthermore, it is still another object of the present embodiments to provide a color recognition method capable of recognizing a color with high accuracy in view of a variation in coordinates constituting a cluster by employing a constitution in which the distance from the barycenter of the cluster is calculated by means of Mahalanobis distance.

In addition, it is still another object of the present embodiments to provide a color recognition method capable of classifying a color to a new color affected by different shooting conditions and thereby capable of recognizing a new color, and reducing recognition errors by employing a constitution in which when it is not clear to which cluster a color distribution of a process target region of a recognition target image corresponds, it is recorded for relearning.

In addition, it is still another object of the present embodiments to provide a color recognition method capable of classifying a color to a new color affected by various shooting conditions and recognizing a new color by employing a constitution in which colors are reclassified by the above-described color classification method with respect to recognition target images that are recorded because it is not clear to which cluster they belong, and depending on circumstances, a designated color is received to learn the classified color.

FIG. 1 is an explanatory diagram schematically showing the outline of a color recognition method according to this embodiment. The explanatory diagram of FIG. 1 shows clusters formed by performing a clustering process based on rates of pixel colors contained in a process target region in a learning pickup image, and the table shows data of the pickup image used in clustering, a color of the image in the process target region, and the rates of the pixel colors. The cluster is formed by clustering a coordinate group corresponding to the rates of the colors of each pickup image, in a color space in which, for example, three colors are allotted to dimensions and the rate of each color is provided in a dimensional direction. Each cluster is related to the colors of the process target region in the image, and the colors of the process target region are thereby classified based on a color distribution.

The explanatory diagram of FIG. 1 shows an example in which the clusters are formed by the coordinate groups corresponding to the rates of the colors of the process target regions of the images in the color space in which white, black, and red are allotted to dimensions. A black cluster is formed in the vicinity of the black axis by a coordinate group corresponding to images recognized as black, a red cluster is formed in the vicinity of the red axis by a coordinate group corresponding to images recognized as red, and similarly a white cluster is formed in the vicinity of the white axis by a coordinate group corresponding to images recognized as white. In the color space in which dimensions are white, blocks and red, coordinate groups corresponding to images recognized as silver, blue, and yellow having less components of white, black, and red are collected in the vicinity of the original without being separated from one another and formed as "other" color cluster.

In addition, an example of contents of the process target region of the image whose color is to be recognized and the rates of the pixel colors contained in the process target region is shown in the explanatory diagram of FIG. 1. Coordinates corresponding to the process target region of the recognition target image, that is, for example, coordinates X is specified in the color space having block, white, and red dimensions, a distance between the coordinates X and a barycenter of each cluster is calculated, and the color of the cluster having the shortest distance, that is, "white" in the explanatory diagram in FIG. 1, is recognized as a recognized color.

Thus, the colors corresponding to the learning pickup images are clustered and classified, and when the color recognition is carried out, the distance between the coordinates specified by the rates of the colors in the process target region of the image subjected to recognition and the barycenter of the cluster corresponding to each color is calculated, and the color corresponding to the cluster having the shortest distance is basically recognized as the recognized color. According to the present embodiment, the color is recognized by the color recognition method shown in the explanatory diagram of FIG. 1, whereby the color can be recognized accurately without being affected by the imaging condition.

A system constitution such as a hardware, a specific process and a specific example required in the color recognition method in this embodiment shown in the explanatory diagram of FIG. 1 will be described in Embodiments 1 and 2. In addition, in the color recognition method according to this embodiment, as described above, it is necessary to perform the learning process in which the colors of the process target region in the pickup image are classified based on color distributions using the learning pickup image previously and its information is stored. In addition, according to the color recognition method in this embodiment, relearning can be performed by collecting the recognition target images in which the color determination is not clear when the color is recognized and based on it, classifying the color again. Thus, the learning process, recognition process and the relearning process are separately described in Embodiments 1 and 2.

In addition, although the system is described mainly in the following Embodiments 1 and 2, the embodiments can be applied to a program and a method that can be used in a computer as will be understood by the skilled person. In addition, the embodiments can be applied to embodiments of a hardware, a software, and the software and the hardware. The program can be recorded in any computer-readable medium such as a hard disk, a CD-ROM, a DVD-ROM, an optical storage device or a magnetic-storage device. Furthermore, the program can be recorded in another computer connected through the network.

(Embodiment 1)

[1. System Constitution]

FIG. 2 is an explanatory diagram showing a shooting environment in Embodiment 1. According to Embodiment 1, an imaging device 10 is arranged on the side of a road laid in a commercial facility, and a color recognition apparatus 200 is set in a management office in the commercial facility. An image taken by the imaging device 10 arranged at each of entrances in the commercial facility is transmitted to the color recognition apparatus 200 through a communication line connecting the imaging device 10 to the color recognition apparatus 200, and the color recognition apparatus 200 analyzes the received image to be recognized and recognizes a color of a car in the image and outputs it. A manager collects the car colors outputted from a management computer 30 operated by the manager. The car colors collected by the management computer 30 may be used in marketing and the like. In addition, the imaging device 10 is arranged at each of the entrances in the commercial facility and takes the image of the car entering into the commercial facility.

Figure 3:
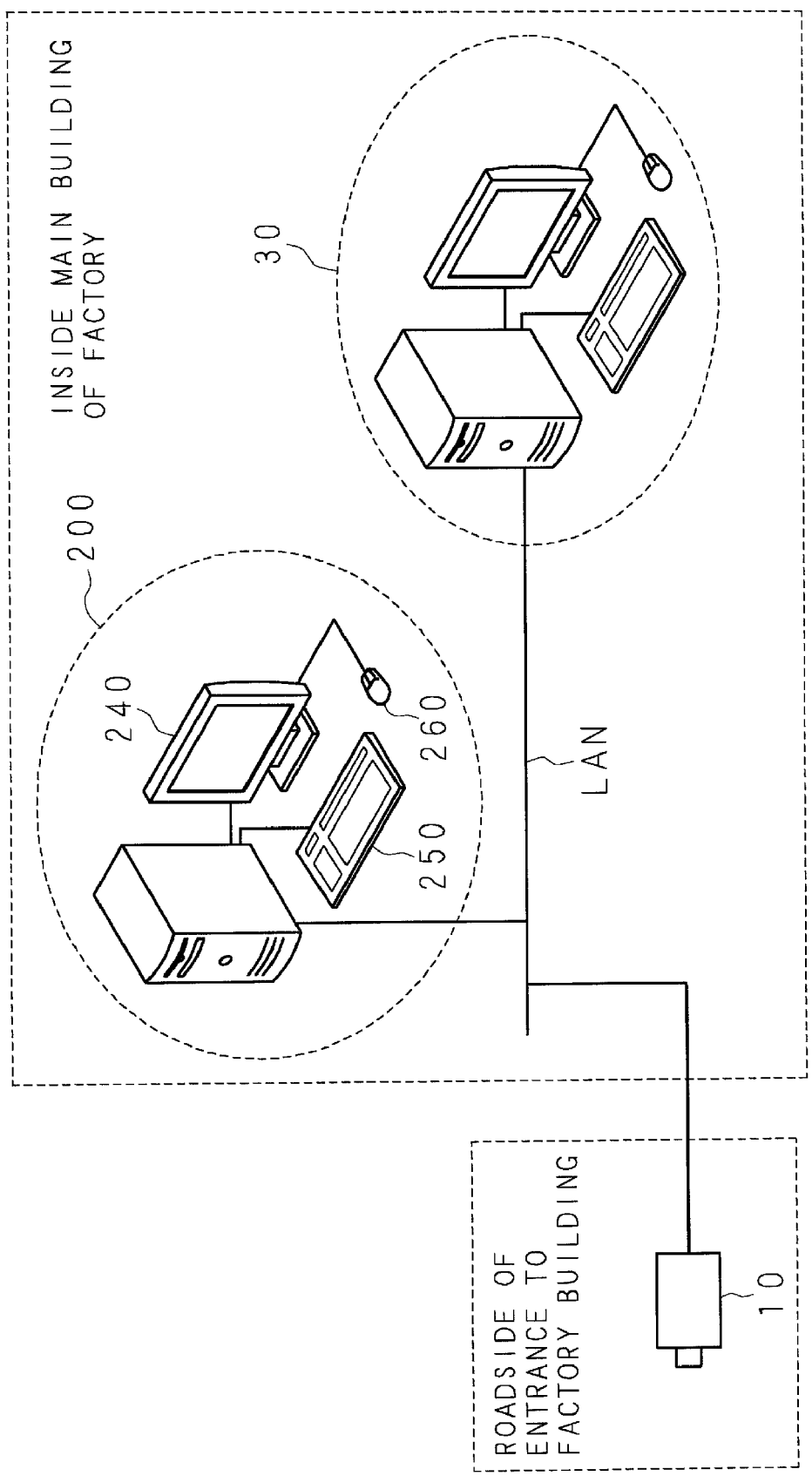
FIG. 3 is a system configuration diagram according to Embodiment 1.
Figure 4:
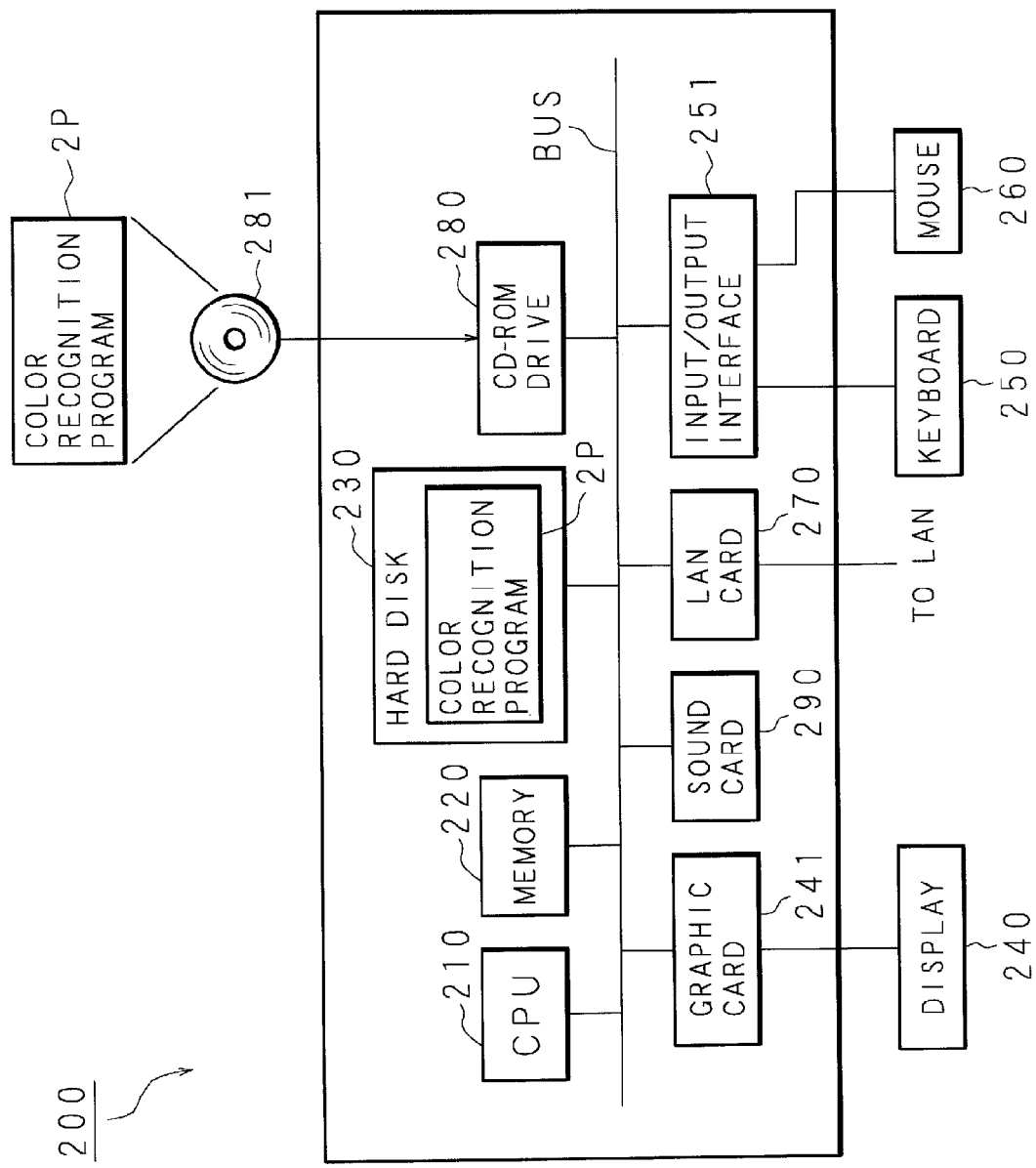
FIG. 4 is a hardware configuration diagram showing a color recognition apparatus according to Embodiment 1.

FIG. 3 is a view showing a system configuration in Embodiment 1, and FIG. 4 is a view showing a hardware configuration of the color recognition apparatus 200 in Embodiment 1. The hardware configuration of the color recognition apparatus 200 is a configuration of a personal computer and includes a CPU (Central Processing Unit) 210, a memory 220 such as a DRAM (Dynamic Random Access Memory), a hard disk (referred to as HD hereinafter) 230 serving as an external storage device, a display 240 serving as a display device, a keyboard 250 and a mouse 260 serving an input device, a LAN card 270 serving as an expansion card to be connected to the network, a CD-ROM (DVD (Digital Versatile Disk)) drive 280, and a sound card 290 to be connected to a speaker. The keyboard 250 and the mouse 260 are connected to the CPU 210 through an I/O interface 251.

The color recognition apparatus 200 executes the installation in which a color recognition program 2P stored in a recording medium 281 such as a CD-ROM and a DVD, or a color recognition program 2P transmitted from another computer through the network is duplicated in the HD 230 of the computer and stored in the memory 220 so as to be appropriately read out, and the color recognition apparatus 200 is constituted by a general computer. In addition, instead of the general computer, the color recognition apparatus 200 may be constituted by a specialized hardware for the color recognition process. More specifically, the color recognition apparatus 200 can be constituted by a system LSI together with a plurality of LSI such as memories by mounting a logic of the color recognition apparatus 200 on an ASIC (Application Specific IC). The hardware configuration of the management computer 30 is a configuration of a general computer similar to the color recognition apparatus 200. Here, the color recognition apparatus 200 and the management computer 30 can be put together on the same computer.

Figure 5:
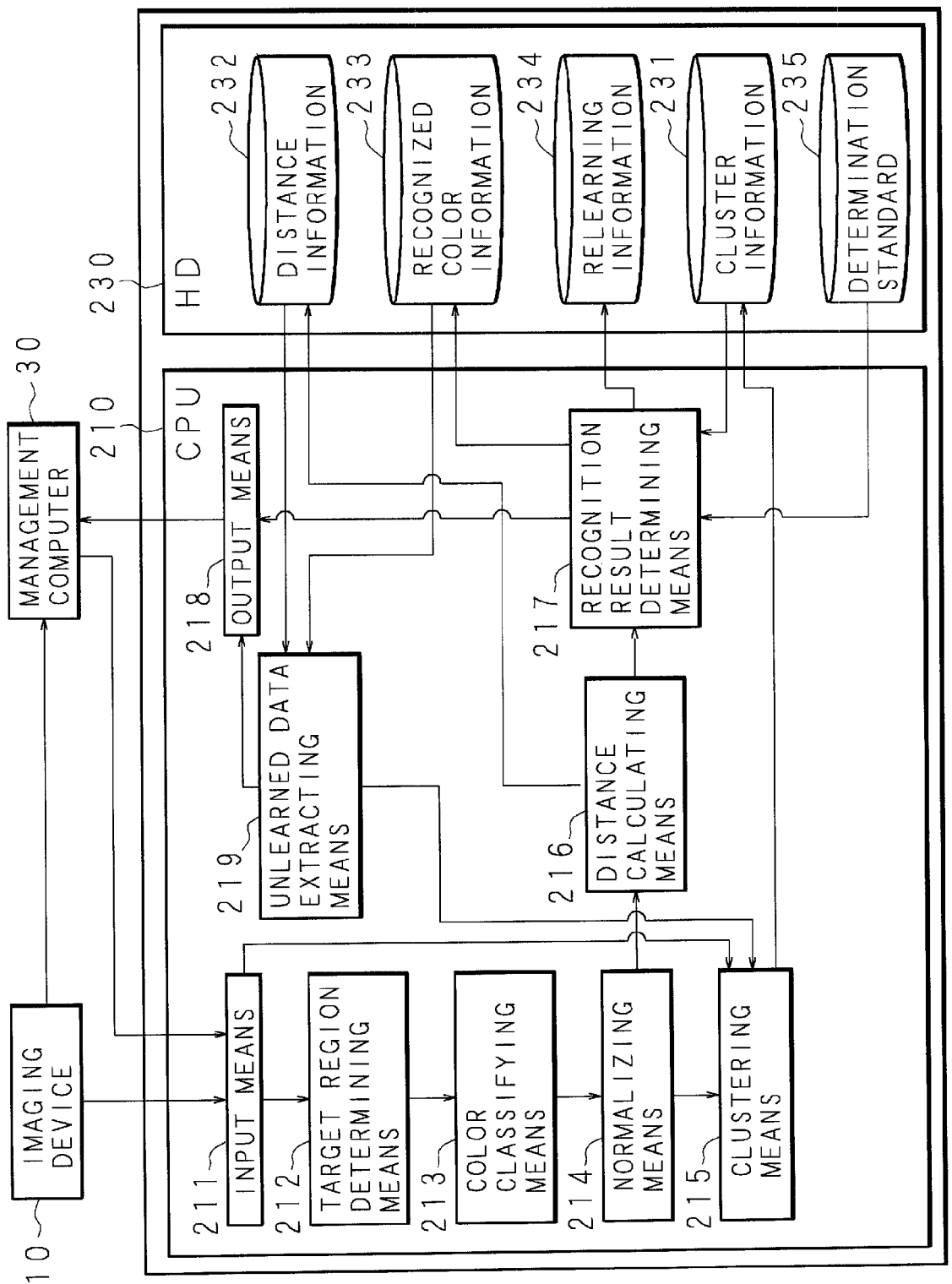
FIG. 5 is a functional block diagram showing the color recognition apparatus according to Embodiment 1.

FIG. 5 is a functional block diagram showing the color recognition apparatus 200 in Embodiment 1. The CPU 210 of the color recognition apparatus 200 functions as inputting means 211, target region determining means 212, color classifying means 213, normalizing means 214, clustering means 215, distance calculating means 216, recognition result determining means 217, output means 218 and unlearned data extracting means 219, by reading the color recognition program 2P from the HD 230 into the memory 220 appropriately. In addition, when the CPU 210 functions as each means, cluster information 231, distance information 232, recognized color information 233 and relearning information 234 are stored in the HD 230. A determination standard 235 serving as a standard when the color is recognized is stored in the HD 230.

The input means 211 has a function to take in data from the imaging device 10 and the management computer 30. It takes in an image taken by the imaging device 10 from the imaging device 10, and receives an image belonging to the management computer 30 and a user designated color inputted to the above image by a user as an operator of the management computer 30, from the management computer 30. The image taken in from the imaging device 10 to the color recognition apparatus 200 is a recognition target image and among the images taken by the same imaging device 10, the image received by the color recognition apparatus 200 together with the designated color through the management computer 30 is the learning image to classify the color.

The target region determining means 212 has a function to determine a region of a process target (process target region) in the image. Here, since the function to determine the process target region of the predetermined target in the image has been a well-known technique in an imaging process, its description will be omitted. In general, the technique is also called segmentation and uses a region division method, edge detection method and the like. The process target region in Embodiment 1 a bonnet part of a car as will be described below.

The color classifying means 213 has a function to classify pixel images contained in the process target region into predetermined classified colors. Although the user designated color is the same as the classified color as will be described below in Embodiment 1, they may be different from each other. It is preferable that the pixel color is converted from the RGB color system to the HSI color system before the process performed by the color classifying means 213, and the converted pixel colors are classified to the classified color by the color classifying means 213 because the colors can be accurately classified in the HSI color system as compared with the case where the colors are classified in the RGB color system.

The normalizing means 214 has a function to normalize a color classified result of the plurality of process target regions so as to be usable without depending on the pixel number contained in each process target region. According to Embodiment 1, the rate of the pixel number of each classified color contained in the process target region is calculated. More specifically, the rate is calculated by dividing the pixel number of each classified color by the pixel number contained in the process target region (pixel number in the determined region).

The clustering means 215 has a function to execute the clustering with the rate of the pixel number of the classified color in each process target region as target data. In other words, short distant data (coordinate group) are collectively grouped in a feature space. The feature space is the color space in which the classified color is allotted to each dimension and the rate of the pixel number of the classified color is provided in the dimensional direction. Here, although the color space is a multidimensional space having the number of the classified colors, according to Embodiment 1, the color space is defined such that the number of dimensions is three. The coordinate axes in each color space correspond to top three classified colors having high pixel number or rate in the process target image at the time of learning. Therefore, the three-dimensional space having the same top three classified colors is the same space. In addition, k-means method is used in the clustering (k-means method will be described below in detail), and the cluster number in each color space is four including three classified colors corresponding to the dimensions and other colors. However, the cluster number in each color space is not limited to four, and it may be another number or increased at the time of relearning as will be described below.

Figure 6:
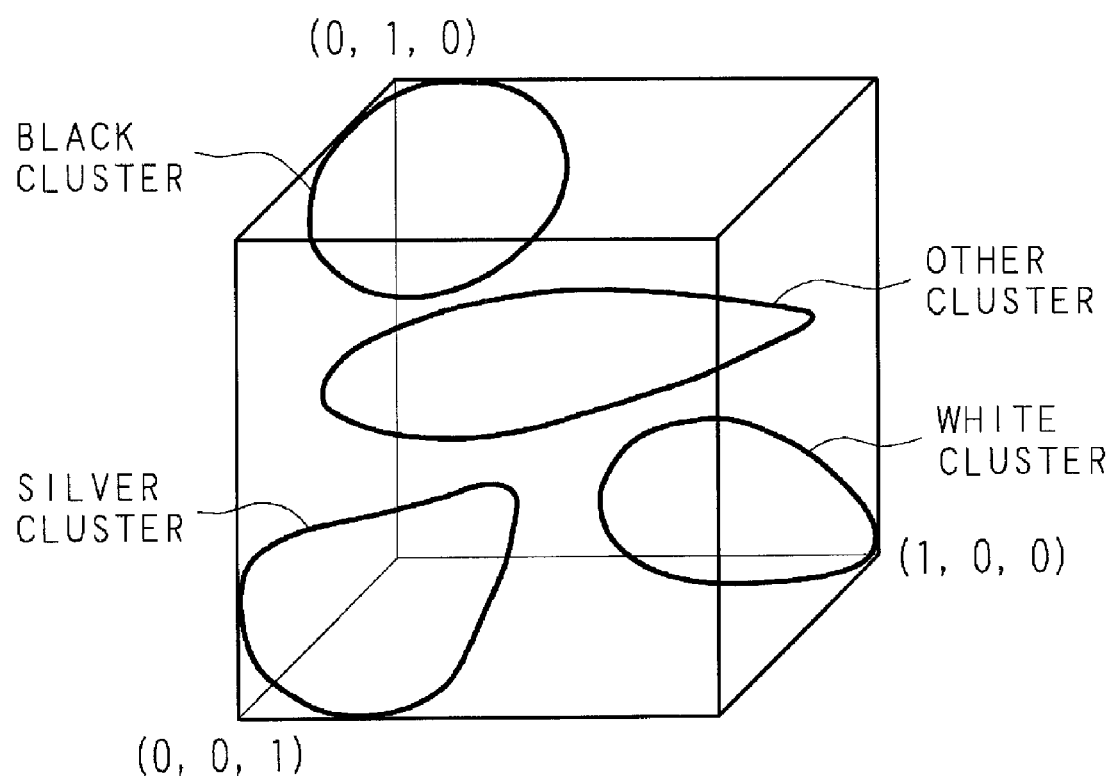
FIG. 6 is an image view showing clusters formed in each color space according to Embodiment 1.

FIGS. 6 to 11 are image views each showing clusters formed in the color space in Embodiment 1. FIG. 6 shows the color space in which achromatic colors of white, black, and silver are set in three dimensions. In addition, in the image view of FIG. 6, a white cluster as a coordinate group having a high white rate in the classified colors of the process target image, a black cluster having a high black rate, and a silver cluster having a high silver rate are formed. In addition, the "other" cluster is formed by a coordinate group corresponding to a process target image having a color distribution that does not have a rate biased to white, black, and silver.

Figure 7:
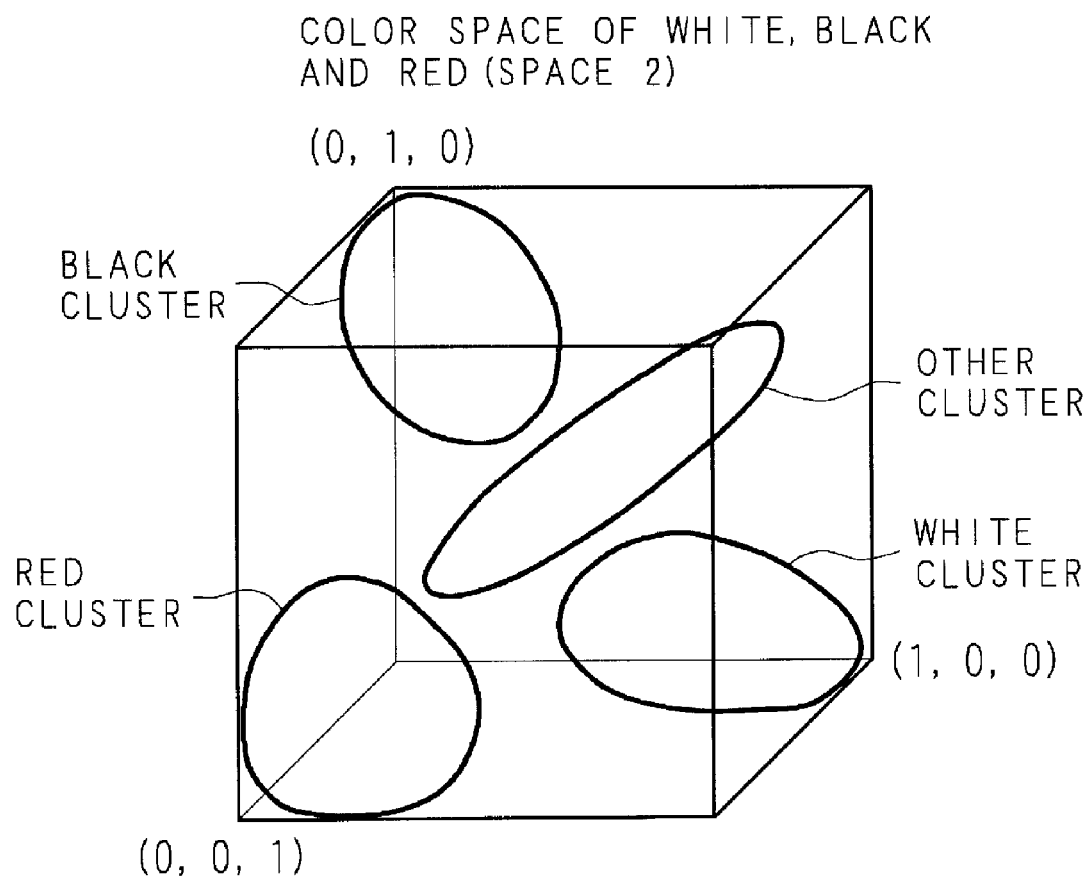
FIG. 7 is an image view showing clusters formed in each color space according to Embodiment 1.
Figure 8:
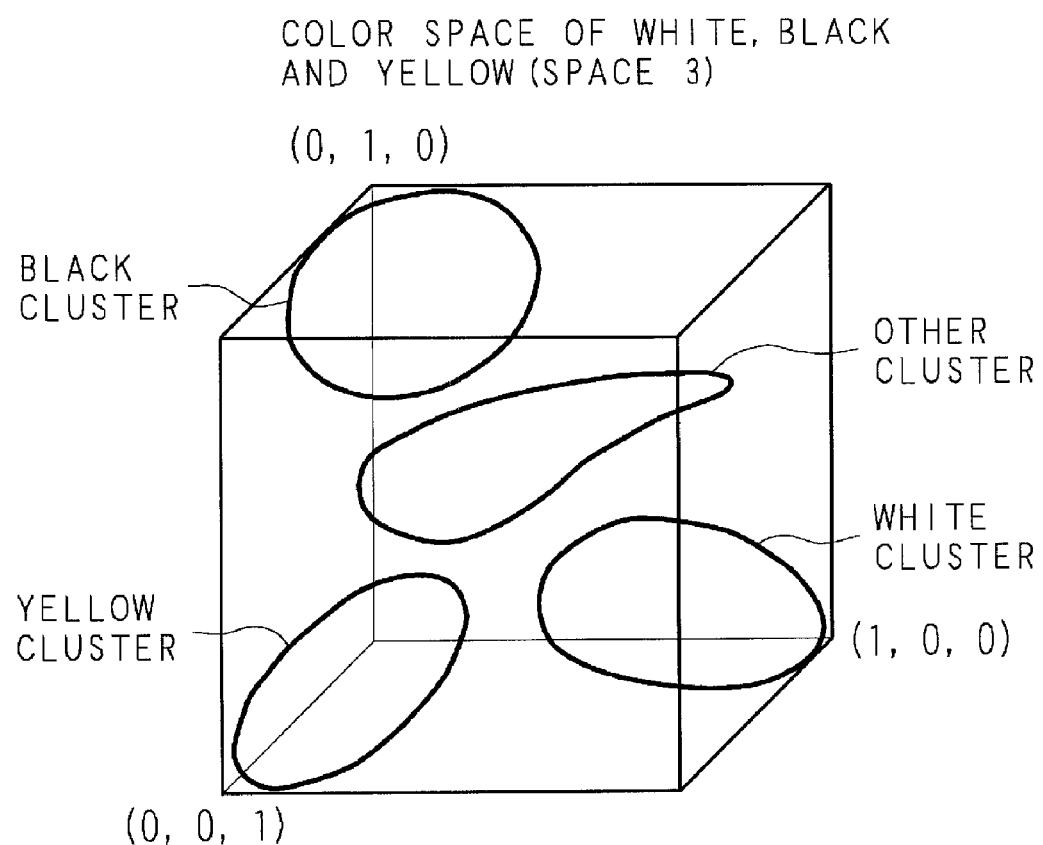
FIG. 8 is an image view showing clusters formed in each color space according to Embodiment 1.
Figure 9:
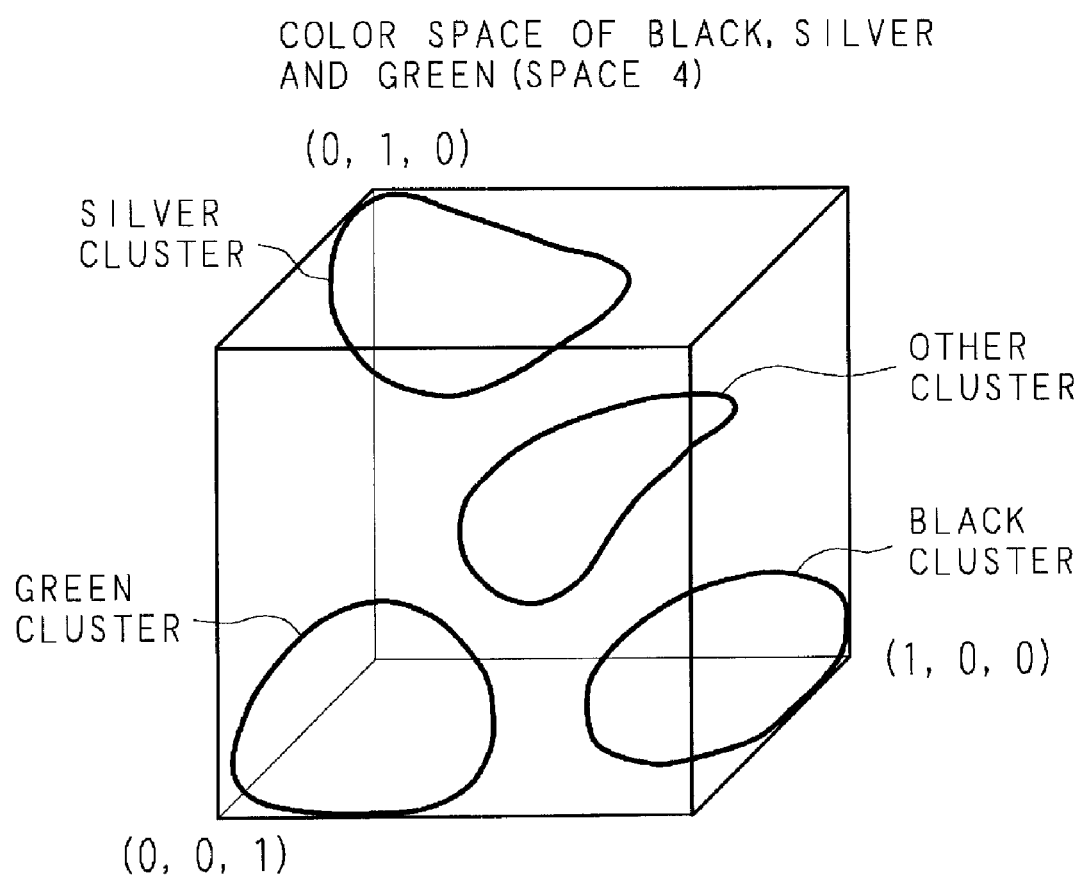
FIG. 9 is an image view showing clusters formed in each color space according to Embodiment 1.
Figure 10:
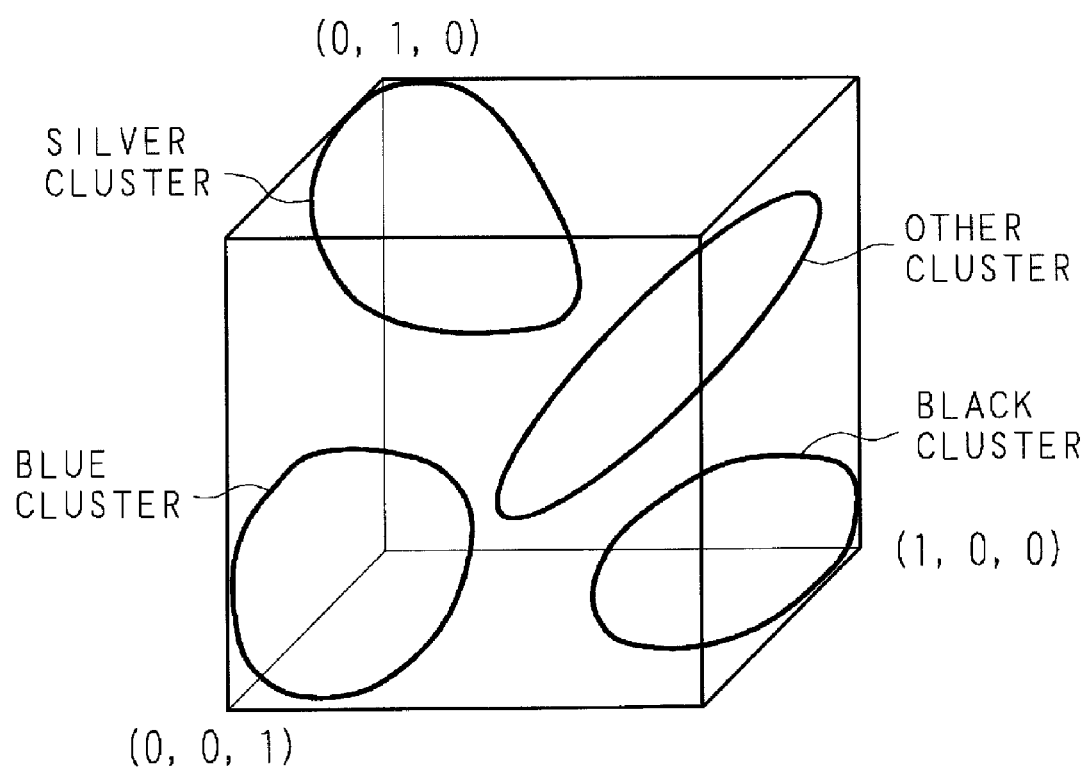
FIG. 10 is an image view showing clusters formed in each color space according to Embodiment 1.

In FIG. 7, four clusters of a white cluster, a black cluster, a red cluster, and the "other" cluster are formed in a color space in which classified colors of white, black, and red correspond to three dimensions. In FIG. 8, white, black, yellow, and the "other" clusters are formed in a color space in which white, black, and yellow correspond to three dimensions. In FIG. 9, black, silver, green, and the "other" clusters are formed in a color space in which black, silver and green correspond to three dimensions. In FIG. 10, black, silver, blue and the "other" clusters are formed in a color space in which black, silver, and blue correspond to three dimensions. In FIG. 11, black, silver, purple, and the "other" clusters are formed in a color space in which black, silver and purple correspond to three dimensions.

Referring to FIG. 5 again, a description will be continued. As shown in FIG. 5, information obtained by the above-described clustering is recorded in the HD 230 as the cluster information 231. Thus, the learning process is completed once, and the recognition process is performed by use of the cluster information 231. The cluster information 231 can be used widely. More specifically, the cluster information 231 includes color space identification information for identifying the defined color space, cluster identification information for identifying the cluster formed in each color space, a designated color corresponding to the cluster, and each attribution (field) of the barycenter of the cluster. In addition, it is preferable that information (variance-covariance matrix) required to calculate the following Mahalanobis distance is contained as a field value.

The distance calculating means 216 calculates the distance between the coordinates corresponding to the rates of the pixel number of the classified colors in the recognition target image as the color recognition target in each color space, and the barycenter of the cluster formed in the color space, based on the Mahalanobis distance (the Mahalanobis distance will be described in detail below). Thus, the cluster having the shortest distance from the corresponding coordinates is specified with respect to each color space and the distance is calculated. The information obtained here is recorded in the HD 230 as the distance information 232. Here, it is to be noted that the color can be recognized based on the Euclidean distance although there is a difference in recognition rate. The distance information 232 includes the color space identification information, the cluster identification information and the attribution (field) of the shortest distance, for example.

Here, it is preferable that identification information of the recognition target image, the rate of the classified color, and the recognition target image are separately recorded in the HD 230 as information required in the process at the time of relearning (as will be described below) and information desirably recorded. The rate of the classified color is recorded to avoid calculating of the rate of the classified color again at the time of the relearning. As a matter of course, the rate of the classified color may be calculated again from the recorded recognition target image. In addition, the pickup image (recognition target image, especially) is used to display the pickup image when the user determines the color to input or select the user designated color at the time of the relearning process.

The recognition result determining means 217 recognizes the color according to the predetermined determination standard (determination standard 235 stored in the HD 230 according to Embodiment 1), based on the shortest distant cluster specified with respect to each color space. The recognized color is recorded in the HD 230 as the recognized color information 233. For example, the recognized color information 233 includes the pickup image identification information and the attribute (field) of the recognize color.

FIG. 12 is an explanatory diagram showing an example of contents of the determination standard 235 used when the CPU 210 of the color recognition apparatus 200 recognizes the color in Embodiment 1. Although the determination standard 235 as shown in the explanatory diagram in FIG. 12 is stored in the HD 230, it may be incorporated in the color recognition program 2P. The CPU 210 executes the color determination based on the determination standard 235.

According to the determination standard 235 in the example of the contents of FIG. 12, determination whether there are many "other" colors in the colors corresponding to the shortest distant clusters in the color spaces is preferentially made as shown in the standard. First, it is determined whether the colors corresponding to the shortest distant clusters in the color spaces are all "other" colors or not, and when they at all "other" colors, the color recognition result is determined as "unknown". That is, the shortest distant cluster is specified from the four clusters in each of six color spaces shown in FIGS. 6 to 11, and when the six specified clusters are all "other" clusters, the color is recognized as "unknown".

Secondly it is determined whether the colors corresponding to the shortest distant clusters in the color spaces except for one color space is the "other" colors or not, and when the colors corresponding to the shortest distant clusters except for one color space are the "other" colors, the "other" clusters are ignored and the color corresponding to the cluster other than the "other" clusters is regarded as the recognized color. For example, when five clusters in the six shortest distant clusters specified in the six color spaces are the "other" clusters, and one cluster is a "red" cluster, the "red" is the recognized color.

When the case does not apply to the first and second standards, thirdly, the color corresponding to the shortest distant cluster in the shortest distant clusters is regarded as the recognized color when the most shortest distance is not more than a predetermined value. For example, when the "red" cluster in one color space in the six shortest distant clusters specified in the six color spaces is the shortest distant cluster, the "red" is the recognized color.

Fourthly, when the color corresponding to the most shortest distant cluster in the third standard is achromatic color (black, white, silver or gray), and any of the colors corresponding to the other shortest distant clusters is a chromatic color, and when the shortest distance of the chromatic cluster is not more than the predetermined value, the chromatic color is regarded as the recognized color. That is, when the six shortest distant clusters specified in each of the six color spaces are "black", "black", "other", "other", "red", and "red", and the most shortest distant cluster is the "black" cluster as the achromatic color, and the shortest distance of any one of the "red" cluster is not more than the predetermined value, the "red" is regarded as the recognized color.

Fifthly, a most frequently appearing color in the colors corresponding to the shortest distant clusters in the color spaces is regarded as the recognized color. For example, when the six shortest distant clusters specified in each of the six color spaces are "black", "white", "other", "red", "white", and "other", since the "other" clusters are ignored and the most frequently appearing color is preferentially the recognized color, the "white" is regarded as the recognized color.

In addition, as shown in FIG. 12 and described above, the standards in the determination standard 235 set priorities from the first to fifth standards. Therefore, the color is recognized according to the first standard even when the case applies to both first and second standards. The contents of the determination standard 235 can contain various conditions in view of a design.

Referring to FIG. 5 again, each function will be described. As shown in FIG. 5, the output means 218 has a function to send data to the management computer 30.

The unlearned data extracting means 219 has a function to extract the pickup image whose distance from the most shortest distant cluster in the color spaces of the recognized color is not less than the predetermined value based on the distance information 232 and the recognized color information 233 (or identification information of the recognition target image, the rate of the classified color and recognition target image separately recorded). Here, it may be constituted such that the pickup image whose distance from the nearest cluster is not less than the predetermined value not only in the color space of the recognized color but also in all the color spaces is extracted. In addition, the recognition target image whose recognized color is determined as "unknown" in the first standard in the determination standard 235 as shown in the explanatory diagram of FIG. 12 is extracted. In addition, the recognition target image extracted by the unlearned data extracting means 219 may be recorded in the HD 230 as the relearning information 234.

The unlearned data extracting means 219 may be triggered by a start order by the user through the management computer 30, or may be started at regular time intervals. In addition, it may be constituted such that the CPU 210 executes the process for extracting the pickup image whose distance from the nearest cluster in the color space of the recognized color is not less than the predetermined value, based on the distance information 232 and the recognized color information 233 and when the number of the extracted pickup images reaches a predetermined number or more, the following process is continued.

A detailed description will be made of the contents of the above-described clustering executed when the CPU 210 of the color recognition apparatus 200 constituted, as described above, functions as the clustering means 215.

[2. K-means Method]

The clustering method is a method for relating data having certain characteristics in a feature space, and grouping the data having similar characteristics in the feature space using a distance in the space. The clustering method includes a hierarchical method and non-hierarchical method. While it is known that a classified result can be obtained with relatively high accuracy by the hierarchical method, since up to $O(N^3)$ calculation time is needed, the method is suitable for a case where the number of targets to be classified is small.

The K-Means method is a representative method of the non-hierarchical method. According to this method, since a data group to be divided is divided into the designated number of clusters, any data are selected as a tentative barycenter of the cluster. The selected data having the number of the clusters are called a seed. The seed is set as the barycenter of the cluster and the data are classified. This is repeated several times until the divided result becomes optimal. In Embodiment 1, the K-Means method is used as the clustering method. The K-Means method is described in detail "Image Analysis Handbook" P.648-P657 (Tokyo University Press Inc.). Learning and recognition of the K-Means method is divided into a learning phase and a recognition phase and both phases will be described in detail in the following section.

[2.1 Learning Phase]

In the learning phase, learning data to be classified is prepared. Then, since the number of clusters to be classified at the time of execution is needed in the K-Means method, the number of clusters to be classified is determined. Learning is performed using the learning data and the number of clusters to be classified according to the K-Means method. The learning data are classified by the learning and the cluster is formed. From a barycenter of each cluster and a variance-covariance matrix of each cluster, an inverse matrix thereof is calculated. The barycenter and the inverse matrix are outputted as a learning result. The learning result (the barycenter and the inverse matrix of the variance-covariance matrix) is used in the recognition phase.

<<1>> Preparation of the learning data to be classified
<<2>> Determination of the number of clusters to be classified
<<3>> Learning by the k-Means method
<<4>> Calculation of the barycenter of the cluster and the variance-covariance matrix of the cluster
<<5>> Calculation of the inverse matrix of the variance-covariance matrix

*The inverse matrix of the variance-covariance matrix is needed when the Mahalanobis distance (will be described below) is used in calculation of a distance at the time of recognition.

There are two reminders in the learning phase.
<I. Regarding Initial State>

It is known that an initial state (seed) affects a cluster generation result in the K-Means method and the initial state is generally determined by generating a random number. However, when there are data that are previously known to be classified to different clusters, its value can be the initial state.
<II. Regarding Learning Method>

The learning phase includes the following two patterns.
<1> Pattern in which the cluster is generated by the K-Means method
<2> Pattern in which the data constituting the cluster is known When it is not known to which cluster the learning data belong, the pattern <1> is employed. When the cluster to which the learning data belong is previously known (learned) or when the cluster to which each learning data belong is to be designated, the pattern <2> is employed. In this case, it is necessary to prepare learning data and cluster information to which the learning data belong.

[2.2 Recognition Phase]

Recognition data to be recognized are prepared in the recognition phase. The learning result of the learning phase (inverse matrix and barycenter coordinates) is read and a distance is calculated to know to which cluster the recognition data are classified.

<<1>> Preparation of the recognition data to be recognized
<<2>> Readout of the learning result (inverse matrix and barycenter coordinate point)
<<3>> Distance calculation
<<4>> Calculation of the cluster to be classified The Euclidean distance or the Mahalanobis distance is used in the distance calculation. The calculation method can be selected at the time of execution. The characteristics and calculation methods of the Euclidean distance and the Mahalanobis distance will be described below.

[2.2.1 Euclidean Distance]

The shortest distance between two points in the Euclidean space is found. When there are two points P and Q in a rectangular coordinate system in an n-dimensional space, the square of the Euclidean distance between P and Q is defined by a formula (3). In addition, the coordinates of P is expressed by a formula (1) and the coordinates of Q is expressed by formula (2).

$$P = (x_{p1}, x_{p2}, x_{p3}, \Lambda, x_{pn}) \quad (1)$$

$$Q = (x_{q1}, x_{q2}, x_{q3}, \Lambda, x_{qn}) \quad (2)$$

$$D^2 = \sum_{i=1}^{n} (x_{pi} - x_{qi})^2 \quad (3)$$

When the Euclidean distance is used in the clustering, it is used when the distance between the barycenters of the cluster in the feature space or the differences between the clusters to be classified and between the barycenter of the cluster and a sample are calculated.

[2.2.2 Mahalanobis Distance]

A distance scale between the cluster and recognition data is found. The barycenter (means) of the cluster having "k" components is expressed by the following formula (4), and the coordinates corresponding to the recognition data is expressed by a formula (5).

$$\mu_j = (\mu_{1j}, \mu_{2j}, \mu_{3j}, \Lambda, \mu_{nj})' j = (1,2,3,\Lambda,k) \quad (4)$$

$$X = (x_1, x_2, x_3, \Lambda, x_n)' \quad (5)$$

At this time, when the variance-covariance matrix of each component is expressed by a formula (6) and its inverse matrix is expressed by a formula (7), the square of the Mahalanobis distance $d_j$ is expressed by a formula (8).

$$\sum_j \quad (6)$$

$$\sum_j^{-1} \quad (7)$$

$$d_j^2 = (X - \mu_j)' \sum_j^{-1} (X - \mu_j) \quad (8)$$

When there is a correlation in variables, although the simple Euclidean distance is not a suitable measure, the Mahalanobis distance produces a correlation-adjusted result. The Mahalanobis distance is described in detail "Image Analysis Handbook" P.654 (Tokyo University Press Inc.).

[3. Operation Process]

Next, a description will be made of the process procedures of the learning process, the recognition process and relearning process executed by the CPU 210 of the color recognition apparatus 200 constituted as described above with reference to an operation flow.

[3.1 Learning]

Figure 13:
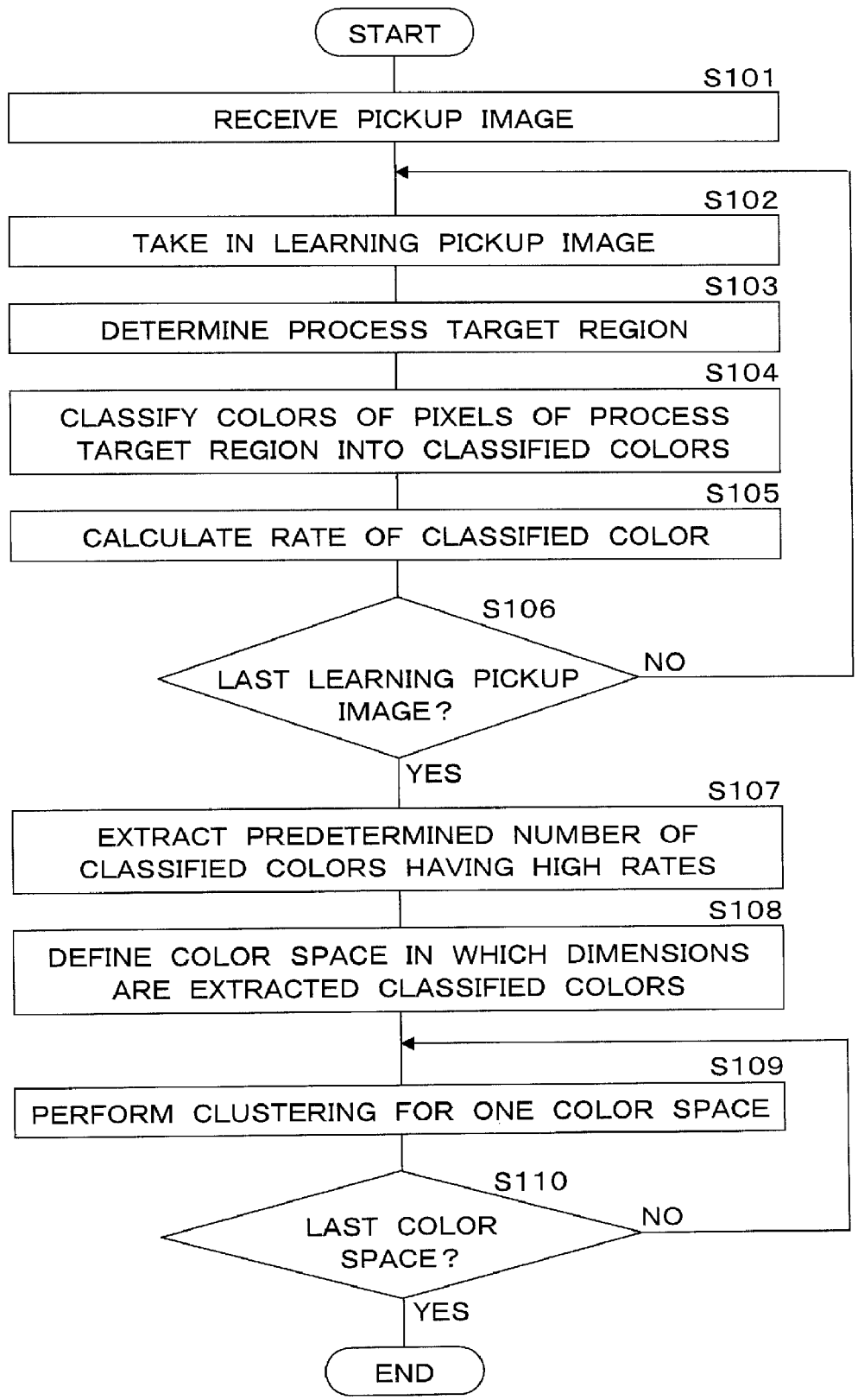
FIG. 13 is an operation flow showing a procedure of a learning process by the CPU of the color recognition apparatus according to Embodiment 1.

FIG. 13 is an operation flow showing the process procedure of the learning by the CPU 210 of the color recognition apparatus 200 in Embodiment 1. The pickup image is sent from the imaging device 10 to the management computer 30, and the user views the pickup image and previously classifies it to the user designated color. The user designated color can be determined by the user. Thus, the pickup image classified into the user specified color is prepared in the management computer 30. That is, the pickup image and the data having the field of the user designated color are recorded on the management computer 30. In addition, the target to be taken in the pickup image and recognized is a car and the color of the car is recognized by the color recognition apparatus in Embodiment 1 for the sake of simplicity of the description. However, it is needless to say that this embodiment is not limited to this and the target to be taken into the pickup image and recognized is not only the car but also a human, animal and landscape.

The management computer 30 sends the pickup image classified into the user designated color to the color recognition apparatus 200 in response of user instruction. The CPU 210 of the color recognition apparatus 200 receives the pickup image classified into the user designated color (operation S101), and takes in the pickup image as the learning pickup image one by one by the input means 211 (operation S102).

The CPU 210 of the color recognition apparatus 200 determines a bonnet region of the car to be recognized, as the process target region in the pickup image by the target region determining means 212 (operation S103). In addition, it is preferable that the lower half of the determined bonnet region is to be processed. Thus, even when a phenomenon in which the bonnet color is turned into white due to follow light occurs, the affect can be avoided. As a matter of course, the CPU 210 may determine only the lower half of the bonnet region by the target region determining means 212.

The CPU 210 of the color recognition apparatus 200 functions as the color classifying means 213 to classify the color of each pixel of the process target region of the learning pickup image (operation S104). Here, it is preferable that the RGB color system is converted to the HSI color system before the operation S104. For example, it is converted between the operation S102 and the operation S103. In addition, the CPU 210 calculates the rate of the classified color by dividing the pixel number of the classified color in the process target region of the learning pickup image by the pixel number contained in the process target region by the normalizing means 214 (operation S105). In addition, since the division is made by the pixel contained in the process target region, the rate of the classified color is a rate normalized based on the area (pixel number) of the process target region.

The CPU 210 of the color recognition apparatus 200 determines whether the learning pickup image taken in by the operation S102 is the last learning pickup image in the pickup images received in the operation S101 or not, and when it is determined that the learning pickup image is the last one (S106: YES), the next operation S107 is executed. Meanwhile, when it is determined that the learning pickup image is not the last one (S106: NO), the process is returned to the operation S102 and the next learning pickup image is processed. In accordance with the above-described processes, the rates of the classified colors in all the learning pickup images are calculated before the operation S107.

The CPU 210 of the color recognition apparatus 200 extracts the predetermined number of classified colors having high rates, based on the rate of the classified color calculated from each learning pickup image, with respect to each designated color, for all the learning pickup images (operation S107). At this time, the CPU 210 extracts the top three high rate classified colors. The CPU 210 of the color recognition apparatus 200 defines a color space in which the dimensions are the commonly extracted classified colors for the learning pickup images (operation S108). Thus, the color spaces shown in FIGS. 6 to 11 are defined.

The CPU 210 of the color recognition apparatus 200 executes clustering in each of the defined color spaces, based on the rate of the classified color in the process target region of the learning pickup image to which the user designated color is given, with respect to each user designated color by the clustering means 215 (operation S109).

In addition, when the clusters corresponding to the plurality of user designated colors exist in the same color space (that is, the user designated colors are the same as the top three high rate classified colors), the process is reduced by just that much here. According to Embodiment 1, among the user designated colors such as white, black, silver, red, yellow, green, blue and purple, since the white, black and silver clusters are in the color space having the same standard colors, six clustering processes are performed while there are eight user designated colors.

In addition, the CPU 210 associates the cluster formed by the clustering means 215 with the user designated color. Specifically, the association is executed from the user designated color applied to the learning pickup image corresponding to the formed cluster. In general, the user designated color corresponding to the pickup image belonging to the one cluster is one color. According to such a learning process, the clusters are formed in the color spaces as shown in FIGS. 6 to 11 by the above learning process.

The CPU 210 of the color recognition apparatus 200 determines whether the clustered color space is the last color space of all the color spaces or not (operation S110). When it is determined that the color space is not the last one (S110: NO), the process is returned to the operation S109 and the next color space is processed. Meanwhile, when the CPU 210 of the color recognition apparatus 200 determines that the color space is the last one (S110: YES), the learning process is completed.

[3.2 Recognition]

Figure 14:
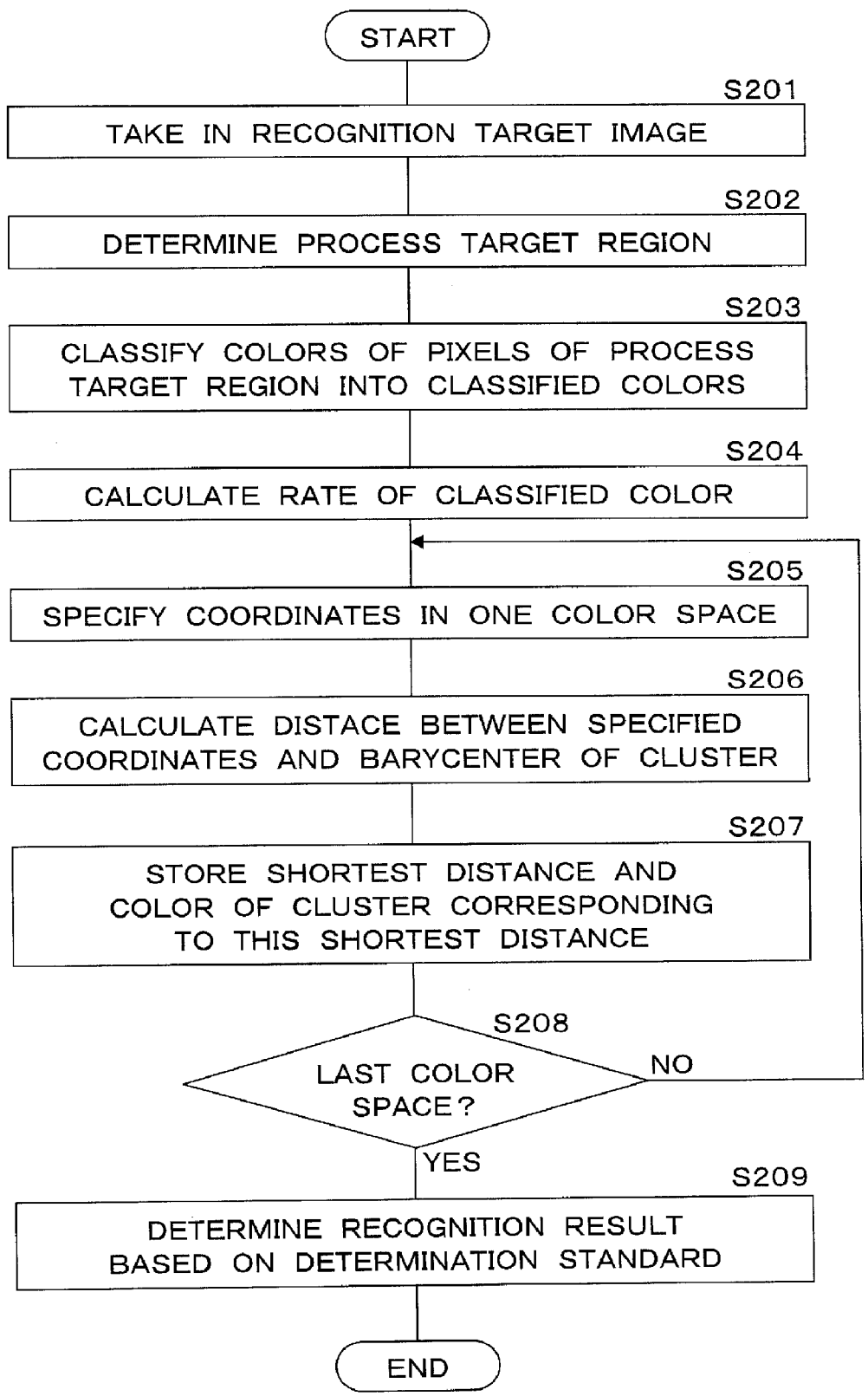
FIG. 14 is an operation flow showing a procedure of a recognition process by the CPU of the color recognition apparatus according to Embodiment 1.

A description will be made of the recognition process performed when the recognition target image taken by the imaging device 10 is received by the color recognition apparatus 200 that executed the above learning process. FIG. 14 is an operation flow showing the process procedure of the recognition by the CPU 210 of the color recognition apparatus 200 in Embodiment 1.

The CPU 210 of the color recognition apparatus 200 takes in the recognition target image to be recognized by the input means 211 (operation S201).

The pickup image is sent from the imaging device 10 to the color recognition apparatus 200 sequentially, and every time when the CPU 210 of the color recognition apparatus 200 takes in the recognition target image, operations S201 to S207 are performed. Since the operation S202, the operation S203 and the operation S204 are the same as the operation S103, the operation S104, and the operation S105 in the operation flow of FIG. 13 in [3.1 Learning], respectively their detailed description will be omitted.

The CPU 210 of the color recognition apparatus 200 specifies the coordinates in each of the color spaces as shown in FIGS. 6 to 11, based on the rate of the classified color in the process target region of the retrieved recognition target image (operation S205) and calculates the distance between the specified coordinates and the barycenter of the cluster formed in the color space (operation S206) by the distance calculating means 2. The CPU 210 of the color recognition apparatus 200 stores the shortest distance of the distances calculated in the operation S206 and the color corresponding to the shortest distant cluster in the memory 220 (operation S207). Through the operation S205 to the operation S207, the distance from each cluster formed in each color space is calculated, and the shortest distant cluster of the clusters and its distance are specified.

The CPU 210 of the color recognition apparatus 200 determined whether the color space being processed at the present is the last color space or not (operation S208), and when it is determined that the color space is the last one (S208: YES), the process proceeds to a step S209. Meanwhile, when the CPU 210 of the color recognition apparatus 200 is determined that the color space is not the last one (S208: NO), the process is returned to the operation S205 and the next color space is processed.

Then, the CPU 210 of the color recognition apparatus 200 determines the recognition result from the shortest distance and the color corresponding to the cluster calculated with respect to each color space and stored, in terms of the determination standard 235 shown in FIG. 12, by the recognition result determining means 217 (step 209) and completes the process.

Thus, the color is selected from the colors classified so as to correspond to the clusters recognized by the recognition process and formed by the learning process shown in the operation flow of FIG. 14.

Figure 15:
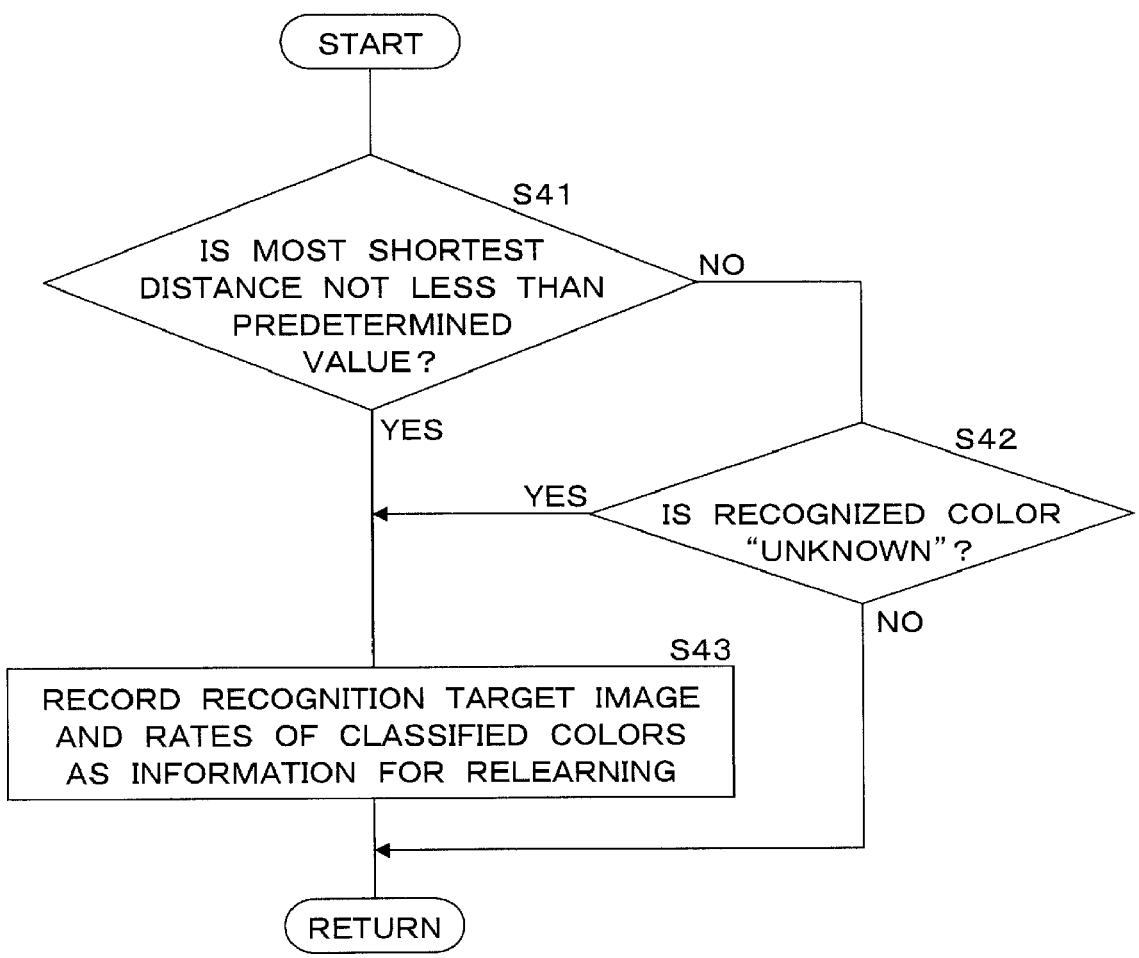
FIG. 15 is an operation flow showing a process procedure for recording relearning information by the CPU of the color recognition apparatus according to Embodiment 1.

In addition, a process for recording the relearning information 234 for relearning as will be described below may be contained in the process of the operation S209. That is, although it may be extracted and recorded collectively by the unlearned data extracting means started by the predetermined trigger, it may be extracted and recorded in the recognition process. FIG. 15 is an operation flow showing a process procedure for recording the relearning information 234 by the CPU 210 of the color recognition apparatus 200 in Embodiment 1. According to Embodiment 1, the process shown in the operation flow of FIG. 15 is performed in the process of the operation S209 in the process procedure shown in the operation flow of FIG. 14.

The CPU 210 of the color recognition apparatus 200 determines whether or not the most shortest distance of the shortest distances from the clusters calculated and stored with respect to each color space by the process in the operation S207 is not less than the predetermined value (operation S41). When the CPU 210 of the color recognition apparatus 200 determines that the most shortest distance is less than the predetermined value (S41: NO), the process proceeds to operation S42. Meanwhile, when the CPU 210 of the color recognition apparatus 200 determines that the most shortest distance is not less than the predetermined value (S41: YES), the corresponding recognition target image, and the rate of the classified color calculated in the operation S204 are recorded in the HD 230 as the relearning information 234 (operation S43).

When the CPU 210 of the color recognition apparatus 200 determines that the most shortest distance is less than the predetermined value in the operation S41 (S41: NO), it determines whether the recognized color is determined as "unknown" based on the determination standard 235 in the process of the operation S209 (operation S42). When the CPU 210 of the color recognition apparatus 200 determines that the recognized color is not determined as "unknown" (operation S42: NO), the process is returned to the operation S209. Meanwhile, when the CPU 210 of the color recognition apparatus 200 determines that the recognized color is determined as "unknown" (S42: YES), it records the recognition target image and the rate of the classified color calculated in the operation S204 in the HD 230 as the relearning information 234, and the process is returned to the operation S209.

In addition, it may be also constituted such that the shortest distances from the clusters calculated for all color spaces by the processes from the operation S205 and the operation S207 and the colors corresponding to the clusters are recorded in the HD 230 as the relearning information 234, and when the color is determined as the "unknown" in the operation S209, it is recorded as the relearning information 234 in which determination is suspended. In this case, the relearning information may be extracted by executing the process procedure shown in the operation flow of FIG. 15 based on the recorded relearning information 234 just before the relearning process to be described below.

[3.3 Relearning Operation]

A description will be made of the relearning process performed based on the recognition target image and the rate of the classified color desirably recorded separately as the relearning information 234 when the CPU 210 of the color recognition apparatus 200 functions as the distance calculating means 216. In addition, the relearning information 234 may be the one recorded in the process procedure shown in the operation flow of FIG. 15.

Figure 16:
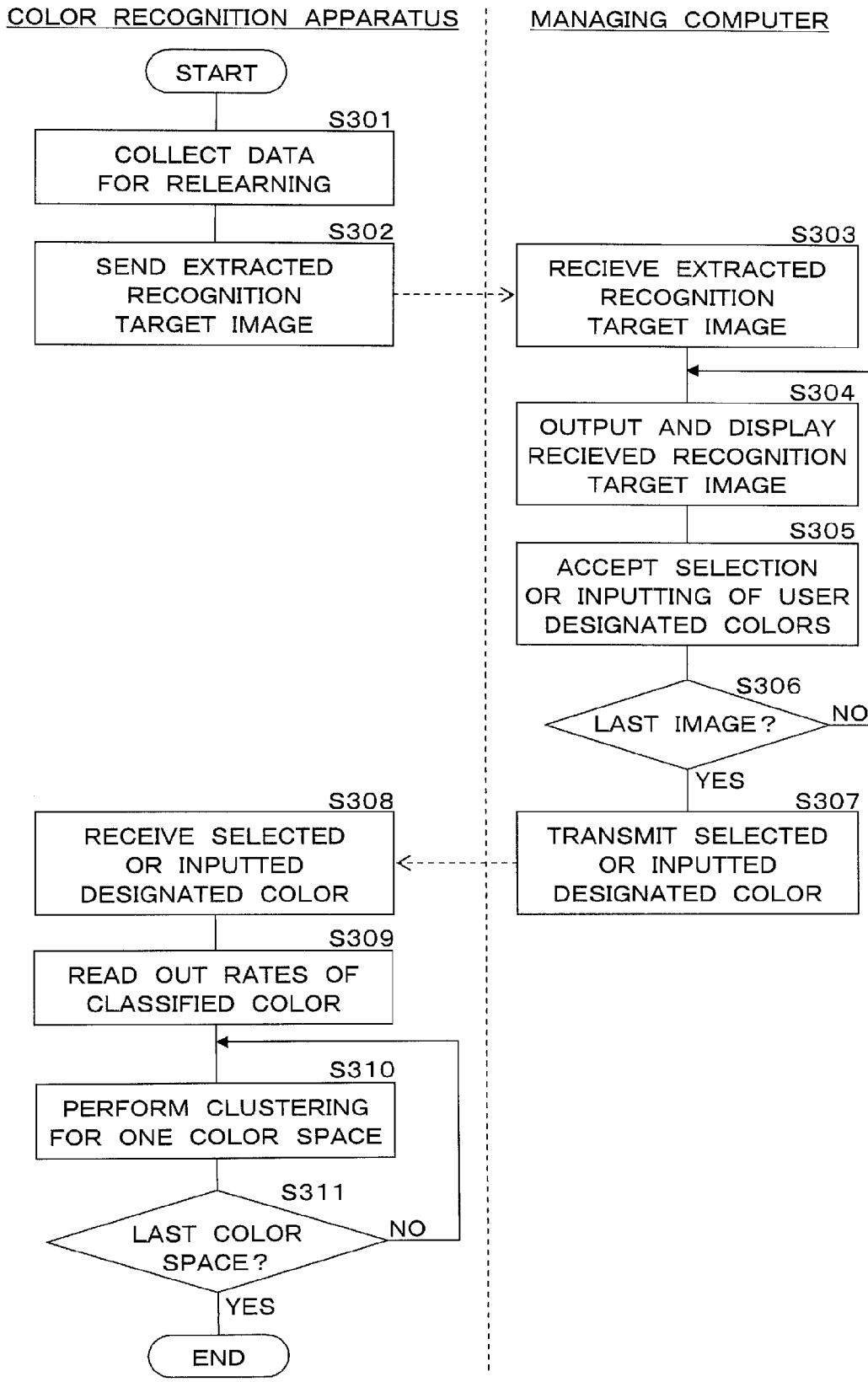
FIG. 16 is an operation flow showing a procedure of a relearning process by the CPU of the color recognition apparatus according to Embodiment 1.

FIG. 16 is an operation flow showing a process procedure of the relearning operation performed by the CPU 210 of the color recognition apparatus 200 in Embodiment 1. The CPU 210 of the color recognition apparatus 200 collects relearning data as the relearning information 234 by extracting the recognition target image in which the shortest distance from the cluster of the user designated color of the recognized color is not less than the predetermined value or the recognition target image in which the recognized color is determined as the "unknown" by the unlearned data extracting means 219 started by the above-described trigger (operation S301). It is preferable that the above predetermined value is set with respect to each color space or each cluster. The setting is determined in view of the configuration and spread of the formed cluster and correlation of the clusters.

The CPU 210 of the color recognition apparatus 200 sends the recognition target image extracted as the relearning data from the output means 218 to the management computer 30 (operation S302). The management computer 30 receives the extracted recognition target image (operation S303). The management computer 30 outputs and displays the received recognition target image one by one, for example (operation S304), and urges the selection or input of the corresponding user designated color in the image displayed at the present.

The selection of the user designated color is the selection from the already existing user designated colors, and the input is to form a new user designated color separately. Here, although the recognition target image is displayed one by one, it may be such that the plurality of images are displayed at the same time and the colors at the corresponding portions of the car regarded as being the same or similar are grouped and selection or the input of the user designated color is performed. In addition, it is also desirable to display the pickup image corresponding to the already determined as the user designated color, so that the user designated color can be determined or modified by comparing the pickup image in which the user designated color is to be determined at the present with the pickup image in which the user designated color is determined.

The management computer 30 receives the selection or the input of the user designated color by the user (operation S305), and determines whether the recognition target image in which the user designated color is selected or inputted is the last image in the received recognition target images or not (operation S306). When the management computer 30 determines that the image is not the last one (S306: NO), the process is returned to the operation S304 and the next image is processed. In addition, when the management computer 30 determines that the image is the last one (S306: YES), the process proceeds to the next operation S307.

The management computer 30 transmits the user designated color selected or inputted in each recognition target image to the color recognition apparatus 200 (operation S307). It is preferable that the recognition target images are grouped with respect to each user designated color before the transmission because the processes to be described below from an operation S310 to a step S311 are performed with respect to each user designated color of the recognition target image. Here, the grouping may be performed by the color recognition apparatus 200.

The CPU 210 of the color recognition apparatus 200 receives the user designated color selected or inputted in each recognition target image transmitted from the management computer 30 (step 308). The CPU 210 of the color recognition apparatus 200 reads out the rate of the classified color of each recognition target image from the HD 230 (step 309). At this time, the CPU 210 of the color recognition apparatus 200 reads out the rate of the classified color in the already learned learning pickup image also from the HD 230, and when the following clustering is performed, the learning process in which the color is newly classified in a new image can be performed. In addition, when the extracted recognition target image is used in the relearning, it is dealt with in the same manner as that of the learning pickup image.

The CPU 210 of the color recognition apparatus 200 executes the clustering in one color space, based on the rate of the classified color in each recognition target image, with respect to each received user designated color, by the clustering means 215 (step 310). The CPU 210 of the color recognition apparatus 200 determines whether the clustered color space is the last color space or not (step 311), and when it is determined that the color space is not the last one (S311: NO), the process is returned to the operation S310 and the next color space is processed. When the CPU 210 of the color recognition apparatus 200 determines that the color space is the last one (S311: YES), it completes the relearning process.

[4. Specific Application Example]

A description will be made of an example in which the above-described process procedure is applied to a specific example.

[4.1 Car Body Color Recognition]

The color of the car in the pickup image is different from the original color thereof due to various outdoor environmental conditions in some cases. As the color having the largest number of pixels in the bonnet is the car body color in recognizing car body color, a dominant color is recognized as the car body color even under the environmental influence, so that a recognition rate is low. Thus, especially, in order to improve the color recognition rate of the car body under the environmental influence, the car body is to be recognized so as to be associated with the shooting condition influenced by the environment by use of the above-described K-means method.

[4.2 Data Contents]

The data used for learning correspond to an amount of each color component in the bonnet region of the car body in the pickup image as the process target region. According to a method for extracting the data, the bonnet region of the car body is distinguished from the image and the pixels of the distinguished region are classified into eight colors. The eight classified colors correspond to the dimensions of the color space when the above clustering is performed. However, since the size of the bonnet region in the image varies depending on the field angle of a camera and the type of a car, the target region is normalized so that the whole pixel number adds up to 1 as described in the above process, and the rate of each classified color is adjusted.

FIG. 17 is an explanatory diagram showing an example of contents of the classified colors when the color recognition method is performed in Embodiment 1. As shown in the explanatory diagram of FIG. 17, the eight classified colors are white, black, silver, red, yellow, green, and purple, and the dimension numbers are allotted to them, respectively.

FIG. 18 is an explanatory diagram showing an example of contents of the rates of the classified colors of the pixels contained in the process target region when the color identification method according to Embodiment 1 is performed. When the bonnet region of the car body in the pickup image is the process target region, the rates of the pixels in the process target region classified into the colors shown in FIG. 17 with respect to each car body determined by the user are shown in FIG. 18. In addition, the rate of the classified color shown in FIG. 18 has been normalized. In addition, the color most commonly contained in the classified color is indicated by boldface in each classified color.

As understood from the explanatory diagram of FIG. 18, even when the car seems to have a single color, it contains various kinds of color components depending on the kind of a paint color and the influence of the light. In addition, the value of the color component corresponding to the car body color is greatest and the values of the other color components are mostly smaller than that of the greatest color component by one or more digits. However, a certain color component has the same digit as the color component of the car body color because the component has a close relation with the car body color (white and silver, for example) or the color component (emblem, side mirror, and front grille, for example) is contained in the pickup image. In addition, as shown in FIG. 17, the kinds of the classified colors are eight colors (white, black, silver, red, yellow, green, blue, and purple), and the number of dimensions are eight (because the data is composed of the color components of the car body).

In addition, as shown in the explanatory diagram of FIG. 18, the maximum value of the rate of the classified color is 1 (when only the color corresponding to the dimension exists in the bonnet region), and the minimum value is 0 (when the color corresponding to the dimension does not exist).

In addition, the white car body color may be divided into "standard white", "follow light white", "back light white", "oblique light white", "dusk white", "night white", "snow white", and the like, so as to correspond the shooting conditions, and also may be divided into "light track white", "sedan white", and "large-sized track white" so as to correspond to the type of the car.

[4.3 Experiment Result]
[4.3.1 Learning Data]

It is preferable that the learning pickup images classified into the eight designated colors in order to recognize the car body color are classified into different clusters with respect to each designated color. Thus, the learning data are formed of representative car body image data of colors in which the eight clusters are expected to be formed. In this case, five images for each eight car boy colors (designated color), forty images in total are selected as the learning pickup image, so that the rate of the classified colors of the pixels contained in each bonnet region is used as the learning data.

In addition, as initial values of the clusters, eight data color components (car body color) are set for each color (five colors) to be classified to different clusters. In addition, although the cluster number is previously determined in this learning data, the optimal cluster number is not essentially known. When the cluster number set at the time of learning is unknown, the number is increased or decreased from the number of the dimensions.

FIGS. 19 to 21 are explanatory diagrams showing an example of contents of learning pickup images and the pixel rates of the classified colors contained in each process target region when the color identification method according to Embodiment 1 is performed. A description will be made of the clustering process carried out by the CPU 210 based on the leaning pickup image shown in the example of the contents shown in FIGS. 19 to 21.

[4.3.1.1 Definition of Color Space (Setting of Standard Color Corresponding to Each Dimension)]

According to Embodiment 1, when the clustering process is performed based on the rate of the classified color corresponding to the above learning pickup image, the three-dimensional color space is defined by the CPU 210. The classified colors corresponding to three axes of the three dimensions are the top three colors extracted from the classified colors of the pixels contained in the process target region of each learning pickup image when groups are formed with respect to each car body color (designated color) as shown in FIGS. 19 to 21. According to the example of the contents shown in FIGS. 19 to 21, the top three colors in the classified colors corresponding to the learning pickup image having the car body color (designated color) of "white" are "white", "black" and "silver". Similarly the top three colors in the classified colors corresponding to the learning pickup image having the car body color (designated color) of "red" are "red, "black" and "white". Thus, the color space in which the extracted top three colors correspond to the dimensions is defined with respect to each designated color by the CPU 210.

In addition, the top three colors extracted from the classified colors of the pixels contained in the process target region of each learning pickup image are set to the three dimensions in the color space with respect to each designated color for the following reason. According to this embodiment, the distance between the barycenter of the cluster and the coordinates in each color space corresponding to the rate of the classified color calculated from the recognition target image similarly is calculated by means of the Mahalanobis distance. As the variance-covariance matrix of each coordinates constituting the cluster and its inverse matrix are needed in the Mahalanobis distance, the Mahalanobis distance cannot be calculated when the inverse matrix cannot be calculated. There are two cases where the inverse matrix cannot be calculated.

<<1>> Case Where There is Linear Combination Between Variables

<<2>> Case Where the Number of Variables is not Less than the Number of Samples

According to the first case, it is necessary to remove either variable in the linear combination from an analysis target. According to the second case, it is necessary to increase the number of samples or reduce the number of variables.

When the data used in the learning process in this embodiment 1 are referred, it is characterized in that the important color components for constituting the color in the classified colors calculated from the learning pickup image of each designated color are about three and the values of the other five color components are close to 0 (linearly combined). That is, the color components other than three colors are components (dimensions) having no correlation to the data. Thus, when only the dimensions of the color components having the correlation are extracted to generate the cluster, it is expected that the color can be recognized by the Mahalanobis distance.

Thus, since the three color components are used, the rates of the classified colors corresponding to the three color components and the rest of them (other) make four clusters. For example, the standard colors in the color space used for classify the learning pickup image having the designated color of white is "white", "black" and "silver", and the rates of the classified color are classified into each cluster at the time of recognition. However, as the cluster corresponding to the image of the colors other than "white", "black", "silver", appropriate cluster separated from another cluster does not exist in this color space. Thus, it is necessary to classify the rates of the classified colors of the learning pickup image corresponding to the specified colors other than the color components serving as the standard colors, as the "other" cluster.

FIG. 22 is an explanatory diagram showing an example of contents of the standard colors corresponding to the dimensions of the color space when the color recognition method is implemented in Embodiment 1. As shown in the explanatory diagram of FIG. 22, the top three colors extracted by the CPU 210 are set as the standard colors with respect to each car body color, and the color space in which the standard colors correspond to the dimensions is defined by the CPU 210. In addition, since the top three colors extracted for the car body colors "white", "black" and "silver" are common, the color spaces in which those standard colors correspond to the dimensions are combined to one color space (refer to FIG. 6). Therefore, the number of combinations of the standard colors extracted by the CPU 210 based on the eight car body colors becomes from eight to six, and the color spaces corresponding to the combinations are defined (refer to FIGS. 6 to 11).

[4.3.1.2 Clustering Process]

The coordinates corresponding to the rates of the classified colors of the learning pickup image shown in FIGS. 19 to 21 are specified as shown in FIGS. 6 to 11 and the clustering process is performed. For example, the coordinates corresponding to "white" are specified in each of the six color spaces, based on the rates of the classified colors of each learning pickup image having the car body color (designated color) of "white". FIG. 23 is an explanatory diagram showing an example of contents of the coordinates in each learning pickup image specified in one color space by the CPU 210 of the color recognition apparatus 200, in the clustering process in the color recognition method in this embodiment. In the example of the contents shown in FIG. 23, the example of the contents of the coordinates corresponding to the learning pickup image of each specified color are shown in the color space shown in the image view of FIG. 7 (referred to as the space 2 in which "white", "black" and "red" correspond to the dimensions).

As shown in FIG. 23, coordinates (rates of the standard colors) are specified based on the rates of the classified colors "red", "black" and "white" corresponding to the dimensions of the space 2 with respect to each of the learning pickup images of "white", "black", "silver", "red", "yellow", "green", "blue", and "purple" of the car body color (designated color). At this time, since the rates of the standard colors (red, black, white) of the learning pickup images of the car body colors (designated color) other than "red", "white", and "black" are low and they are not biased to the standard colors, they are not expected to be separated as a cluster. Therefore, they are separated as the "other" cluster (refer to FIG. 7).

When the clustering process is performed for each color space, a cluster corresponding to each designated color is formed in each color space. FIG. 24 is an explanatory diagram showing an example of contents of each cluster and the barycenter coordinates of each cluster formed in each color space by the clustering process in the color recognition method in this embodiment. In addition, the example of the contents shown in FIG. 24 corresponds to the cluster information 231 stored in the HD 230 by executing the process in the operation S109 of the operation flow of FIG. 13 by the clustering means of the CPU 210. In addition, the example of the contents is only an example, so that the cluster information 231 may be in a form that the barycenter coordinates of the cluster in each color space is related with respect to each designated color as well as the form that the barycenter coordinates of each cluster is related with respect to each color space as shown in FIG. 24.

[4.3.2 Generation Result of Cluster]

As a result, the five coordinate groups are classified into 24 clusters (4 clusters for each of 6 color spaces). In addition, it has been confirmed that each cluster contains the coordinates corresponding to the learning pickup images of the same designated color. In general, the initial value is obtained from all data at random and the cluster is formed. In addition, the classification result of the K-Means method is likely to be affected by the initial value, which is to be noted when the learning data are few especially.

[4.3.3 Recognition]

The data (rates of the classified colors) used in the recognition is in the same form as that of the learning data, and 225 recognition target images are used in the images taken by the imaging device 10. FIG. 25 is an explanatory diagram showing an example of contents of the rates of the classified colors of the pixels contained in the process target region of the recognition target image, in the recognition process in the color recognition method in this embodiment. Coordinates are specified in each color space using the rates shown in FIG. 25 and distance from the barycenter of each cluster is calculated.

The recognition target image to be recognized includes various kinds of car images such as an image of a car body having a representative color and an image that is difficult to visually determine the original color of the car body. Color component data at the bonnet part are extracted from each image datum as the recognition data.

[4.3.4 Recognition Result]

The CPU 210 of the color recognition apparatus 200 calculates the above distance to determine which cluster is nearest, based on the rates of the classified colors of the recognition target image as shown in FIG. 25. In addition, the CPU 210 specifies the coordinates in all the color spaces shown in FIGS. 6 to 11, based on the rates of the classified colors of the recognition target image shown in FIG. 25 and calculates the distance from the barycenters of the four clusters in each color space. FIG. 26 is an explanatory diagram showing an example in which a shortest distant cluster is specified in each space based on the rates of the classified colors of the recognition target image in the recognition process in the color recognition method in this embodiment. As shown in FIG. 26, in the color space (space 1) in which "white", "black", and "silver" correspond to the dimensions (standard colors) in FIG. 6, the coordinates are specified based on the rates of "white" 0.528, "black" 0.154, and "silver" 0.259 in the classified colors shown in FIG. 25 and the distance is calculated. Similarly in the color space (space 2) in which "white", "black", and "red" correspond to the dimensions (standard colors) in FIG. 7, the coordinates are specified based on the rates of "white" 0.528, "black" 0.154, and "red" 0.013 of the classified colors shown in FIG. 25 and the distance is calculated.

As described above, the recognition process is performed based on the determination whether the designated color of the shortest distant cluster in each color space belongs to the "other" cluster or not, the frequency of the designated color and shortest distance, in compliance with the determination standard 235 shown in FIG. 12. FIG. 27 is an explanatory diagram showing an example in which the recognized color is selected from the shortest distant cluster corresponding to the recognition target image in the recognition process in the color recognition method in this embodiment. As shown in FIG. 27, the shortest distant clusters in the color spaces are specified as "white", "white", "white", "silver", "other" and "other" with respect to the recognition data shown in FIG. 25. According to the determination standard 235 shown in FIG. 12, "white" is selected and determined from the colors corresponding to the specified clusters, as the recognized color, based on the third or fifth standards.

[4.3.5 Recognition Rate]

A recognition rate showing that the recognition by the above recognition process is successful will be described based on an experiment. The recognition rate is calculated by the following formula (9).

$$\text{Recognition rate} = (\text{the number of the colors in which the true color (classified by the human) coincides with the recognized colors})/\text{all colors} \quad (9)$$

The calculated recognition rate (recognition data number: 225) is as shown in FIG. 28. FIG. 28 is an explanatory diagram showing the recognition result of the color recognition method in this embodiment. As shown in FIG. 28, the rate is 178/225. Thus, the recognition rate is 79.11%.

In addition, FIG. 28 shows recognition rates in the case other than the case where the standard colors of each designated color (corresponding to the dimensions of the color space) are the top three high rate classified colors in the process target region of the learning pickup image, that is, in the case where standard colors are the top one color, the top two colors and the top four colors for comparison. In other words, the number of dimensions in the color space is one, two and four. According to the case of the one dimension, the process target region is classified into one dominant color in the classified colors of the pixels contained in the process target region of the learning pickup image with respect to each designated color. As shown in FIG. 28, since the recognition rate is highest in the case where the top three colors are set as the standard colors in the three dimensions in the color space is highest, it can be understood that an effect is achieved when the top three colors are used, not only to calculate the Mahalanobis distance.

[4.4 Relearning]

According to this embodiment, in the recognition process, when the shortest distance of the most shortest distant cluster among the shortest distant clusters specified in the color spaces is not less than the predetermined value or the recognized color is determined as "unknown", the information is recorded as the relearning information 234. FIG. 29 is an explanatory diagram showing an example of contents of the relearning information 234 recorded by the color recognition method in this embodiment. As shown in FIG. 29, the relearning information 234 includes identification information of the recognition target image and rates of the classified colors. In addition, the recognition target image itself is preferably recorded.

[4.4.1 Addition of User Designated Color]

Figure 30:
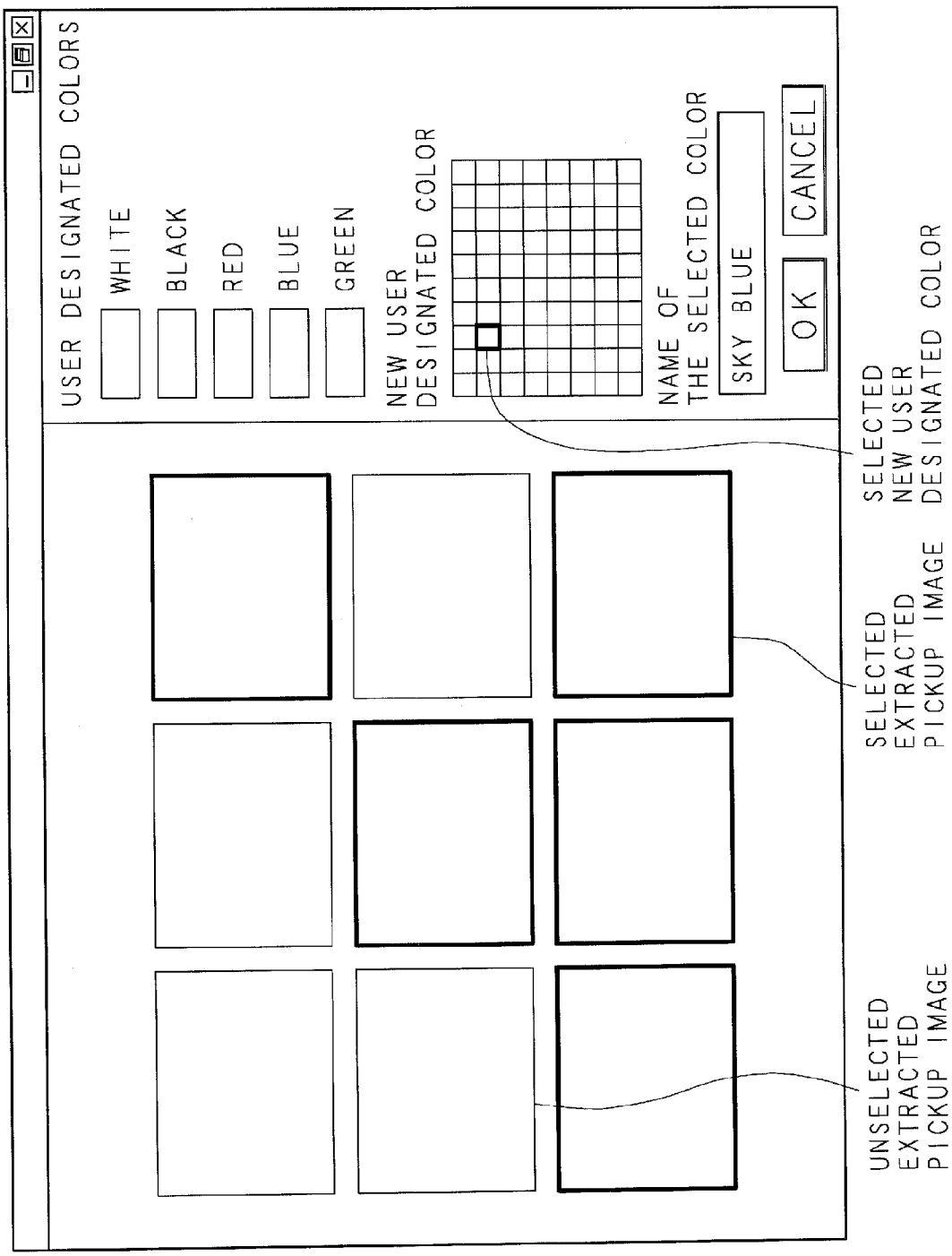
FIG. 30 is an explanatory diagram showing an example of a screen displayed to show the recognition target image outputted in a relearning process and to receive an input or selection of a corresponding user designated color in the color recognition method according to the embodiment.

The CPU 210 of the color recognition apparatus 200 sends the extracted recognition target image to the management computer 30 in the relearning process as shown in the operation flow of FIG. 16. In the management computer 30, the received recognition target image is outputted on the display of the management computer 30. FIG. 30 is an explanatory diagram showing an example of a screen displayed to receive the recognition target image outputted in the relearning process in the color recognition method in this embodiment, and the input or selection of the corresponding user designated color. As shown in FIG. 30, the extracted recognition target images are displayed and the user designated colors registered as the user designated colors previously are displayed so as to be selected. In addition, a new user designated color can be selected or inputted on this display. On the display like the screen example in FIG. 30, the user can input or select the user designated color, viewing the color of the corresponding region of the extracted pickup image. Here, when the user designated color is inputted or selected, the user can input a comment ("red in the clear sky" or "white in the rain", for example) at the time of the registration of the user designated color so as to be displayed later.

In addition, when the user inputs or selects the user designated color on the management computer 30 with respect to the extracted recognition target image, the user may input or select the color with respect to each extracted recognition target image or may be input or select one user designated color for a group of the plurality of images designated from the extracted recognition target images (refer to FIG. 30). As shown in FIG. 30, the plurality of recognition target images are selected and one user designated color is inputted or selected. As shown in FIG. 30, the extracted recognition target images are displayed in the left window, and the user selects the images having the same user designated color and selects the color from the user designated colors registered and displayed in the upper right window or selects the color from a color palette displayed in the right center window and inputs it into a lower text box (When the color is selected from the color palette, the color title is automatically inputted into the text box and user can change it again. For example, the display "sky blue" can be changed to "sky blue in the clear sky"), and presses "OK" button, whereby the color recognition apparatus 200 starts the following clustering process.

[4.4.2 Relearning Process]

The management computer 30 sends the color selected or inputted by the user to the color recognition apparatus 200 as shown in the operation flow of FIG. 16. The CPU 210 of the color recognition apparatus 200 executes the learning process using the transmitted designated color and the recognition process image corresponding to the designated color, as the learning pickup image for each designated color. The CPU 210 reads the rates of the classified colors of the extracted recognition target image in which the designated color is inputted or selected, and executes the clustering process in each color space based on the read rates of the classified colors by the clustering means 215.

When the designated color inputted or selected for the extracted recognition target image is the already existing user designated color, the clustering process may be executed based on the rates of the classified colors of the already learned learning pickup image. Thus, data (coordinates) constituting the formed cluster are increased and the existing cluster becomes more preferable configuration and the precision can be expected to be improved. In addition, a new color space is formed and a new cluster is formed depending on the rates of the classified colors of the extracted recognition target image. As a matter of course, there is a case where the configuration of the existing cluster is only changed.

Figure 31:
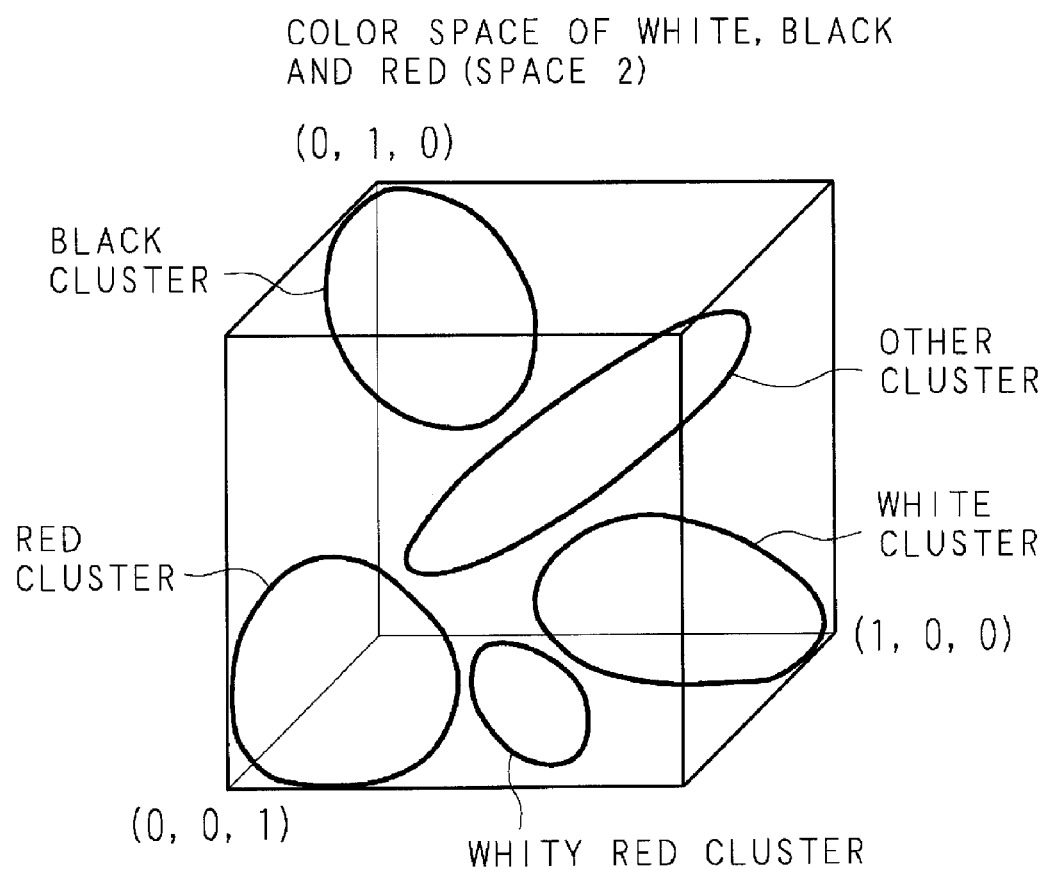
FIG. 31 is an image view showing clusters formed based on a new designated color by the relearning process in the color recognition method according to the embodiment.

When the designated color inputted or selected for the extracted recognition target image is not the existing user designated color, a new user designated color is added and a cluster corresponding to it is formed. FIG. 31 is an image view of clusters formed corresponding to a new designated color in the relearning process by the color recognition method in this embodiment. Although "white" or "red" is recognized, in the case where a plurality of recognition target images in which the most shortest distance between the barycenter of a "white" cluster or "red" cluster and the coordinates corresponding to the rates of the corresponding classified colors in the space 2 is not less than a predetermined threshold value have been recorded, these are sent to the management computer 30. When a new designated color such as "whitish red" and the like is selected or inputted in the management computer 30, a new "whitish red" cluster is formed in the space 2 by the color recognition apparatus 200. Thus, the new cluster is added, so that the color can be recognized with higher accuracy.

Thus, according to the color recognition apparatus in this embodiment, when the user just designates the color of the pickup image as the user designated color, the cluster is formed in the color space for learning, and when the recognition target image is inputted after the cluster has been formed, the recognition color of the process target region in the recognition target image can be determined with higher recognition rate by correlating the cluster formed by the learning process to the recognition target image. In addition, according to the recognition target image that cannot be related to the cluster formed by the learning process in the color space, it is extracted by a certain trigger and can be relearned when the user designates the user designated color of the above recognition target image, so that the learning is promoted expansively and high recognition rate can be expected as the lapse of time.

(Embodiment 2)

According to Embodiment 1, the one color recognition apparatus 200 executes the learning process, the recognition process for the recognition target image from the imaging device, and the relearning process based on the image determined as "unknown" in the recognition process. However, the present invention is not limited to this embodiment. For example, a color recognition system may be constituted by connecting a learning device performing the learning process and the relearning process, to an color recognition apparatus obtaining the cluster information 231 formed by the learning process as shown in FIG. 24 and performing the recognition process, based on that information and the determination standard 235 through the communication network, and the color recognition may be performed by the color recognition system. A description will be made of a constitution in which the color is recognized by the process between the physically distant devices through the communication network or communication line, for example. In addition, the same reference is allotted to the constitution common to Embodiment 1 and its detailed description will be omitted.

Figure 32:
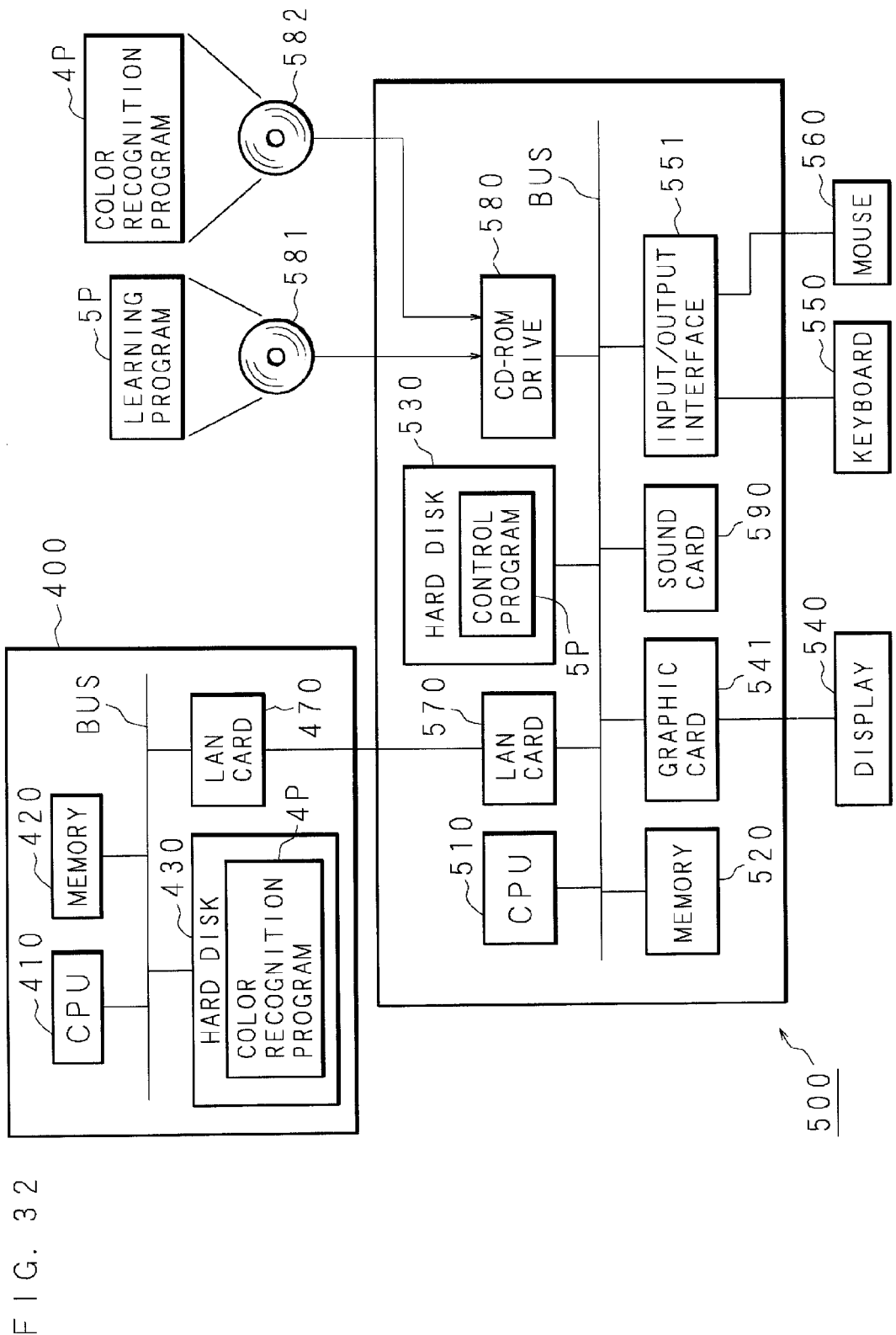
FIG. 32 is a block diagram showing a constitution of a color recognition system according to Embodiment 2.

FIG. 32 is a block diagram showing a constitution of a color recognition system according to Embodiment 2. Reference numeral 400 in FIG. 32 designates a color recognition apparatus, and its hardware configuration includes a CPU 410, a memory 420 such as a DRAM, a hard disk (HD) 430, and a LAN card 470. The color recognition apparatus 400 may be set together with an imaging device 10 or may be set in a factory. The color recognition apparatus 400 receives a pickup image as the recognition target image and performs a recognition process.

Reference numeral 500 in FIG. 32 designates a learning device and its hardware configuration is a personal computer configuration similar to the color recognition apparatus 200 and the management computer 30 in Embodiment 1, and it includes a CPU 510, memory 520, a hard disk (HD) 530, a display 540, a keyboard 550 and a mouse 560, a LAN card 570, a CD-ROM (DVD) drive 580, and a sound card 590. The keyboard 550 and the mouse 560 are connected to the CPU 510 through an I/O interface 551. The learning device 500 classifies the colors of the process target region into a user designated color or a new color through a learning process by a clustering method, based on a learning pickup image and a rates of classified colors of the process target region in the recognition target image corresponding to relearning information.

The color recognition apparatus 400 and the learning device 500 are connected through a LAN or another communication line or a communication network, so that data is exchanged to each other.

The color recognition apparatus 400 stores a color recognition program 4P read and transmitted from a recording medium 582 such as a CD-ROM and a DVD by the learning device 500, in a HD 430, and appropriately reads out to the memory 420 to recognize the color. In addition, the learning device 500 also reads a learning program 5P from a recording medium 581 such as a CD-ROM and a DVD and stores it in the HD 530 and reads it into the memory 520 appropriately and executes the program to perform the learning process for classifying the colors based on the rates of the classified colors. In addition, the color recognition program 4P and the learning program 5P separately provided as a computer program correspond to the part corresponding to the recognition process and the part corresponding to the learning process and relearning process, respectively in the color recognition program 2P read and executed by the CPU 210 of the color recognition apparatus 200 in Embodiment 1.

Figure 33:
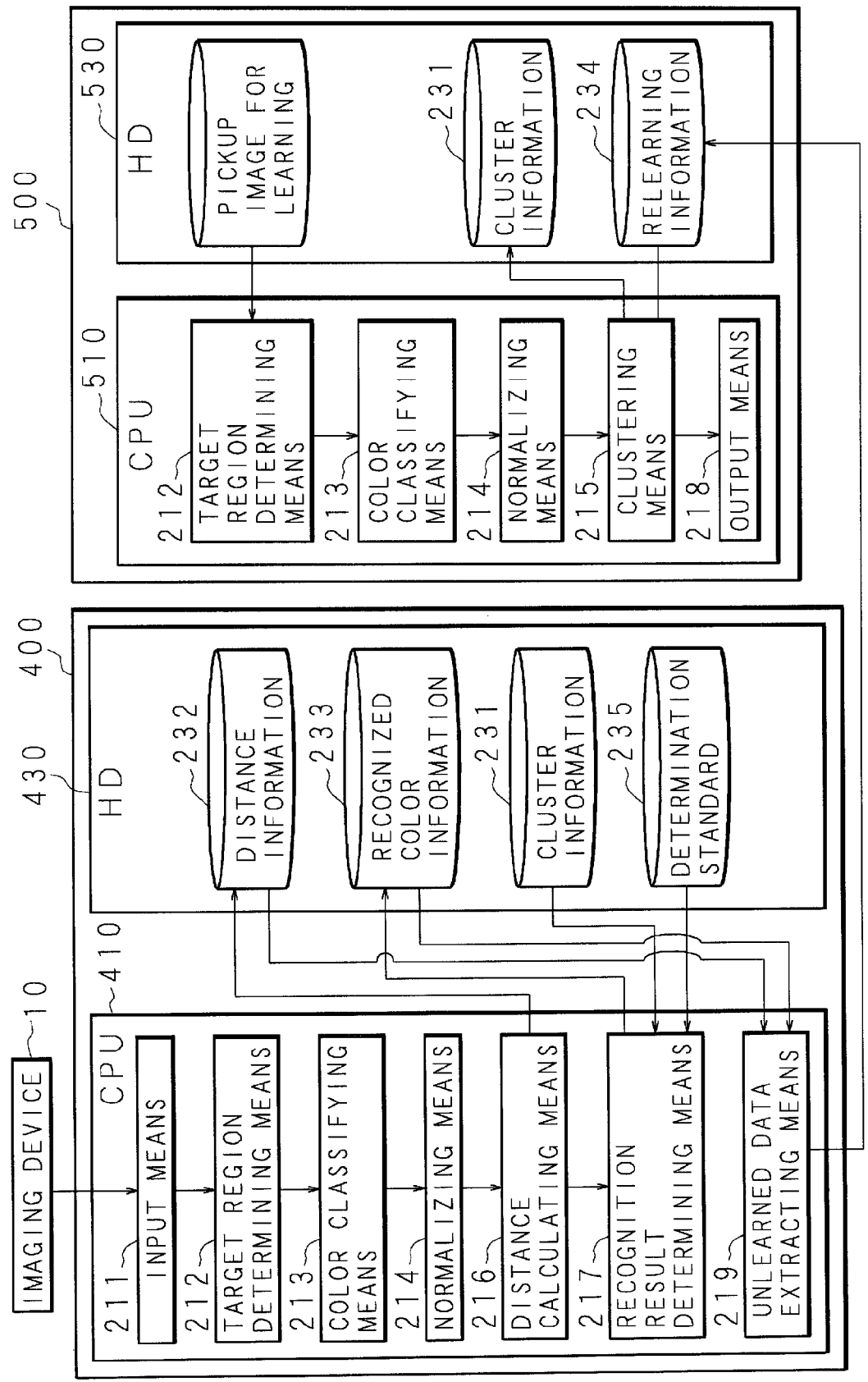
FIG. 33 is a functional block diagram showing the color recognition apparatus and a learning device according to Embodiment 2.

FIG. 33 is a block diagram showing functions of the color recognition apparatus 400 and the learning device 500 in Embodiment 2. The CPU 410 of the color recognition apparatus 400 reads out the color recognition program 4P from the HD 430 appropriately to the memory 420 and functions as input means 211 for inputting the recognition target image, target region determining means 212, color classifying means 213, normalizing means 214, distance calculating means 216, recognition result determining means 217, and unlearned data extracting means 219. In addition, when the CPU 410 functions as each means, distance information 232, recognized color information 233 and relearning information 234 are stored in the HD 430. Cluster information 231 and determination standard 235 serving as a standard when the color is recognized is stored in the HD 430.

The CPU 510 of the learning device 500 reads out the learning program 5P from the HD 530 appropriately to the memory 520 and functions as the target region determining means 212, the color classifying means 213, the normalizing means 214, the clustering means 215, and the output means 218. In addition, when the CPU 510 function as each means, the cluster information 231 is stored in the HD 530. In addition, relearning information 234 used in the learning process is stored in the HD 530.

In addition, since the color recognition program 4P and the learning program 5P read by the color recognition apparatus 400 and the learning device 500, respectively in Embodiment 2 correspond to the color recognition program 2P, the above each function is similar to the function implemented when the CPU 210 of the color recognition apparatus 200 reads and executes the color recognition program 2P in Embodiment 1. Therefore, the same reference is allotted to each function and its description will be omitted.

In addition, the cluster information 231 containing information of barycenter coordinates of each cluster stored in the HD 530 when the CPU 510 of the learning device 500 executes the learning process is transmitted to the color recognition apparatus 400 after the learning process, and stored in the HD 430 of the color recognition apparatus 400 and used in the recognition process. Therefore, the contents of the cluster information 231 stored in the HD 430 of the color recognition apparatus 400 and cluster information 231 stored in the HD 530 of the learning device 500 in FIG. 33 are the same after the transmission.

Next, a description will be made of each operation process executed by the color recognition apparatus 400 and the learning device 500 in the color recognition system constituted as described above. In addition, the cluster information 231, the recognition result and the recognition rate provided in each operation process is the similar to [4. Specific Application Example] in Embodiment 1.

(Learning)

First, the learning pickup image is obtained by the learning device 500, and the CPU 510 of the learning device 500 performs the process for classifying the colors of the process target region in each learning pickup image by the functions of the target region determining means 212, the color classifying means 213, the normalizing means 214, and the clustering means 215. The process procedure of the learning process performed by the CPU 510 of the learning device 500 may be the same as that shown in the operation flow in FIG. 13 in Embodiment 1. However, according to the clustering process, it is not necessary to cluster the coordinate groups corresponding to the learning pickup image with respect to each previously given designated color. Therefore, according to Embodiment 2, the learning is performed by the clustering process without previously classifying the learning pickup image with respect to each designated color.

Figure 34:
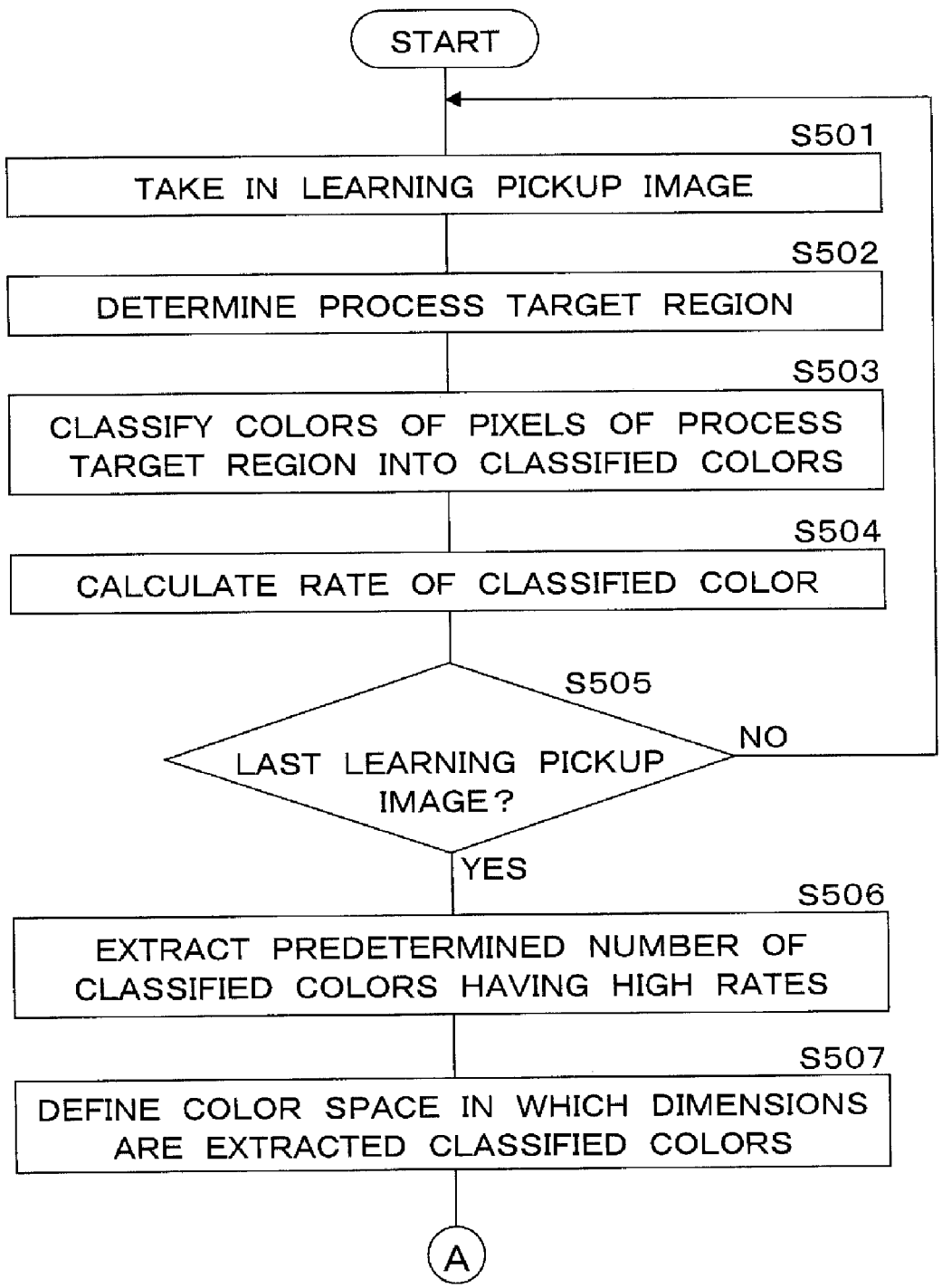
FIG. 34 is an operation flow showing one example of a procedure of a learning process by a CPU of the learning device according to Embodiment 2.
Figure 35:
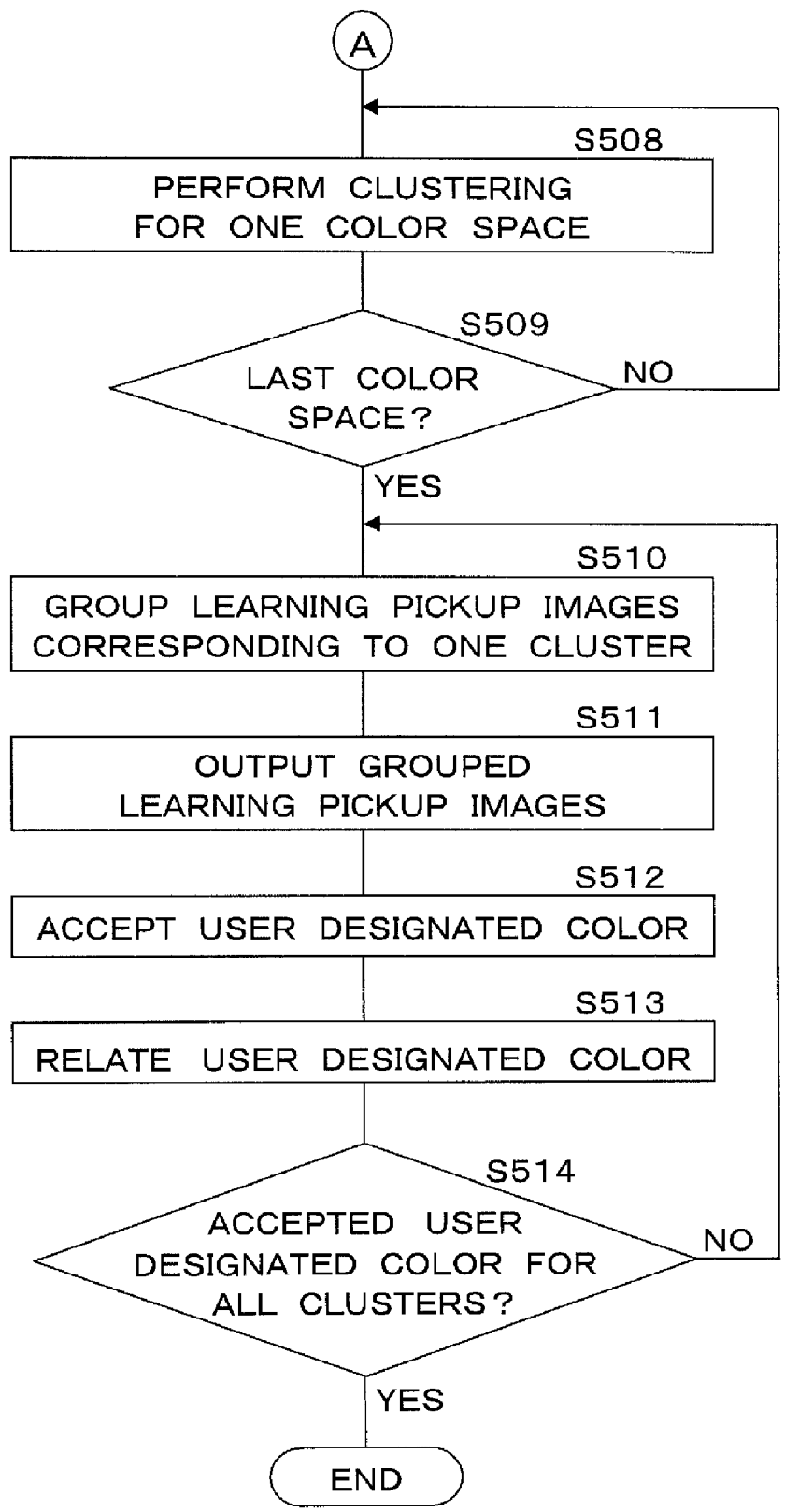
FIG. 35 is the operation flow showing one example of the procedure of the learning process by the CPU of the learning device according to Embodiment 2.

FIGS. 34 and 35 are operation flows showing one example of process procedure of the leaning by the CPU 510 of the learning device 500 in Embodiment 2. The CPU 510 of the learning device 500 previously obtains the learning pickup image taken by an imaging device that is not limited to the imaging device 10 and stores it in the HD 530. In this case, the learning pickup image does not necessarily correspond to the user designated color.

The CPU 510 of the learning device 500 takes in the learning pickup image stored in the HD 530 (operation S501). The CPU 510 of the learning device 500 determines a bonnet region of a car to be recognized as the process target region from the taken learning pickup image by the target region determining means 212 (operation S502). The CPU 510 of the learning device 500 classifies the colors of pixels of the process target region of the learning pickup image into the classified colors by the color classifying means 213 (operation S503). In addition, the CPU 510 of the learning device 500 calculates the rates of the classified colors by dividing the pixel number of each classified color of the process target region of the learning pickup image by the pixel number contained in the process target region (operation S504) by the normalizing means 214.

The CPU 510 of the learning device 500 determines whether the learning pickup image taken in the operation S501 is the last learning pickup image in the learning pickup images stored in the HD 530 or not (operation S505), and when it is determined that the learning pickup image is the last one (S505: YES), the process proceeds to the next operation S506. When the CPU 510 of the learning device 500 determines that the learning pickup image is not the last one (S505: NO), the process is returned to the operation S501 and the next learning pickup image is processed. Thus, the rates of the classified colors in all the learning pickup images are calculated in the above processes.

The CPU 510 of the learning device 500 extracts the predetermined number of high rate classified colors, based on the rates of the classified colors in each learning pickup image (operation S506). At this time, the CPU 510 extracts the top three classified colors. The CPU 510 of the learning device 500 defines a color space in which the extracted classified colors correspond to dimensions with respect to each learning pickup image (operation S507). Thus, color spaces are defined as shown in FIGS. 6 to 11.

The CPU 510 of the learning device 500 executes the clustering process for each of the defined color spaces, based on the rates of the classified colors in each process target region by the clustering means 215 (operation S508). The CPU 210 of the color recognition apparatus 200 determines whether the color space in which the clustering process is performed is the last one of all the color spaces or not (operation S509), and when it is determined that the color space is not the last one (S509: NO), the process is returned to the operation S508 and the next color space is processed. Meanwhile, when the CPU 510 of the learning device 500 determines that the color space is the last one (S509: YES), the process proceeds to the next operation.

When the operation S509 completes, the CPU 510 of the learning device 500 completes the process in which the colors in the process target regions of all the learning pickup images stored in the HD 530 are classified based on the rates of the classified colors. Then, the name (identification mane) is allotted to each of the classified colors, so that the user can identify the formed cluster information when used.

Next, the CPU 510 of the learning device 500 groups the learning pickup images corresponding to the formed cluster (operation S510), and outputs the grouped learning pickup images collectively to the display 540 (operation S511), and receives the selection or input of the user designated color (operation S512). The CPU 510 of the learning device 500 relates the received user designated color to the cluster corresponding to the grouped learning pickup images and stores them as the cluster information 231 (operation S513). The CPU 510 of the learning device 500 determines whether it received the user designated colors for all the formed clusters or not (operation S514), and when it is determined that the user designated colors for all the clusters are not received (S514: NO), the process is returned to the operation S510 and the user designated color for the next cluster is received. When the CPU 510 of the learning device 500 determines that it has received the user designated colors for all the clusters (S514: YES), it completes the learning process.

Figure 36:
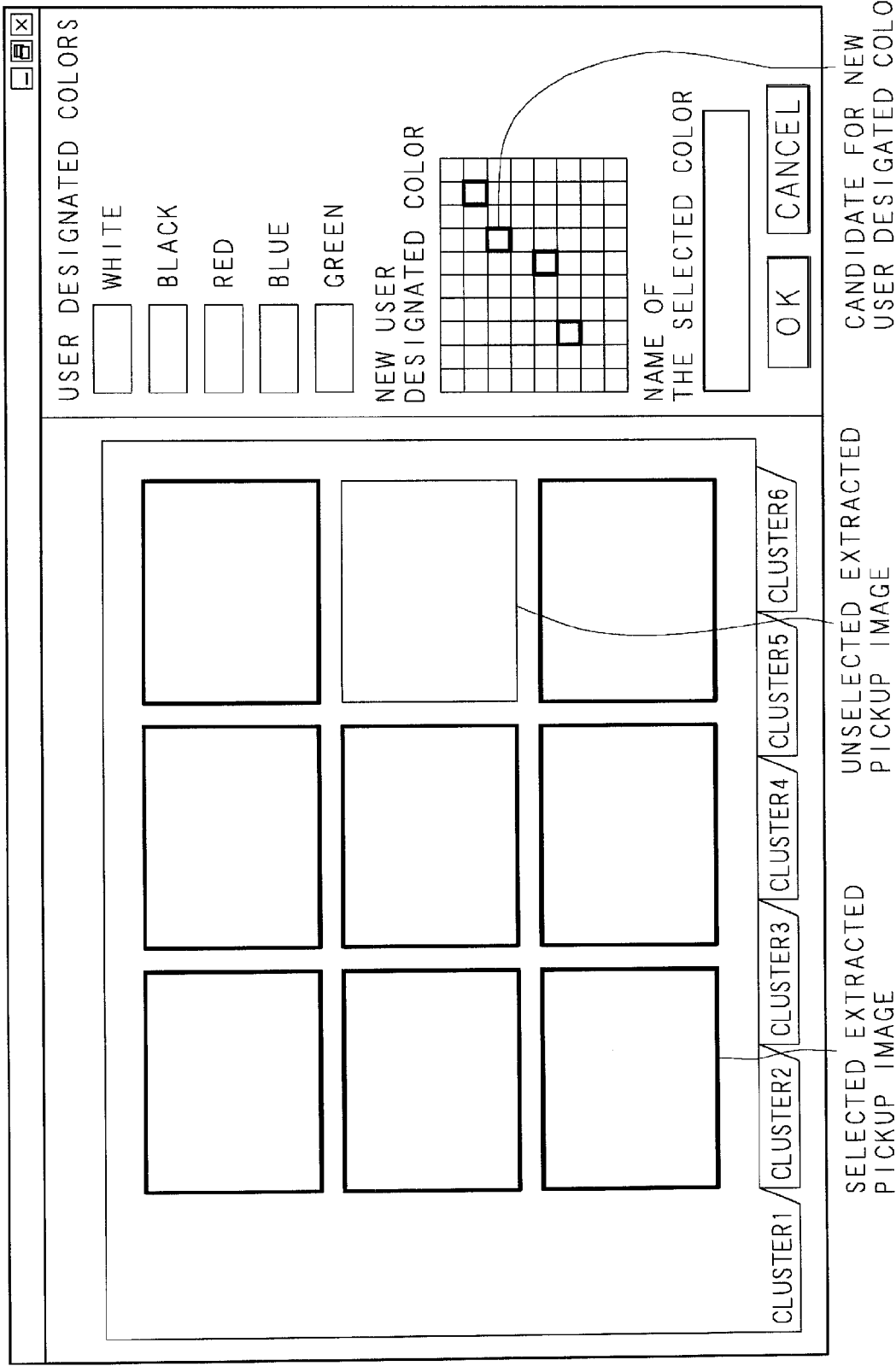
FIG. 36 is an explanatory diagram showing an example of a screen outputted to receive an input or selection of a user designated color in the learning process in the color recognition method according to the embodiment.

FIG. 36 is an explanatory diagram showing an example of a screen outputted to receive the input or the selection of the user designated color, in the learning process in the color recognition method in this embodiment. As shown in FIG. 36, the learning pickup images grouped with respect to each cluster are divided by tabs and displayed, and the user designated colors registered as the user registered colors are displayed so as to be selected. Furthermore, new user designated colors are displayed so as to be selected or inputted. On the display like the screen example of FIG. 36, the user inputs or selects the user designated color while viewing the color of the corresponding region of the learning pickup image with respect to each cluster and the color can be identified by the user designated color.

(Recognition)

A description will be made of the recognition process when the recognition target image taken by the imaging device 10 is received after the CPU 510 of the learning device 500 has executed the learning process as described above. In addition, since the color recognition apparatus 400 in Embodiment 2 has no cluster information 231 that is the information of the classified colors initially in the HD 230 because the learning process is executed by the learning device 500, it is necessary to obtain it.

Figure 37:
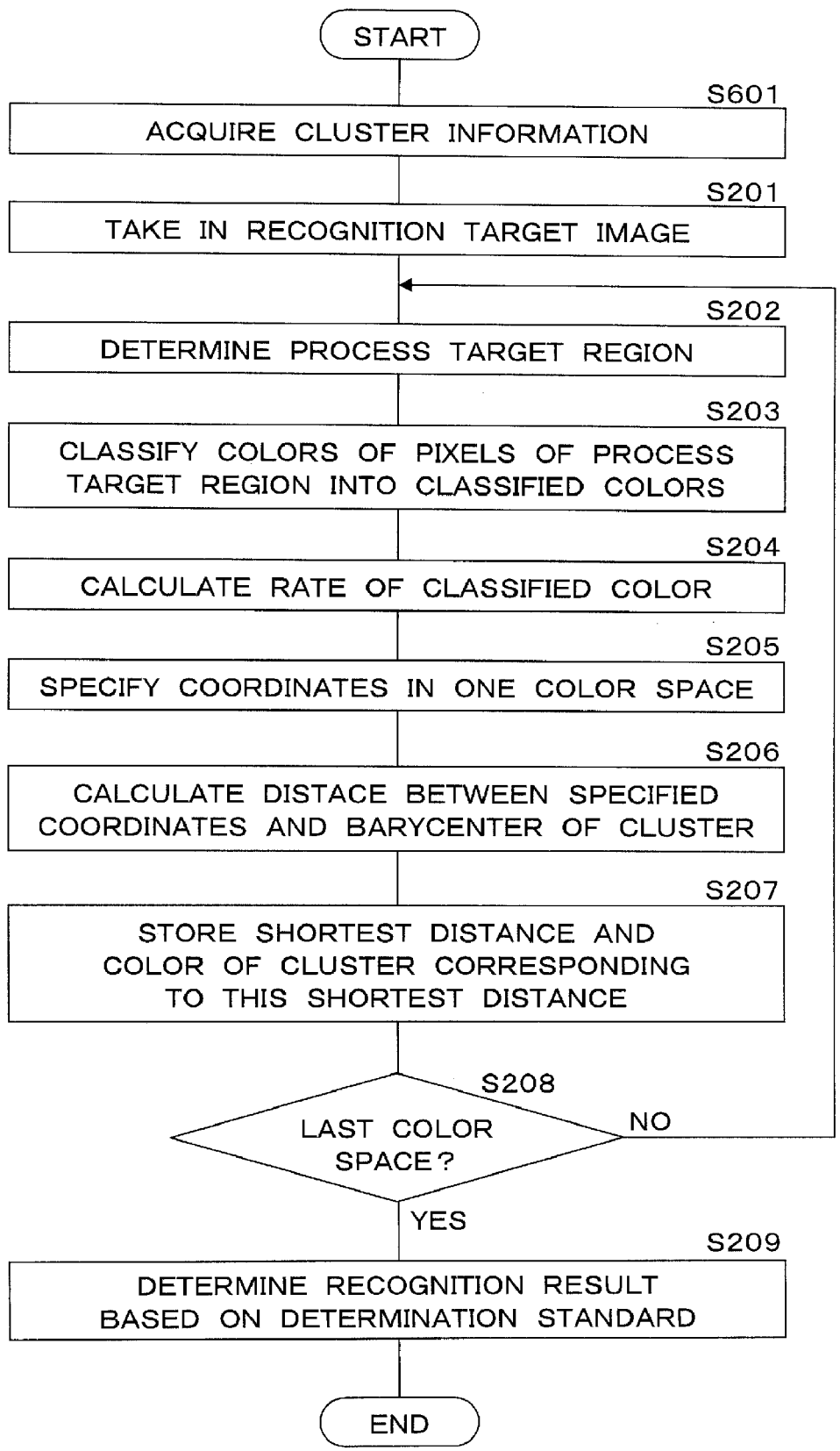
FIG. 37 is an operation flow showing one example of a procedure of a recognition process by the CPU of the color recognition apparatus according to Embodiment 2.

FIG. 37 is an operation flow showing one example of a process procedure of the recognition by the CPU 410 of the color recognition apparatus 400 in Embodiment 2. In addition, since the recognition process performed by the CPU 410 of the color recognition apparatus 400 is the same as the process procedure shown in the operation flow of FIG. 14, the same step number is allotted to it and its description will be omitted.

The CPU 410 of the color recognition apparatus 400 obtains the cluster information 231 from the learning device 500 before the color recognition (operation S601). According to the obtaining method, a request signal is transmitted to the learning device 500, and the cluster information 231 transmitted in response to the request from the learning device 500 is received. Alternatively, the cluster information 231 stored in the recording medium once instead of through the LAN, is duplicated in the HD 430 of the color recognition apparatus 400.

Then, CPU 410 of the color recognition apparatus 400 uses the obtained cluster information 231 to execute the recognition process (operation S201 to operation S209).

In addition, as the relearning information 234 is recorded in the recognition process in Embodiment 1, the relearning information 234 is recorded in the recognition process in Embodiment 2 also. In addition, according to Embodiment 2, the CPU 410 of the color recognition apparatus 400 performs the processes for the recognition target image, and when the shortest distance is not less than a predetermined value in the recognition process or when the recognized color is determined as the "unknown", it transmits the image and the calculated rates of the classified colors to the learning device 500. Alternatively, the image and the calculated rates of the classified colors may be transmitted every time the recognition process is performed. Further alternatively, the CPU 410 of the color recognition apparatus 400 may extract the pickup image in which the distance from the most shortest distant cluster in the color spaces of the recognized color is not less than the predetermined value, based on the distance information 232 and the recognized color information 233 (or identification information of the recognition target image, the rates of the classified colors and the recognition target image recorded separately) by unlearned data extracting means 219 started by a predetermined trigger, and transmit it to the learning device 500. The CPU 510 of the learning device 500 records the transmitted recognition target image and rates of the classified colors in the HD 230 as the relearning information 234.

(Relearning)

Figure 38:
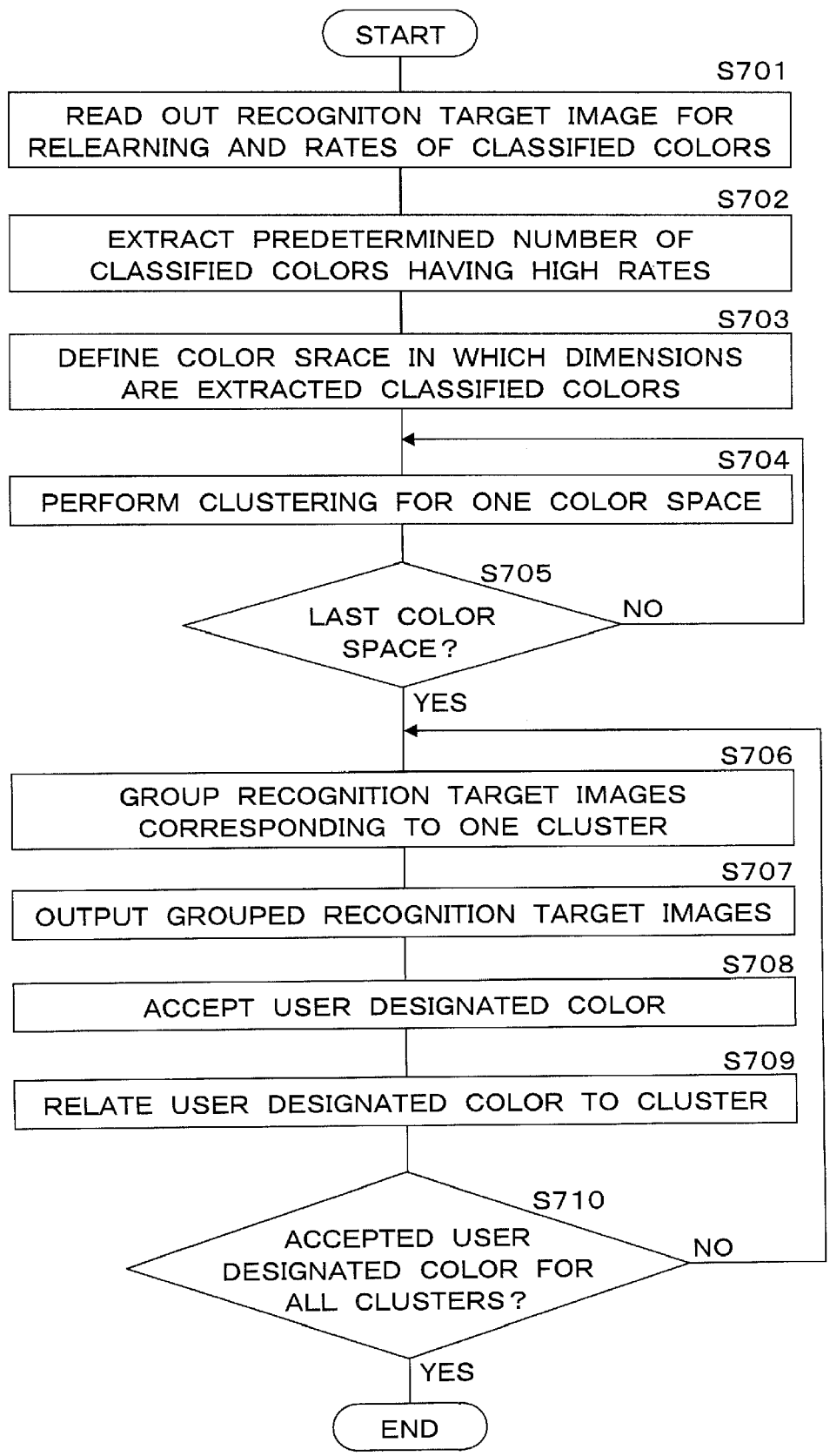
FIG. 38 is an operation flow showing one example of a procedure of a relearning process by the CPU of the learning device according to Embodiment 2.

The learning device 500 performs the relearning process by executing the learning process in which the clustering process is performed again based on the recognition target image of the relearning information 234 recorded in the HD 230. FIG. 38 is an operation flow showing one example of a process procedure of the relearning process performed by the CPU 510 of the learning device 500 in Embodiment 2.

The CPU 510 of the color recognition apparatus 500 reads out the recognition target image and the rates of the classified colors for relearning stored in the HD 530 for the relearning process as relearning information 234 (operation S701), and extracts the predetermined number (three) of high rate classified colors in the read classified colors for each recognition target image (operation S702). The CPU 510 of the learning device 500 defines a color space in which the extracted classified colors corresponds to dimensions (operation S703). In addition, when the defined color space is the same as the existing color space, the existing color space is used.

The CPU 510 of the learning device 500 executes the cluster process with respect to each color space based on the rates of the classified colors in the recognition target image for the relearning process by the clustering means 215 (operation S704). The CPU 510 of the learning device 500 determines whether the clustered color space is the last color space or not (operation S705), and when it is determined that the color space is not the last one (S705: NO), the process is returned to the operation S704 and the next color space is processed.

When the CPU 510 of the learning device 500 determines that the color space is the last one (S705: YES), the recognition target images corresponding to one cluster in the formed clusters are grouped (operation S706). The CPU 510 of the learning device 500 outputs the grouped recognition target images collectively to the display 540 (operation S707), and receives the selection or input of the user selected color (operation S708). The CPU 510 of the learning device 500 relates the received user designated color to the cluster corresponding to the grouped learning pickup images and stores them as the cluster information 231 (operation S709). The CPU 510 of the learning device 500 determines whether it received the user designated colors for all the formed clusters or not (operation S710), and when it is determined that the user designated colors for the all the clusters are not received (S710: NO), the process is returned to the operation S706 and the user designated color for the next cluster is received. When the CPU 510 of the learning device 500 determines that it has received the user designated colors for all the clusters (S710: YES), it completes the relearning process.

The screen example outputted to the display 540 in the operation S707 in the process procedure shown in the operation flow of FIG. 38 is similar to the example displayed to receive the input or selection of the user specified color in the learning process (refer to FIG. 36). Thus, as compared with the case where the user designated color is received with respect to each recognition target image, since the user designated color can be designated with respect to recognition target images grouped so as to be related to the colors grouped to some extent and classified by the clustering process objectively it is user friendly.

In addition, although the cluster process is performed first in the process procedure shown in the operation flow of FIG. 38, the clustering process may be executed again so as to form a cluster corresponding to the received designated color after the designated color is received. Thus, the accuracy of the cluster information 231 used in the recognition process is improved and the recognition rate by the color recognition apparatus 400 is expected to be improved.

In addition, although the selection or input operation of the user becomes simple because the recognition target images are grouped with respect to the cluster previously in the process procedure of the operation flow of FIG. 38, the grouping method may be another method.

Figure 39:
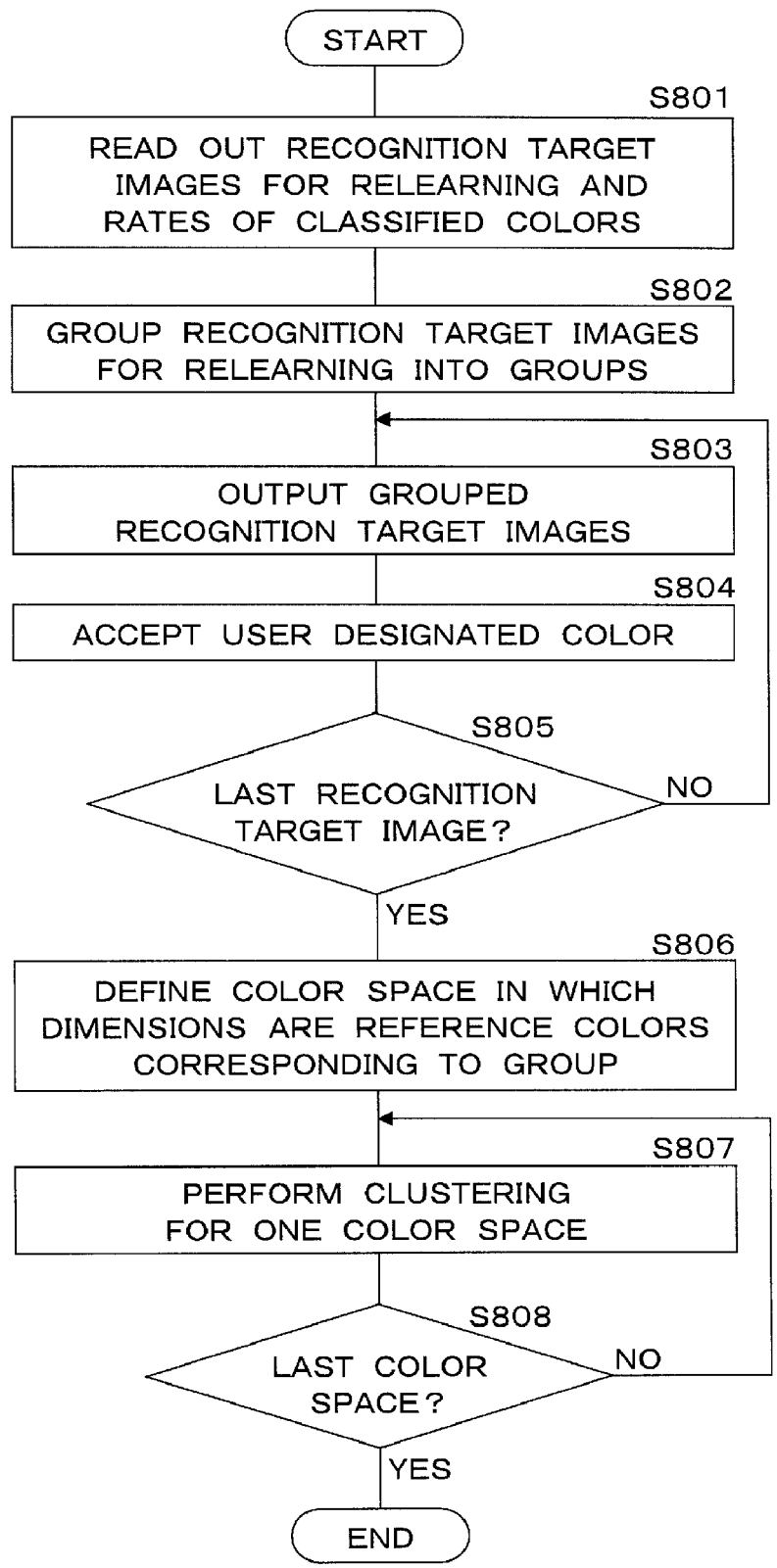
FIG. 39 is an operation flow showing one example of the procedure of the relearning process by the CPU of the learning device according to Embodiment 2.

For example, the CPU 510 of the learning device 500 may group the recognition target images having common standard colors that are top three high rate classified colors in each recognition target image. For example, according to the example of the contents shown in the explanatory diagram of FIG. 29, the images 1 and the image 2 commonly have "white", "black" and "silver" standard colors, so that the images are grouped into a group of the image 1 and image 2 and a group of the image 3. FIG. 39 is an operation flow showing one example of a process procedure of the relearning process performed by the CPU 510 of the learning device 500 in Embodiment 2.

The CPU 510 of the learning device 500 reads out the recognition target image and the rates of the classified colors stored in the HD 530 as the relearning information 234 for relearning process (operation S801), and groups the classified colors that are the predetermined number (three) of top high rate colors in the classified colors in the recognition target image (operation S802). The CPU 510 of the learning device 500 outputs the grouped recognition target images collectively to the display 540 (operation S803), and receives the selection or input of the user designated color (operation S804).

The CPU 510 of the learning device 500 determines whether the outputted recognition target image is the last recognition target image or not (operation S805), and when it is determined the recognition target image is not the last one (S805: NO), the process is returned to the operation S803 and the recognition target image of the next group is outputted.

When the CPU 510 of the learning device 500 determines that the recognition target image is the last one (S805: YES), it defines the color space in which the predetermined number of combinations of classified colors set as the standard colors when grouped in the operation S802 correspond to dimensions (operation S806). In addition, when the defined color space is the same as the existing color space, the existing space is used.

The CPU 510 of the learning device 500 executes the clustering process for one color space, based on the rates of the classified colors in the relearning recognition target image, with respect to each received user designated color by the clustering means 215 (operation S807). The CPU 510 of the learning device 500 determines whether the clustered color space is the last one or not (operation S808), and when it is determined that the color space is not the last one (S808: NO), the process is returned to the operation S807 and the next color space is processed. Meanwhile, when the CPU 510 of the learning device 500 determines that the color space is the last one (S808: YES), the relearning process is completed.

when the recognition target image is outputted to the display 540 to receive the selection or input of the user designated color in the process procedure shown in the operation flow of FIG. 39 (S803), the screen is the same as the example displayed to receive the input or selection of the user designated color in the learning process (refer to FIG. 36).

By the processes shown in the operation flow of FIG. 38 or 39, the recognition target images for the relearning process can be displayed with respect to each group before or at the same time the user inputs or selects the user designated color for the recognition target image for relearning. Especially, the operation for designating the extracted pickup image belonging to the group performed before one user designated color is inputted or selected with respect to each group becomes easy. In this case, since the extracted pickup images having the similar colors are collected, it is preferable that the extracted pickup images having the similar colors are displayed automatically, and the extracted pickup image determined to be unsuitable in the group of the user designated colors is removed from the group by the user. The determination of the similar colors may be made based on the position, in the color system space, of the color having highest frequency in pixel number at the process target part of the pickup image, or the rates of the classified color at the process target part of the pickup image. In the latter case, since the color space of the top three high rate classified colors is used in this embodiment, only the top three rates can be the determination targets.

It is preferable that before the user designated color is inputted or selected for the recognition target image displayed on the display 540 by the user, the suitable cluster is formed in the clustering process by the learning device 500 and when the user designated color is inputted or selected for the recognition target image corresponding to each cluster, this corresponding recognition target image is displayed at the same time. Therefore, at the time of the relearning also, the recognition target images corresponding to each cluster are displayed with respect to each tab as shown in the screen example of FIG. 36 (according to the screen example of FIG. 36, this case corresponds to the case where six new clusters are formed in total).

In addition, in order to make easier the operation for inputting or selecting the user designated color by the user, it is preferable that a color corresponding to the cluster selected and being displayed at the present is automatically displayed to be selected in the color palette at the right window. Furthermore, it is preferable that the recognition target images corresponding to the same cluster are previously selected as shown in the screen example of FIG. 36 and the user performs an operation to cancel the selection of them because it is highly likely that the recognition target images belonging to the same cluster have the similar user designated colors, so that it is timesaving for the user just to cancel the selection rather than to select the recognition target image several times. According to the screen example of FIG. 36, after the user inputs or selects the user designated color, every time when "OK" button is pressed, the clustering process corresponding to the given designated color is started, or after the user designated colors of all the required tabs are selected, the "OK" button is pressed to start the clusters process again. In this case, the number of clustering can be reduced.

In addition, as it is necessary to designate the clustering number in each color space before the clustering process in the K-Means method, for example, the clustering number that is one more than that at the time of previous clustering execution is designated and when only the recognition target image extracted as "unknown" belong to the new cluster, it is determined that the appropriate cluster is formed and the process is continued, while when the extracted recognition target image and the learning pickup image mixed are mixed in the new cluster, the cluster is not to be processed (not allow the user to input or select the user designated color), and the next color space is processed. Thus, it is preferably to determine whether the newly formed cluster is an appropriate cluster or not and the user inputs or select the user designated color only for the appropriate cluster. The determination whether the newly formed cluster is the appropriate cluster or not is made depending on whether the image belonging to the above new cluster is the extracted recognition target image or not, whether the new cluster is sufficiently apart from other clusters or not (when they are too close to each other, the determination cannot be accurately made at the time of color recognition), or whether the occupied region of the new cluster is smaller than the other clusters or not, as indexes. This determination whether the cluster is appropriate or not is preferably applied at the time of cluster formation also in the case where the clustering process is performed again in the recognition target image and the learning pickup image extracted when the user inputs or selects the user designated color for the recognition target image, and it is also preferably applied at the time of cluster formation in Embodiment 1. However, some indexes cannot be used.

(Learning)

According to the present technique, as a learning stage before a color is recognized, a plurality of pixels contained in a process target region in a learning pickup image are classified into predetermined classified colors and the color distribution is calculated by calculating a rate of each classified color. The predetermined number of top high rate classified colors are extracted from the calculated rates of the classified colors with respect to the process target region of each pickup image, and the color space in which the classified colors are set to dimensions and the rate of the classified color is provided in the dimensional direction is defined with respect to each combination of the extracted classified colors. In this case, according to the present technique, not all the classified colors correspond to the dimensions in the color space, but the predetermined number of high rate classified colors are selected to correspond to the dimension in the color space. In addition, the number of the color spaces correspond to the number of combinations of the extracted classified colors. In the case of eight classified colors, a first classified color, a second classified color, and a third classified color correspond to the dimensions of the color space, or the first classified color, a fourth classified color, and a fifth classified color correspond to the dimensions of the color space. That is, the color space is formed by the combination of the classified colors. In addition, the predetermined classified colors provided when the plurality of pixels are classified can be added and reduced. The number of classified colors may be eight, six, twelve, or the like. Thus, the coordinates corresponding to the color distribution of the process target region of each pickup image is specified based on the calculated rate of the classified color in the process target region of each pickup image with respect to each of the defined color spaces. The specified coordinates are separated by clustering and the cluster is formed, whereby the color of the process target region in the pickup image can be classified.

In addition, the process target region in the pickup image may be a human being, an animal, a car, a landscape, or the like. In the case of the car, the process target region may be a bonnet of a four-wheel car to classify the color of the car. In addition, the clustering method may be either a hierarchical method or a non-hierarchical method.

In addition, when the pixels of the process target region in the pickup image are classified, it is preferable that the image is converted from a RGB color system to a HSI color system and thereby the color can be accurately classified. In addition, when the pixels are classified into the classified colors, since it is preferable that all the pixels are classified into any of the classified colors, the HSI color system is divided by the number of the classified colors and the colors of the pixel are classified so as to belong to any of the divided color system.

According to the present technique, as the learning stage before the color is recognized, the plurality of pixels contained in the process target region in the learning pickup image to which the designated color is given are classified into the predetermined classified colors and the rate of the classified color is calculated. The color space in which the dimensions correspond to the classified colors extracted with respect to the process target region of each pickup image is defined with respect to each combination of the classified colors extracted. The coordinates in each defined color space are specified with respect to each designated color given, based on the calculated rate of the classified color with respect to the process target region of the pickup image, and the coordinate group with respect to each designated color is formed as a cluster of the designated color. In other words, the relation between the distribution of the rates of the classified colors of the process target region and the designated color is learned through the clustering. Thus, the designated color is selected as a recognized color by determining the cluster of the designated color corresponding to the color.

Furthermore, according to the present technique, the top three high rate classified colors are extracted from the classified colors calculated with respect to the process target region of the pickup image, and the color space having three dimensions corresponding to the number of combinations of the extracted top three classified colors is defined. In addition, the image to be recognized as white can be classified into not only white but also a color containing the rates of other two colors. In addition, since the three dimensional color space is defined, the formed clusters can be easily separated.

Furthermore, according to the present technique, in each defined color space, since the clusters are formed by specifying the coordinates based on the rate of the classified color of each process target region regardless of whether the rate of the classified color in each learning pickup image is high or not, the cluster of the designated color overlaps with the cluster of another designated color in the designated colors corresponding to the dimensions of the color space. According to the present technique, the overlapping clusters are integrated and formed as the other cluster that has no clear correlation with the designated color in the color space. Thus, at the time of recognition, when the rate of the classified color cannot be clearly separated as the cluster, it belongs to the other cluster in the defined color space, that is, the recognized color is determined as the other color.

(Recognition)

According to the present technique, when the color of the recognition target image is recognized, the coordinates are specified with respect to the color space defined in the learning process, and the cluster corresponding to each designated color in each color space, based on the rate of the classified color of the process target region in the recognition target image, and the distance between the coordinates and the barycenter of the cluster is calculated. Thus, it is determined which cluster the color of the process target region of the recognition target image belongs to. A cluster in which the distance is the shortest is specified with respect to each of the color spaces corresponding to the combinations of the extracted classified colors in the learning process, and one of the designated colors of the specified clusters is selected and recognized as the color of the process target region of the recognition target image.

Furthermore, according to the present technique, when the color of the recognition target image is recognized, the color is selected based on one or more of the first standard in which the most common designated color among the designated colors of clusters specified with respect to each color space is regarded as the recognized color, the second standard in which when the most common designated color is the achromatic color and at least one chromatic color is contained, the chromatic color is regarded as the recognized color, the third standard in which when the colors are all the other colors, the determination is not made based on the cluster, and the fourth standard in which when the most common designated color is the other color, the recognized color is regarded as the unknown color.

Furthermore, according to the present technique, distances corresponding to the rates of the classified color of the process target region in the recognition target image and distances between the barycenters of each cluster are calculated by the Mahalonibis distance in which the variation in a coordinate group of the cluster is taken into consideration.

(Relearning)

According to the present technique, the recognition target image is recorded together with the rate of the classified color when it is not clear which cluster the color belongs to, such as when the distance from the cluster specified based on the rate of the classified color of the process target region in the recognition target image is not less than the predetermined value, or when the other color is most common in the designated colors of the specified cluster.

According to the present technique, the relearning process is performed such that the top predetermined number of classified colors are extracted from the classified colors recorded together with the recognition target image, the recognition target images are grouped so as to correspond to the combination of the extracted classified colors, the coordinates are specified in the color space in which the dimension corresponds to the classified colors corresponding to the grouped recognition target image, and the specified coordinate group is clustered and the new cluster is formed. In addition, the designated color may be set at the time of grouping, the coordinates are specified with respect to each set designated color, and the coordinate group with respect to each designated color may be formed as the new cluster of the designated color.

In addition, according to the present technique, when the new cluster is formed, the designated color of the cluster is set and the new cluster is formed as the cluster of the designated color set.

Furthermore, according to the present technique, when the learning process in which the new cluster is formed with respect to the recorded process target region is performed again, the designated color is set for each group at the time of grouping. The coordinates are specified in the color space based on the rate of the classified color with respect to each grouped recognition target image, with respect to each set designated color. The coordinate group specified with respect to each designated color is clustered and the new cluster of the designated color is formed.

(Learning)

In this embodiment, the color distribution of the process target region in the pickup image affected when blackness, redness, whiteness and the like are increased due to the shooting condition of the pickup image can be clustered based on the shooting condition. For example, the color can be classified into the new color influenced by the shooting condition in the pickup image such as "blackish red" or "whitish red" in addition to simple "red". In addition, when the classified color is added, it can be separated to the new cluster, so that the color can be classified into the new color. When the color distribution of the color classified based on the shooting condition with the color distribution of the image to be recognized, the color containing the influence of the shooting condition can be recognized based on the fact that it is affected by the shooting condition without modifying a color balance or brightness of the pickup image. Thus, the color can be recognized with the recognition error reduced and the accuracy improved.

In addition, according to this embodiment, even when the shooting condition varies, since the designated color is previously given and the relation between the designated color and the rate of the classified color can be leaned by the clustering, the color corresponding to the shooting condition can be recognized by selecting the corresponding designated color based on the rate of the classified color of the process target region in the recognition target image. That is, even when blackness, redness and whiteness are intense and their rates are high due to the color distribution of the classified color varied depending on the shooting condition of the pickup image, it can be recognized as the given designated color by the learning, so that the color affected by the shooting condition can be recognized with high accuracy.

Furthermore, since the color space is defined by the three classified colors, the color of the process target region can be classified in detail by the rates of the plurality of colors, and the color can be recognized with high accuracy based on the rates of the plurality of classified colors. Furthermore, the recognition rate can be improved as compared with the case where the color space is defined by two or four classified colors.

In addition, according to this embodiment, the cluster of the other color is formed other than the cluster of the designated color in each color space. Thus, when it is determined that the coordinates corresponding to the process target region belong to the other cluster in many color spaces at the time of recognition, the recognized color can be determined as the unknown color or can be suspended. In addition, when it is determined that the color does not belong to the cluster of the designated color in the color space and it belongs to the other cluster in a certain color space, the recognized color can be determined such that the designated color is not selected by an elimination method, so that the color recognition can be appropriately performed without making determination forcedly by selecting the color from the existing designated color.

(Recognition)

According to this embodiment, the color distribution of the cluster of the designated color that is similar to distribution of the process target region of the recognition target image is determined based on the distance between the coordinates corresponding to the color distribution and the barycenter of the cluster. The recognized color can be determined with high accuracy by calculating the distance from the cluster with respect to each of the plurality of color spaces.

According to this embodiment, when the color is recognized, the color is selected from the designated colors as the recognized color, based on the frequency or contents of the plurality of designated colors corresponding to the cluster specified with respect to each color space. Thus, even when the plurality of clusters are specified, the color can be selected from the designated colors appropriately based on the first standard, and even when the frequency of the achromatic color in the designated color of the specified cluster is high, the less frequent chromatic color is selected based on the second standard, so that the color can be appropriately selected. Furthermore, when the designated color of the specified cluster is the other color, the cluster is ignored and the color can be selected from the designated color of the other cluster based on the third standard. Thus, the color can be recognized based on the various conditions with high accuracy and when it is unclear which cluster the color belongs to, for example, when frequency determined that the color belongs to the cluster corresponding to the other color is high, the color is not forcedly selected from the given designated color but regarded as the "unknown" color based on the fourth standard, so that an inappropriate color is not selected as the recognized color and consequently, the recognition rate can be improved. Furthermore, it can be correctly recognized that the process target region of the recognition target image regarded as the unknown recognized color is to be recognized as a new color.

In addition, when the distance is calculated by means of Mahalanobis distance, the variation in the distribution of the rates of the classified colors of the learning image constituting the clusters is taken into consideration and the distance from the barycenter of the cluster of the designated color having uniform distribution of the rates is calculated to be longer, so that the color can be recognized with high accuracy.

(Relearning)

According to this embodiment, when it is unclear which cluster the coordinates corresponding to the color distribution of the process target region of the recognition target image belongs to, since it is likely that the color of the process target region should be recognized as the new color, they are recorded together with the calculated rates of the classified color. Thus, since the relation between the rates of the classified color calculated with respect to the recorded recognition target image and the new color is learned later, the new color can be recognized.

According to this embodiment, for the recognition target image corresponding to the coordinates not known which cluster it belongs to, due to the condition such that the shortest distance from the barycenter of the specified cluster is not less than the predetermined value, the learning process is performed again such that the cluster is formed based on the color distribution of the process target region of that recognition target image. Thus, even when the designated color cannot be selected appropriately, it can be dealt with through the relearning. Especially, according to this embodiment, the plurality of color spaces corresponding to the combinations of the extracted classified colors are defined and the new color space corresponding to the new combination of the classified colors can be defined. In addition, since the plurality of color spaces corresponding to the various combinations of the classified colors can be defined, even when the number of clusters is increased, the cluster corresponding to the new color can be formed, so that the cluster of the new designated color can be formed in addition to the existing color spaces and the existing clusters. That is, even when the designated color is increased, the color can be appropriately recognized with respect to the existing designated color.

In addition, according to this embodiment, when the cluster is increased or the color space is increased by clustering the recognition target image containing the process target region having the color that is likely to be recognized as the new color again, after the new cluster is formed by clustering or the images are grouped by the combination of the classified colors, the combination of the corresponding classified colors and the rates of the classified color can be outputted so as to urge the setting of the new designated color to be received. Thus, the cluster corresponding to the new designated color is formed to be relearned, and the new color can be recognized later.

The color classification method and recognition method according to the aspects can be applied to the color classification apparatus, the color recognition apparatus, the color recognition system containing both of them, and the program for the color recognition apparatus. The summary of the above-described technique is not one listing the characteristics essential for the embodiment and subcombination of these characteristics can be the embodiment.

Although the present techniques have been described with reference to the embodiments in the above, the disclosure does not limit the present techniques to the above-illustrated embodiments. Various kinds of modifications and variations may be added to the illustrated embodiments. Thus, such modifications and variations of the embodiments is contained within the same or equal scope thereof, which is clear from claims and means for soling the problem.

What is claimed is:

1. A color classification method comprising:
   determining a plurality of predetermined process target regions from a plurality of pickup images taken by an imaging device;
   calculating a plurality of color distributions of pixels contained in the respective determined process target regions; and
   forming a plurality of clusters by executing a clustering process based on the calculated color distributions for the pickup images, the method being for classifying a plurality of colors with respect to the respective formed clusters,
   the calculating step including:
      classifying the pixels contained in the process target region into predetermined classified colors; and
      calculating a plurality of rates of the respective classified colors,
   the forming step including:
      extracting predetermined number of the classified colors, whose calculated rates are highest in the calculated plurality of the rates, from among the predetermined classified colors, in the process target region of each pickup image;
      defining a plurality of color spaces, dimensions of each of which are selected from the predetermined number of the extracted classified colors, the dimensions having domains corresponding to the respective rates of the selected classified colors;
      specifying a plurality of sets of coordinates for each pickup image in respective color spaces based on the rates of the classified colors; and
      clustering the specified plurality sets of the coordinates in the respective color spaces into the predetermined number or more of the clusters.

2. A color recognition method comprising:
   determining a plurality of predetermined process target regions from a plurality of pickup images taken by an imaging device, the pickup images having designated colors;
   calculating a plurality of color distributions of pixels contained in the respective determined process target regions;
   forming a plurality of clusters with respect to the respective designated colors in the pickup images by executing a clustering process based on the calculated color distributions for the pickup images;
   executing a learning process including the determining step, the calculating step and the forming step preliminarily;
   executing the determining step and the calculating step for a recognition target image as the pickup image; and
   determining, based on a color distribution calculated for the recognition target image, which cluster the process target region is attributed to among the formed plurality of clusters with respect to the respective designated colors, the method being for recognizing a color of the process target region in the recognition target image,
   the calculating step in the learning process including:
      classifying the pixels contained in the process target region into predetermined classified colors; and
      calculating a plurality of rates of the respective classified colors,
   the forming step in the learning process including:
      extracting predetermined number of the classified colors, whose calculated rates are highest in the calculated plurality of the rates, from among the predetermined classified colors, in the process target region of each pickup image;
      defining a plurality of color spaces, dimensions of each of which are selected from the predetermined number of the extracted classified colors, the dimensions having domains corresponding to the respective rates of the selected classified colors; and
      specifying a set of coordinates of each designated color in each color space based on the calculated rates of the classified colors for each pickup image having the designated colors; and
      forming a cluster concerning the set of the coordinates for each designated color specified in each color space as the cluster of each designated color in each color space.

3. The method according to claim 2, wherein the predetermined number of classified colors are top three colors.

4. The method according to claim 2, wherein
   the forming step includes:
      integrating the clusters when the clusters having different designated colors are overlapped in one color space; and
      forming an integrated cluster as a cluster having a color other than the designated color in the color space.

5. The method according to claim 2, wherein
   the determining step includes:
      specifying coordinates in each color space, based on the calculated rate of each classified color in the recognition target image;
      calculating a distance between the specified coordinates and a barycenter of each cluster formed in the color space;

specifying a cluster having the shortest distance with respect to each color space; and selecting one color from the designated colors of the specified clusters as a recognized color, and the selected recognized color is recognized as a color of the process target region in the recognition target image.

6. The method according to claim 5, wherein the selecting step is performed based on one or more standards selected from the group consisting of:

a first standard selecting the designated color having highest frequency from the designated colors in the specified clusters in the color spaces;

a second standard selecting a chromatic color when the designated color having the highest frequency in the designated colors in the specified clusters in the color spaces is an achromatic color and the chromatic color is included in the designated colors of the clusters;

a third standard neglecting the cluster when the designated color of the specified cluster is the color other than the designated color; and a fourth standard regarding the recognized color as an unknown color when the designated color having highest frequency (degree) in the designated colors in the specified clusters in the color spaces is the color other than the designated color.

7. The method according to claim 5, wherein the distance calculating step includes calculating a Mahalanobis distance.

8. The method according to claim 2, further comprising recording the recognition target image together with the rates of the classified colors when the distance from the barycenter of the specified cluster is equal to or more than a predetermined value or when the recognized color is regarded as the unknown color.

9. The method according to claim 8, further comprising:

outputting the recorded recognition target image;

receiving a setting of the designated color for the outputted recognition target image;

specifying coordinates in the color space having dimensions corresponding to the classified colors recorded together, with respect to the recognition target images having the set designated color in common; and clustering the specified coordinate group as a group of coordinates corresponding to the set designated color to be as the cluster of the designated color.

10. The method according to claim 8, further comprising:

extracting the predetermined number of top high rate classified colors from the classified colors recorded together, with respect to the recorded recognition target image;

grouping the recognition target images having the predetermined number of extracted classified colors in common;

specifying coordinates in the color space having the dimensions corresponding to the classified colors, for the grouped recognition target images; and forming a new cluster of the specified coordinate group by clustering.

11. The method according to claim 10, wherein the step of forming the new cluster includes:

receiving a setting of the designated color of the cluster; and forming a cluster of the set designated color.

12. A color classification apparatus comprising:

a determining unit determining a plurality of predetermined process target regions from a plurality of pickup images taken by an imaging device;

a calculating unit calculating a plurality of color distributions of pixels contained in the respective determined process target regions; and a forming unit forming a plurality of clusters by executing a clustering process based on the calculated color distributions for the pickup images, the apparatus being for classifying a plurality of colors with respect to the respective formed clusters, the calculating unit including:

a unit classifying the pixels contained in the process target region into predetermined classified colors; and a unit calculating a plurality of rates of the respective classified colors, the forming unit including:

a unit extracting predetermined number of the classified colors, whose calculated rates are highest in the calculated plurality of the rates, from among the predetermined classified colors, in the process target region of each pickup image;

a unit defining a plurality of color spaces, dimensions of each of which are selected from the predetermined number of the extracted classified colors, the dimensions having domains corresponding to the respective rates of the selected classified colors;

a unit specifying a plurality of sets of coordinates for each pickup image in respective color spaces based on the rates of the classified colors; and a unit clustering the specified plurality of sets of the coordinates in the respective color spaces into the predetermined number or more of the clusters.

13. A color recognition apparatus comprising:

a first determining unit determining a plurality of predetermined process target regions from a plurality of pickup images taken by an imaging device, the pickup images having designated colors;

a calculating unit calculating a plurality of color distributions of pixels contained in the respective determined process target regions;

a forming unit forming a plurality of clusters with respect to the respective designated colors in the pickup images by executing a clustering process based on the calculated color distributions for the pickup images;

a unit determining, for a recognition target image as the pickup image, a process target region of the recognition target image as the pickup image by the first determining unit and calculating a color distributions of pixels contained in the determined process target region the recognition target image as the pickup image by the calculating unit; and a second determining unit determining, based on the color distribution calculated for the recognition target image as the pickup image, which cluster the process target region is attributed to among the formed plurality of clusters with respect to the respective designated colors, the apparatus being for recognizing a color of the process target region in the recognition target image, the calculating unit including:

a unit classifying the pixels contained in the process target region into predetermined classified colors; and a unit calculating a plurality of rates of the respective classified colors, and the forming unit including:

a unit extracting predetermined number of the classified colors, whose calculated rates are highest in the calculated plurality of the rates, from among the predetermined classified colors, in the process target region of each pickup image;

a unit defining a plurality of color spaces, dimensions of each of which are selected from the predetermined number of the extracted classified colors, the dimensions having domains corresponding to the respective rates of the selected classified colors;

a unit specifying a set of coordinates of each designated color in each color spaces based on the calculated rates of the classified colors for each pickup image having the designated colors; and a unit forming a cluster concerning the set of the coordinates for each designated color specified in each color space as the cluster of each designated color in each color space.

14. The apparatus according to claim 13, wherein the first determining unit includes:

a unit specifying coordinates in each color space, based on the calculated rate of each classified color in the recognition target image;

a unit calculating a distance between the specified coordinate and a barycenter of each cluster formed in the color space;

a unit specifying a cluster having the shortest distance with respect to each color space; and a selecting unit selecting one color from the designated colors of the specified clusters as a recognized color, and the recognized color selected by the selecting unit is recognized as a color of the process target region in the recognition target image.

15. The apparatus according to claim 14, further comprising:

a unit recording the recognition target image together with the rates of the classified colors when the distance from the barycenter of the specified cluster is not less than a predetermined value, or when the recognized color is regarded as the unknown color;

a unit extracting predetermined number of top high rate classified colors from the classified colors recorded together, with respect to the recorded recognition target image;

a unit grouping the recognition target images having the predetermined number of extracted classified colors in common;

a unit specifying coordinates in the color space having the dimensions corresponding to the classified colors, with respect to the recognition target images grouped by the grouping means; and a unit forming a new cluster of the specified coordinate group.

16. A color recognition system comprising:

a color classification apparatus including:

a determining unit determining a plurality of predetermined process target regions from a plurality of pickup images taken by an imaging device;

a calculating unit calculating a plurality of color distributions of pixels contained in the respective determined process target regions; and a forming unit forming a plurality of clusters by executing a clustering process based on the calculated color distributions for the pickup images, the color classification apparatus being for classifying a plurality of colors with respect to the respective formed clusters, a color recognition apparatus including:

a unit making the same distinction and calculation as the determining unit and the calculating unit with respect to a recognition target image; and a unit recognizing a color of the process target region in the recognition target image based on the calculated plurality of color distributions, the color recognition system being for selecting the color classified by the color classification apparatus and recognizing the color by the color recognition apparatus, the calculating unit of the color classification apparatus including:

a unit classifying the pixels contained in the process target region into predetermined classified colors; and a unit calculating a plurality of rates of the respective classified colors, the forming unit of the color classification apparatus including:

a unit extracting predetermined number of the classified colors, whose calculated rates are highest in the calculated plurality of the rates, from among the predetermined classified colors, in the process target region of each pickup image;

a unit defining a plurality of color spaces, dimensions of each of which are selected from the predetermined number of the extracted classified colors, the dimensions having domains corresponding to the respective rates of the selected classified colors;

a unit specifying a plurality of sets of coordinates for each pickup image in respective color spaces based on the rates of the classified colors; and a unit clustering the specified plurality of sets of the coordinates in the respective color spaces into the predetermined number or more of the clusters, the color recognition apparatus including:

a unit obtaining information of the plurality of the color spaces defined by the color classification apparatus and the clusters formed in each color space;

a unit specifying the coordinates in each color space based on the calculated rates of the classified colors for the recognition target image and the obtained information of each color space;

a unit calculating a distance between the specified coordinates and the barycenter of the cluster formed in each color space;

a unit specifying the cluster having the shortest distance for each color space; and a selecting unit selecting one color from the colors classified so as to be related to the specified cluster as a recognized color, the color recognition apparatus recognizing the recognized color selected by the selecting unit as a color of the process target region in the recognition target image.

17. The system according to claim 16, wherein the color recognition apparatus includes a unit outputting the recognition target image together with the rates of the classified colors when the shortest distance from the barycenter of the specified cluster is not less than a predetermined value, or when the recognized color is regarded as the unknown color, and the color classification apparatus includes:

a unit obtaining the recognition target image outputted from the color recognition apparatus and the rates of the classified colors outputted together with the recognition target image;

a unit extracting the predetermined number of top high rate classified colors from the classified colors, with respect to the obtained recognition target image;

a unit grouping the recognition target images having the predetermined number of extracted classified colors in common;

a unit specifying coordinates in the color space having the dimensions corresponding to the classified colors, with respect to each grouped recognition target images; and a unit forming a new cluster of the specified coordinate group by clustering.

18. A non-transitory computer-readable recording medium in which computer-executable program has been recorded, the program being for causing a computer to recognize a color of a process target region in a recognition target image as one of a plurality of pickup image taken by an imaging device which is coupled to the computer, the pickup images having designated colors, the program comprising instruction codes which cause the computer to function as:

first determining means for determining a plurality of predetermined process target regions from the respective plurality of the pickup images;

calculating means for calculating a plurality of color distributions of pixels contained in the respective determined process target regions;

forming means for forming a plurality of clusters with respect to the respective designated colors in the pickup images by executing a clustering process based on the calculated color distributions for the pickup images;

means for making a distinction by the determining means and a calculation by the calculating means when the recognition target image as the pickup image is given;

second determining means for determining, based on a color distribution for the recognition target image, which cluster the process target region is attributed to among the formed plurality of the clusters with respect to the respective designated colors;

means for classifying the pixels contained in the process target region into predetermined classified colors;

means for calculating a plurality of rates of the respective classified colors;

means for extracting predetermined number of the classified colors, whose calculated rates are highest in the calculated plurality of the rates, from among the predetermined classified colors, in the process target region of each pickup image;

means for defining a plurality of color spaces, dimensions of each of which are selected from the predetermined number of the extracted classified colors, the dimensions having domains corresponding to the respective rates of the selected classified colors;

means for specifying a set of coordinates of each designated color in each color space based on the calculated rates of the classified colors for each pickup image having the designated colors; and means for forming a cluster concerning the set of the coordinates for each designated color specified in each color space as the cluster of each designated color in each color space.

* * * * *